(12) United States Patent
Yi et al.

(10) Patent No.: US 12,088,908 B2
(45) Date of Patent: Sep. 10, 2024

(54) VIDEO PROCESSING METHOD AND ELECTRONIC DEVICE

(71) Applicant: HONOR DEVICE CO., LTD., Shenzhen (CN)

(72) Inventors: Jie Yi, Shenzhen (CN); Long Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/790,735

(22) PCT Filed: Jan. 18, 2022

(86) PCT No.: PCT/CN2022/072599
§ 371 (c)(1),
(2) Date: Jul. 3, 2022

(87) PCT Pub. No.: WO2022/252649
PCT Pub. Date: Dec. 8, 2022

(65) Prior Publication Data
US 2024/0179397 A1    May 30, 2024

(30) Foreign Application Priority Data
May 31, 2021 (CN) .......................... 202110602353.9

(51) Int. Cl.
*H04N 23/63* (2023.01)
*G11B 27/00* (2006.01)
(Continued)

(52) U.S. Cl.
CPC ......... *H04N 23/632* (2023.01); *G11B 27/005* (2013.01); *G06F 3/04817* (2013.01); *G11B 27/031* (2013.01)

(58) Field of Classification Search
CPC ............................ H04N 23/632; G11B 27/005
See application file for complete search history.

(56) References Cited

U.S. PATENT DOCUMENTS

| 10,638,057 | B2 | 4/2020 | Kang et al. | |
| 2013/0208143 | A1* | 8/2013 | Chou ................... | H04N 23/667 348/231.99 |

(Continued)

FOREIGN PATENT DOCUMENTS

| CN | 107040714 A | 8/2017 |
| CN | 110086985 A | 8/2019 |

(Continued)

*Primary Examiner* — Mishawn N. Hunter
(74) *Attorney, Agent, or Firm* — WOMBLE BOND DICKINSON (US) LLP

(57) ABSTRACT

This application relates to the field of photographing technologies, and provides a video processing method and an electronic device, so as to adjust a playback speed for part of video frames during video recording. The electronic device displays a first screen, where the first screen includes a first icon for indicating that a recorded video is to be played at a first speed. The electronic device displays a second screen. Both the first screen and the second screen are viewfinder screens during video recording, and the second screen includes a second icon for indicating that the recorded video is to be played at a second speed. The electronic device generates a first video file. The first video file includes a first video stream and a second video stream the electronic device plays the first video stream at the first speed and plays the second video stream at the second speed.

19 Claims, 27 Drawing Sheets

(51) Int. Cl.
 *G06F 3/04817* (2022.01)
 *G11B 27/031* (2006.01)

(56) References Cited

U.S. PATENT DOCUMENTS

| | | |
|---|---|---|
| 2014/0178027 A1 | 6/2014 | Lee |
| 2015/0286875 A1* | 10/2015 | Land .................. G11B 27/28 |
| | | 382/103 |
| 2018/0213166 A1 | 7/2018 | Kim et al. |
| 2021/0160435 A1* | 5/2021 | Pena .................. G06F 3/04883 |
| 2022/0159183 A1 | 5/2022 | Li et al. |
| 2022/0247929 A1 | 8/2022 | Yang et al. |

FOREIGN PATENT DOCUMENTS

| | | |
|---|---|---|
| CN | 110177298 A | 8/2019 |
| CN | 108322650 B | 3/2020 |
| CN | 111327966 A | 6/2020 |
| CN | 112422863 A | 2/2021 |
| CN | 112532857 A | 3/2021 |
| CN | 112653920 A | 4/2021 |
| CN | 113726949 A | 11/2021 |
| WO | 2020186969 A1 | 9/2020 |

\* cited by examiner

CONT.
FROM
FIG. 15A

```
                    │
                    ▼
┌─────────────────────────────────────────────────────────────┐
│ The mobile phone displays a second screen in response to the│   S303
│ first operation, where the second screen is a viewfinder    │
│ screen during video recording of the mobile phone, the      │
│ second screen includes a second icon and a second preview   │
│ image captured by the camera, and the second icon is used   │
│ to indicate that the mobile phone is to play a recorded     │
│ video at the second speed                                   │
└─────────────────────────────────────────────────────────────┘
                    │
                    ▼
┌─────────────────────────────────────────────────────────────┐
│ The mobile phone receives a second operation on the second  │   S304
│ screen by the user, where the second operation is used to   │
│ trigger the mobile phone to terminate video recording       │
└─────────────────────────────────────────────────────────────┘
                                                                  S305
┌─────────────────────────────────────────────────────────────┐
│ The mobile phone generates a first video file in response   │  S1506
│ to the second operation, where the first video file         │
│ includes a first video stream, a second video stream, and   │
│ a third video stream, the first video stream includes a     │
│ plurality of frames of first preview images, the second     │
│ video stream includes a plurality of frames of second       │
│ preview images, and the third video stream includes a       │
│ plurality of frames of third preview images                 │
└─────────────────────────────────────────────────────────────┘
                    │
                    ▼
┌─────────────────────────────────────────────────────────────┐
│ The mobile phone receives a third operation by the user,    │   S306
│ where the third operation is used to trigger the mobile     │
│ phone to play the first video file                          │   S307
└─────────────────────────────────────────────────────────────┘
┌─────────────────────────────────────────────────────────────┐
│ In response to the third operation, the mobile phone plays  │  S1507
│ the third video stream at 1x speed, plays the first video   │
│ stream at the first speed, and plays the second video       │
│ stream at the second speed                                  │
└─────────────────────────────────────────────────────────────┘
```

FIG. 15B

VIDEO PROCESSING METHOD AND ELECTRONIC DEVICE

This application is a National Stage of International Application PCT/CN2022/072599, filed Jan. 18, 2022, which claims priority to Chinese Patent Application No. 202110602353.9 filed May 31, 2021, both of which are hereby incorporated by reference in their entireties.

TECHNICAL FIELD

This application relates to the field of photographing technologies, and in particular, to a video processing method and an electronic device.

BACKGROUND

Electronic devices having a photographing function, such as mobile phones and cameras, can provide not only a picture shooting function but also a video recording function.

In a video recording scenario, a video is usually shot by an electronic device, and then post-processing is performed on the video. However, in practice, a condition for post-processing may be not available, and therefore post-processing of the video cannot be completed. For example, post-processing of the video cannot be implemented because there is no video processing software, or post-processing of the video cannot be implemented because the user has no ability to complete the post-processing. Therefore, in a video shooting scenario, it is difficult for ordinary users to perform post-processing after shooting.

In some improved schemes, in order to reduce difficulties in video processing for a user, in a screen displayed before shooting starts, the electronic device may display a beauty icon for the user to trigger and select a beauty level; or, in the screen displayed before shooting starts, the electronic device may display a filter icon for the user to select a filter; or, in the screen displayed before shooting starts, the electronic device may display a flash icon for the user to turn on or turn off a flash. Then, in the video shooting process, the electronic device can process, according to settings configured by the user before shooting starts, the video shot in real time. However, in the improved schemes, shooting settings can be merely configured for the entire video before shooting, and then the same processing is performed on the entire video, featuring low flexibility in processing.

In summary, in the video processing schemes in the prior art, it is impossible to provide flexibility of video processing with difficulty of video processing reduced for the user.

SUMMARY

This application provides a video processing method and an electronic device, so as to accelerate or slow down playback of part of video frames according to an operation by a user during video recording, thereby improving flexibility of playback. In addition, a user does not need to perform complex operations, thereby reducing difficulties in implementing variable-speed-based playback.

To achieve the foregoing objective, the following technical solutions are used in this application.

According to a first aspect, an embodiment of this application provides a video processing method. The method is applied to an electronic device including a camera. The electronic device may display a first screen, where the first screen is a viewfinder screen during video recording of the electronic device, the first screen includes a first icon and a first preview image captured by the camera, and the first icon is used to indicate that the electronic device is to play a recorded video at a first speed. The electronic device receives a first operation by a user on the first screen, where the first operation is used to trigger the electronic device to adjust the electronic device to play a recorded video at a second speed. The second speed is not equal to the first speed. The electronic device may display a second screen in response to the first operation, where the second screen is a viewfinder screen during video recording of the electronic device, the second screen includes a second icon and a second preview image captured by the camera, and the second icon is used to indicate that the electronic device is to play a recorded video at a second speed. That is, the electronic device can change a playback speed of the video in a recording process. The electronic device receives a second operation on the second screen by the user, where the second operation is used to trigger the electronic device to terminate video recording. The electronic device generates a first video file in response to the second operation, where the first video file includes a first video stream and a second video stream, the first video stream includes a plurality of frames of the first preview images, and the second video stream includes a plurality of frames of the second preview images. In short, for preview images captured before and after switching of a playback speed, video streams are generated separately. The electronic device receives a third operation by the user, where the third operation is used to trigger the electronic device to play the first video file; and in response to the third operation, the electronic device plays the first video stream at the first speed and plays the second video stream at the second speed. In this way, videos recorded before and after switching can be played at different playback speeds.

In sum, according to the method in this embodiment of this application, the electronic device can adjust a playback speed according to an operation by the user during video recording, and provide a new playback speed adjustment manner, thereby improving flexibility of playback speed adjustment. In addition, the electronic device forms different video streams by using preview images captured before and after playback speed adjustment, and then plays different video streams at different speeds during video playing. In this way, after recording is completed, different video streams can be played at different speeds, not requiring the user to perform any operation, so that a time point for changing the playback speed is consistent with a time point at which the user performs the first operation during recording, thereby improving intelligence of variable-speed-based playback.

In a possible design manner of the first aspect, in a case that the first speed is less than a first preset speed, playing duration for playing the first video stream by the electronic device is greater than capturing duration for capturing all the first preview images by the camera. In a case that the first speed is equal to the first preset speed, the playing duration for playing the first video stream by the electronic device is equal to the capturing duration for capturing all the first preview images by the camera. In a case that the first speed is greater than the first preset speed, the playing duration for playing the first video stream by the electronic device is less than the capturing duration for capturing all the first preview images by the camera. In short, with a speed value of the first speed falling within a different range, a comparison result between the playing duration of the first video stream and the capturing duration of the first preview image may be also different during playing at the first speed.

In a case that the second speed is less than the first preset speed, the playing duration for playing the second video stream by the electronic device is greater than the capturing duration for capturing all the second preview images by the camera. In a case that the second speed is equal to the first preset speed, the playing duration for playing the second video stream by the electronic device is equal to the capturing duration for capturing all the second preview images by the camera. In a case that the second speed is greater than the first preset speed, the playing duration for playing the second video stream by the electronic device is less than the capturing duration for capturing all the second preview images by the camera. In short, with a speed value of the second speed falling within a different range, a comparison result between the playing duration of the second video stream and the capturing duration of the second preview image may be also different during playing at the second speed.

That is, according to the method in this embodiment of this application, variable-speed-based playback can be implemented by limiting the playing duration.

In another possible design manner of the first aspect, the first screen includes a first preset control, the first preset control is used to trigger the electronic device to display a plurality of speed options, and each speed option corresponds to one video playback speed. before the receiving, by the electronic device, a first operation by a user on the first screen, the method further includes: displaying, by the electronic device, the plurality of speed options on the first screen in response to a tap operation on the first preset control by the user; where the first operation is a select operation by the user on a first speed option in the plurality of speed options, and the first speed option corresponds to the second speed.

That is, according to the method in this embodiment of this application, displaying of the plurality of speed options is triggered only when speed adjustment is required, so that the user can select a to-be-adjusted-to speed. In this way, when speed adjustment is not required, less element content is displayed on the first screen, and the user can be guided to select a speed in a targeted manner.

In another possible design manner of the first aspect, in a case that the first speed is not equal to a second preset speed, the first screen further includes a second preset control; and in a case that the second speed is not equal to the second preset speed, the second screen further includes the second preset control; where the second preset control is used to trigger the electronic device to adjust the electronic device to play the recorded video at the second preset speed. Generally, the second preset speed is a 1× speed.

That is, according to the method in this embodiment of this application, the user operates the second preset control to trigger the electronic device to restore the playback speed to the second preset speed. In this way, the preset speed can be easily restored, not requiring the user to perform operations such as selecting a speed option. For example, a 2× speed can be quickly switched to the 1× speed.

In another possible design manner of the first aspect, in a case that the first speed is not equal to a second preset speed, the first screen further includes a third preset control. In a case that the second speed is not equal to the second preset speed, the second screen further includes the third preset control. The third preset control is used to trigger the electronic device to terminate video recording. Generally, the second preset speed is a 1× speed.

That is, according to the method in this embodiment of this application, in response to a tap operation by the user on the third preset control, the mobile phone can directly terminate video recording. In this way, when the playback speed is not equal to the second preset speed, switching to the second preset speed does not need to be performed before video recording is terminated on a screen displaying the second preset speed. Instead, recording can be directly exited by using the third control from a screen displaying a speed other than the second preset speed. This simplifies an operation of exiting video recording from a screen displaying a speed other than the preset speed.

In another possible design manner of the first aspect, before the displaying, by the electronic device, a first screen, the method further includes: displaying, by the electronic device, a fourth screen. The fourth screen is a viewfinder screen during video recording of the electronic device, the fourth screen includes a third icon and a third preview image captured by the camera, and the third speed icon is used to indicate that the electronic device is to play the recorded video at the second preset speed. The electronic device receives a fifth operation by the user on the fourth screen, where the fifth operation is used to trigger the electronic device to adjust the electronic device to play the recorded video at the first speed. The displaying, by the electronic device, a first screen includes: displaying, by the electronic device, the first screen in response to the fifth operation.

That is, according to the method in this embodiment of this application, the playback speed can be further switched before the first screen is displayed. In other words, in a complete video recording process, the playback speed can be switched one or more times, thereby further improving flexibility of playback speed change.

It should be noted that, generally, recording starts at the second preset speed (for example, 1× speed), and therefore the multi-switching process is described by using first switching from the preset speed to the first speed and then switching to the second speed. However, during actual implementation, speed switching can be further performed between the preset speed and the first speed.

In another possible design manner of the first aspect, the generating a first video file includes: if the first speed is less than the first preset speed, performing, by the electronic device, frame insertion processing on all the first preview images captured by the camera, to obtain the first video stream including the plurality of frames of the first preview images, and if the first speed is greater than the first preset speed, performing, by the electronic device, frame extraction processing on all the first preview images captured by the camera, to obtain the first video stream including the plurality of frames of the first preview images; if the second speed is greater than 0 and less than 1, performing, by the electronic device, frame insertion processing on all the second preview images captured by the camera, to obtain the second video stream including the plurality of frames of the second preview images, and if the second speed is greater than the first preset speed, performing, by the electronic device, frame extraction processing on all the second preview images captured by the camera, to obtain the second video stream including the plurality of frames of the second preview images; and generating, by the electronic device, the first video file including the first video stream and the second video stream.

That is, according to the method in this embodiment of this application, in response to the second operation by the user, the electronic device can perform frame extraction or frame insertion processing based on a corresponding playback speed to obtain the first video stream and the second video stream; and generate the first video file including the first video stream and the second video stream. In this way, a video file to be played at variable speeds can be obtained through pre-processing before playback, and can be then played directly during playback, not requiring the electronic device to perform any processing. This simplifies subsequent variable-speed-based playback. In addition, in response to the second operation, frame insertion processing and/or frame extraction processing is completed at one time, which can avoid invoking the same processing program multiple times.

In another possible design manner of the first aspect, the method further includes: if the first speed is less than the first preset speed, performing, by the electronic device in response to the first operation, frame insertion processing on all the first preview images captured by the camera, to obtain the first video stream including the plurality of frames of the first preview images; and if the first speed is greater than the first preset speed, performing frame extraction processing on all the first preview images captured by the camera, to obtain the first video stream including the plurality of frames of the first preview images. The generating, by the electronic device, a first video file in response to the second operation includes: if the first speed is less than the first preset speed, performing, by the electronic device in response to the second operation, frame insertion processing on all the second preview images captured by the camera, to obtain the second video stream including the plurality of frames of the second preview images, and if the first speed is greater than the first preset speed, performing frame extraction processing on all the second preview images captured by the camera, to obtain the second video stream including the plurality of frames of the second preview images; and generating, by the electronic device, the first video file including the first video stream and the second video stream.

Different from the foregoing one-time implementation of frame insertion processing and/or frame extraction processing in response to the second operation, in this embodiment of this application, it is considered that capturing of the first preview image has been finished after the playback speed is adjusted to the second speed. Therefore, in response to the first operation, the mobile phone completes frame insertion processing or frame extraction processing on all the first preview images, to obtain the first video stream. Then, in response to the second operation, the mobile phone completes frame insertion processing or frame extraction processing on all the second preview images, to obtain the second video stream. In this way, frame insertion processing or frame extraction processing can be started in a timely manner after capturing of the first preview image is terminated. This avoids processing a large number of processing tasks in a concentrated period of time, and can reduce pressure of instantaneous data processing.

In another possible design manner of the first aspect, the generating a first video file includes: if the first speed is less than the first preset speed and the second speed is greater than the first preset speed, a plurality of preset video frames are added between the first video stream and the second video stream; and if the first speed is greater than the first preset speed and the second speed is less than the first preset speed, a plurality of preset video frames are added between the first video stream and the second video stream.

That is, according to the method in this embodiment of this application, in a scenario of switching from an accelerated playback speed (for example, 2× speed) to a slowed-down playback speed (for example, 0.5× speed), or in a scenario of switching from a slowed-down playback speed (for example, 0.5× speed) to an accelerated playback speed (for example, 2× speed), a plurality of preset video frames are added between the first video stream and the second video stream that are obtained, to implement transition animation, thereby improving smoothness of video playback.

According to a second aspect, an embodiment of this application provides a video processing method. The method is applied to an electronic device including a first camera and a second camera, where the electronic device displays a first screen, where the first screen is a viewfinder screen during video recording of the electronic device, the first screen includes a first preview image captured by the first camera and a second preview image captured by the second camera. The first screen further includes a first icon, and the first icon is used to indicate that the electronic device is to play a recorded video at a first speed. The electronic device receives a first operation by the user on the first screen, where the first operation is used to trigger the electronic device to adjust the electronic device to play the recorded video at the second speed. The electronic device displays a second screen in response to the first operation, where the second screen is a viewfinder screen during video recording of the electronic device, the second screen includes a third preview image captured by the first camera and a fourth preview image captured by the second camera, the second screen further includes a second icon, and the second icon is used to indicate that the electronic device is to play a recorded video at the second speed. That is, the electronic device can change a playback speed of the video in a recording process. The electronic device receives a second operation on the second screen by the user, where the second operation is used to trigger the electronic device to terminate video recording. The electronic device generates a first video file in response to the second operation, where the first video file includes a first video stream, a second video stream, a third video stream, and a fourth video stream, the first video stream includes a plurality of frames of the first preview images, the second video stream includes a plurality of frames of the second preview images, the third video stream includes a plurality of frames of the third preview images, and the fourth video stream includes a plurality of frames of the fourth preview images. In short, for preview images captured before and after switching of a playback speed, video streams are generated separately. The electronic device receives a third operation by the user, where the third operation is used to trigger the electronic device to play the first video file; and in response to the third operation, the electronic device plays the first video stream and the second video stream at the first speed, and playing the third video stream and the fourth video stream at the second speed.

In sum, according to the method in this embodiment of this application, the electronic device can adjust a playback speed according to an operation by the user during video recording, and provide a new playback speed adjustment manner, thereby improving flexibility of playback speed adjustment. In addition, the electronic device forms different video streams by using preview images captured before and after playback speed adjustment, and then plays different video streams at different speeds during video playing. In this way, after recording is completed, different video streams can be played at different speeds, not requiring the user to perform any operation, so that a time point for changing the playback speed is consistent with a time point at which the user performs the first operation during recording, thereby improving intelligence of variable-speed-based playback.

In a possible design manner of the second aspect, in a case that the first speed is less than a first preset speed, playing duration for playing the first video stream by the electronic device is greater than capturing duration for capturing all the first preview images by the first camera, and playing duration for playing the second video stream is greater than capturing duration for capturing all the second preview images by the second camera. In a case that the first speed is equal to the first preset speed, the playing duration for playing the first video stream by the electronic device is equal to the capturing duration for capturing all the first preview images captured by the first camera, and the playing duration for playing the second video stream is equal to the capturing duration for capturing all the second preview images by the second camera. In a case that the first speed is greater than the first preset speed, the playing duration for playing the first video stream by the electronic device is less than the capturing duration for capturing all the first preview images captured by the first camera, and the playing duration for playing the second video stream is less than the capturing duration for capturing all the second preview images by the second camera. In short, with a speed value of the first speed falling within a different range, during playing at the first speed, a comparison result between the playing duration of the first video stream and the capturing duration of the first preview image may be different and a comparison result between the playing duration of the second video stream and the capturing duration of the second preview image may be also different.

In a case that the second speed is less than the first preset speed, playing duration for playing the third video stream by the electronic device is greater than capturing duration for capturing all the third preview images captured by the first camera, and playing duration for playing the fourth video stream is greater than capturing duration for capturing all the fourth preview images by the second camera. In a case that the second speed is equal to the first preset speed, the playing duration for playing the third video stream by the electronic device is equal to the capturing duration for capturing all the third preview images captured by the first camera, and the playing duration for playing the fourth video stream is equal to the capturing duration for capturing all the fourth preview images by the second camera. In a case that the second speed is greater than the first preset speed, playing duration for playing the third video stream by the electronic device is less than capturing duration for capturing all the third preview images captured by the first camera, and playing duration for playing the fourth video stream is less than capturing duration for capturing all the fourth preview images by the second camera. In short, with a speed value of the second speed falling within a different range, during playing at the second speed, a comparison result between the playing duration of the third video stream and the capturing duration of the third preview image may be different and a comparison result between the playing duration of the fourth video stream and the capturing duration of the fourth preview image may be also different.

That is, according to the method in this embodiment of this application, variable-speed-based playback can be implemented by limiting the playing duration.

In another possible design manner of the second aspect, the first screen includes a first preset control, the first preset control is used to trigger the electronic device to display a plurality of speed options, and each speed option corresponds to one video playback speed. Before the receiving, by the electronic device, a first operation by a user on the first screen, the method further includes: displaying, by the electronic device, the plurality of speed options on the first screen in response to a tap operation on the first preset control by the user. The first operation is a select operation by the user on a first speed option in the plurality of speed options, and the first speed option corresponds to the second speed.

That is, according to the method in this embodiment of this application, displaying of the plurality of speed options is triggered only when speed adjustment is required, so that the user can select a to-be-adjusted-to speed. In this way, when speed adjustment is not required, less element content is displayed on the first screen, and the user can be guided to select a speed in a targeted manner.

In another possible design manner of the second aspect, in a case that the first speed is not equal to a second preset speed, the first screen further includes a second preset control. In a case that the second speed is not equal to the second preset speed, the second screen further includes the second preset control. The second preset control is configured to trigger the electronic device to play a recorded video at the second preset speed. Generally, the second preset speed is a 1× speed.

That is, according to the method in this embodiment of this application, the user operates the second preset control to trigger the electronic device to restore the playback speed to the second preset speed. In this way, the second preset speed can be easily restored, not requiring the user to perform operations such as selecting a speed option. For example, a 2× speed can be quickly switched to the 1× speed.

In another possible design manner of the second aspect, in a case that the first speed is not equal to a second preset speed, the first screen further includes a third preset control. In a case that the second speed is not equal to the second preset speed, the second screen further includes the third preset control. The third preset control is used to trigger the electronic device to terminate video recording. Generally, the second preset speed is a 1× speed.

That is, according to the method in this embodiment of this application, in response to a tap operation by the user on the third preset control, the mobile phone can directly terminate video recording. In this way, when the playback speed is not equal to the second preset speed, switching to the second preset speed does not need to be performed before video recording is terminated on a screen displaying the second preset speed; and recording can be directly exited by using the third control from a screen displaying a speed other than the second preset speed. In this way, an operation of exiting video recording from a screen displaying a speed other than the second preset speed is simplified.

In another possible design manner of the second aspect, before the displaying, by the electronic device, a first screen, the method further includes: displaying, by the electronic device, a fourth screen. The fourth screen is a viewfinder screen during video recording of the electronic device, and the fourth screen includes a fifth preview image captured by the first camera and a sixth preview image captured by the second camera. The fourth screen further includes a third icon, and the third icon is used to indicate that the electronic device is to play a recorded video at the second preset speed. The electronic device receives a fifth operation by the user on the fourth screen. The fifth operation is used to trigger the electronic device to adjust the electronic device to play the recorded video at the first speed. The displaying, by the electronic device, a first screen includes: displaying, by the electronic device, the first screen in response to the fifth operation.

That is, according to the method in this embodiment of this application, the playback speed can be further switched before the first screen is displayed. In other words, in a complete video recording process, the playback speed can be switched one or more times, thereby further improving flexibility of playback speed change.

It should be noted that, generally, recording starts at the second preset speed (for example, the first preset speed), and therefore the multi-switching process is described by using first switching from the second preset speed to the first speed and then switching to the second speed. However, during actual implementation, speed switching can be further performed between the second preset speed and the first speed.

In another possible design manner of the second aspect, the generating a first video file includes: if the first speed is less than the first preset speed, performing, by the electronic device, frame insertion processing on all the first preview images captured by the first camera, to obtain the first video stream including the plurality of frames of the first preview images, and performing, by the electronic device, frame insertion processing on all the second preview images captured by the second camera, to obtain the second video stream including the plurality of frames of the second preview images; and if the first speed is greater than the first preset speed, performing, by the electronic device, frame extraction processing on all the first preview images captured by the first camera, to obtain the first video stream including the plurality of frames of the first preview images, and performing, by the electronic device, frame extraction processing on all the second preview images captured by the second camera, to obtain the second video stream including the plurality of frames of the second preview images; if the second speed is less than the first preset speed, performing, by the electronic device, frame insertion processing on all the third preview images captured by the first camera, to obtain the third video stream including the plurality of frames of the third preview images, and performing, by the electronic device, frame insertion processing on all the fourth preview images captured by the second camera, to obtain the fourth video stream including the plurality of frames of the fourth preview images; if the second speed is greater than the first preset speed, performing, by the electronic device, frame extraction processing on all the third preview images captured by the first camera, to obtain the third video stream including the plurality of frames of the third preview images, and performing, by the electronic device, frame extraction processing on all the fourth preview images captured by the second camera, to obtain the fourth video stream including the plurality of frames of the fourth preview images; and generating, by the electronic device, the first video file including the first video stream, the second video stream, the third video stream, and the fourth video stream.

That is, according to the method in this embodiment of this application, in response to the second operation by the user, the electronic device can perform frame extraction or frame insertion processing based on a corresponding playback speed to obtain the first video stream, the second video stream, the third video stream, and the fourth video stream; and generate the first video file including the first video stream, the second video stream, the third video stream, and the fourth video stream. In this way, a video file to be played at variable speeds can be obtained through pre-processing before playback, and can be then played directly during playback, not requiring the electronic device to perform any processing, thereby simplifying subsequent variable-speed-based playback. In addition, in response to the second operation, frame insertion processing and/or frame extraction processing is completed at one time, which can avoid invoking the same processing program multiple times.

In another possible design manner of the second aspect, the method further includes: if the first speed is less than the first preset speed, performing, by the electronic device in response to the first operation, frame insertion processing on all the first preview images captured by the first camera, to obtain the first video stream including the plurality of frames of the first preview images, and performing, by the electronic device, frame insertion processing on all the second preview images captured by the second camera, to obtain the second video stream including the plurality of frames of the second preview images; and if the first speed is greater than the first preset speed, performing, by the electronic device, frame extraction processing on all the first preview images captured by the first camera, to obtain the first video stream including the plurality of frames of the first preview images, and performing, by the electronic device, frame extraction processing on all the second preview images captured by the second camera, to obtain the second video stream including the plurality of frames of the second preview images. The generating, by the electronic device, a first video file in response to the second operation includes: if the second speed is less than the first preset speed, performing, by the electronic device in response to the second operation, frame insertion processing on all the third preview images captured by the first camera, to obtain the third video stream including the plurality of frames of the third preview images, and performing, by the electronic device, frame insertion processing on all the fourth preview images captured by the second camera, to obtain the fourth video stream including the plurality of frames of the fourth preview images; if the second speed is greater than the first preset speed, performing, by the electronic device, frame extraction processing on all the third preview images captured by the first camera, to obtain the third video stream including the plurality of frames of the third preview images, and performing, by the electronic device, frame extraction processing on all the fourth preview images captured by the second camera, to obtain the fourth video stream including the plurality of frames of the fourth preview images; and generating, by the electronic device, the first video file including the first video stream, the second video stream, the third video stream, and the fourth video stream.

Different from the foregoing one-time implementation of frame insertion processing and/or frame extraction processing in response to the second operation, in this embodiment of this application, it is considered that capturing of the first preview image has been finished after the playback speed is adjusted to the second speed. Therefore, in response to the first operation, the mobile phone completes frame insertion processing or frame extraction processing on all the first preview images, to obtain the first video stream, and completes frame insertion processing or frame extraction processing on all the second preview images, to obtain the second video stream. Then, in response to the second operation, the mobile phone completes frame insertion processing or frame extraction processing on all the third preview images, to obtain the third video stream, and completes frame insertion processing or frame extraction processing on all the fourth preview images, to obtain the fourth video stream. In this way, frame insertion processing or frame extraction processing can be started in a timely manner after capturing of the first preview image and the second preview image is terminated. This avoids processing a large number of processing tasks in a concentrated period of time, and can reduce pressure of instantaneous data processing.

In another possible design manner of the second aspect, the generating a first video file includes: if the first speed is less than the first preset speed and the second speed is greater than the first preset speed, adding a plurality of preset video frames between the first video stream and the third video stream, and adding a plurality of preset video frames between the second video stream and the fourth video stream; and if the first speed is greater than the first preset speed and the second speed is less than the first preset speed, adding a plurality of preset video frames between the first video stream and the third video stream, and adding a plurality of preset video frames between the second video stream and the fourth video stream.

That is, according to the method in this embodiment of this application, in a scenario of switching from an accelerated playback speed (for example, 2× speed) to a sloweddown playback speed (for example, 0.5× speed), or in a scenario of switching from a slowed-down playback speed (for example, 0.5× speed) to an accelerated playback speed (for example, 2× speed), a plurality of preset video frames are added between the first video stream and the third video stream that are obtained, and a plurality of preset video frames are added between the second video stream and the fourth video stream that are obtained, to implement transition animation, thereby improving smoothness of video playback.

According to a third aspect, an embodiment of this application provides an electronic device. The electronic device includes a camera, and the electronic device further includes a display, a memory, and one or more processors; the display and the memory are coupled to the processor; the memory is configured to store computer program code, and the computer program code includes a computer instruction; and when the computer instruction is executed by the processor, the electronic device is enabled to perform the following steps: displaying a first screen, where the first screen is a viewfinder screen during video recording of the electronic device, the first screen includes a first icon and a first preview image captured by the camera, and the first icon is used to indicate that the electronic device is to play a recorded video at a first speed; receiving a first operation by a user on the first screen, where the first operation is used to trigger adjustment to play the recorded video at a second speed, and the second speed is not equal to the first speed; displaying a second screen in response to the first operation, where the second screen is a viewfinder screen during video recording of the electronic device, the second screen includes a second icon and a second preview image captured by the camera, and the second icon is used to indicate that the electronic device is to play a recorded video at a second speed; receiving a second operation on the second screen by the user, where the second operation is used to trigger to terminate video recording; generating a first video file in response to the second operation, where the first video file includes a first video stream and a second video stream, the first video stream includes a plurality of frames of the first preview images, and the second video stream includes a plurality of frames of the second preview images; receiving a third operation by the user, where the third operation is used to trigger to play the first video file; and playing, in response to the third operation, the first video stream at the first speed and playing the second video stream at the second speed.

In a possible design manner of the third aspect, in a case that the first speed is less than a first preset speed, playing duration for playing the first video stream is greater than capturing duration for capturing all the first preview images by the camera; in a case that the first speed is equal to the first preset speed, the playing duration for playing the first video stream is equal to the capturing duration for capturing all the first preview images by the camera; in a case that the first speed is greater than the first preset speed, the playing duration for playing the first video stream is less than the capturing duration for capturing all the first preview images by the camera; in a case that the second speed is less than the first preset speed, playing duration for playing the second video stream is greater than capturing duration for capturing all the second preview images by the camera; in a case that the second speed is equal to the first preset speed, the playing duration for playing the second video stream is equal to the capturing duration for capturing all the second preview images by the camera; and in a case that the second speed is greater than the first preset speed, the playing duration for playing the second video stream is less than the capturing duration for capturing all the second preview images by the camera.

In another possible design manner of the third aspect, the first screen includes a first preset control, the first preset control is used to trigger to display a plurality of speed options, and each speed option corresponds to one video playback speed;

When the computer instruction is executed by the processor, the electronic device is enabled to perform the following steps: displaying the plurality of speed options on the first screen in response to a tap operation on the first preset control by the user, where the first operation is a select operation by the user on a first speed option in the plurality of speed options, and the first speed option corresponds to the second speed.

In another possible design manner of the third aspect, in a case that the first speed is not equal to a second preset speed, the first screen further includes a second preset control; and in a case that the second speed is not equal to the second preset speed, the second screen further includes the second preset control; where the second preset control is used to trigger to play the recorded video at the second preset speed.

In another possible design manner of the third aspect, in a case that the first speed is not equal to a second preset speed, the first screen further includes a third preset control; and in a case that the second speed is not equal to the second preset speed, the second screen further includes the third preset control. The third preset control is used to trigger the electronic device to terminate video recording.

In another possible design manner of the third aspect, when the computer instruction is executed by the processor, the electronic device is enabled to perform the following steps: displaying a fourth screen, where the fourth screen is a viewfinder screen during video recording, the fourth screen includes a third icon and a third preview image captured by the camera, and the third speed icon is used to indicate that the recorded video is to be played at the second preset speed; and receiving a fifth operation by the user on the fourth screen, where the fifth operation is used to trigger adjustment to play the recorded video at the first speed. The displaying a first screen includes: displaying the first screen in response to the fifth operation.

In another possible design manner of the third aspect, when the computer instruction is executed by the processor, the electronic device is enabled to perform the following steps: if the first speed is less than the first preset speed, performing frame insertion processing on all the first preview images captured by the camera, to obtain the first video stream including the plurality of frames of the first preview images, and if the first speed is greater than the first preset speed, performing frame extraction processing on all the first preview images captured by the camera, to obtain the first video stream including the plurality of frames of the first preview images; if the second speed is less than the first preset speed, performing frame insertion processing on all the second preview images captured by the camera, to obtain the second video stream including the plurality of frames of the second preview images; and if the second speed is greater than the first preset speed, performing frame extraction processing on all the second preview images captured by the camera, to obtain the second video stream including the plurality of frames of the second preview images; and generating, by the electronic device, the first video file including the first video stream and the second video stream.

In another possible design manner of the third aspect, when the computer instruction is executed by the processor, the electronic device is enabled to perform the following steps: if the first speed is less than the first preset speed, performing, in response to the first operation, frame insertion processing on all the first preview images captured by the camera, to obtain the first video stream including the plurality of frames of the first preview images, and if the first speed is greater than the first preset speed, performing frame extraction processing on all the first preview images captured by the camera, to obtain the first video stream including the plurality of frames of the first preview images; if the first speed is less than the first preset speed, performing, in response to the second operation, frame insertion processing on all the second preview images captured by the camera, to obtain the second video stream including the plurality of frames of the second preview images; and if the first speed is greater than the first preset speed, performing frame extraction processing on all the second preview images captured by the camera, to obtain the second video stream including the plurality of frames of the second preview images; and generating, by the electronic device, the first video file including the first video stream and the second video stream.

In another possible design manner of the third aspect, when the computer instruction is executed by the processor, the electronic device is enabled to perform the following steps: if the first speed is less than the first preset speed and the second speed is greater than the first preset speed, a plurality of preset video frames are added between the first video stream and the second video stream; and if the first speed is greater than the first preset speed and the second speed is less than the first preset speed, a plurality of preset video frames are added between the first video stream and the second video stream.

According to a fourth aspect, an embodiment of this application provides an electronic device. The electronic device includes a first camera and a second camera, and the electronic device further includes a display, a memory, and one or more processors; the display and the memory are coupled to the processor; the memory is configured to store computer program code, and the computer program code includes a computer instruction; and when the computer instruction is executed by the processor, the electronic device is enabled to perform the following steps: displaying a first screen, where the first screen is a viewfinder screen during video recording, the first screen includes a first preview image captured by the first camera and a second preview image captured by the second camera, the first screen further includes a first icon, and the first icon is used to indicate that a recorded video is to be played at a first speed; receiving a first operation by a user on the first screen, where the first operation is used to trigger adjustment to play the recorded video at a second speed; displaying a second screen in response to the first operation, where the second screen is a viewfinder screen during video recording, the second screen includes a third preview image captured by the first camera and a fourth preview image captured by the second camera, the second screen further includes a second icon, and the second icon is used to indicate that the recorded video is to be played at the second speed; receiving a second operation on the second screen by the user, where the second operation is used to trigger to terminate video recording; generating a first video file in response to the second operation, where the first video file includes a first video stream, a second video stream, a third video stream, and a fourth video stream, the first video stream includes a plurality of frames of the first preview images, the second video stream includes a plurality of frames of the second preview images, the third video stream includes a plurality of frames of the third preview images, and the fourth video stream includes a plurality of frames of the fourth preview images; receiving a third operation by the user, where the third operation is used to trigger to play the first video file; and playing, in response to the third operation, the first video stream and the second video stream at the first speed, and playing the third video stream and the fourth video stream at the second speed.

In a possible design manner of the fourth aspect, in a case that the first speed is less than a first preset speed, playing duration for playing the first video stream is greater than capturing duration for capturing all the first preview images captured by the first camera, and playing duration for playing the second video stream is greater than capturing duration for capturing all the second preview images by the second camera; in a case that the first speed is equal to the first preset speed, the playing duration for playing the first video stream is equal to the capturing duration for capturing all the first preview images captured by the first camera, and the playing duration for playing the second video stream is equal to the capturing duration for capturing all the second preview images by the second camera; and in a case that the first speed is greater than the first preset speed, the playing duration for playing the first video stream is less than the capturing duration for capturing all the first preview images captured by the first camera, and the playing duration for playing the second video stream is less than the capturing duration for capturing all the second preview images by the second camera; and in a case that the second speed is less than the first preset speed, playing duration for playing the third video stream is greater than capturing duration for capturing all the third preview images captured by the first camera, and playing duration for playing the fourth video stream is greater than capturing duration for capturing all the fourth preview images by the second camera; in a case that the second speed is equal to the first preset speed, the playing duration for playing the third video stream is equal to the capturing duration for capturing all the third preview images captured by the first camera, and the playing duration for playing the fourth video stream is equal to the capturing duration for capturing all the fourth preview images by the second camera; and in a case that the second speed is greater than the first preset speed, the playing duration for playing the third video stream is less than the capturing duration for capturing all the third preview images captured by the first camera, and the playing duration for playing the fourth video stream is less than the capturing duration for capturing all the fourth preview images by the second camera.

In another possible design manner of the fourth aspect, the first screen includes a first preset control, the first preset control is used to trigger the electronic device to display a plurality of speed options, and each speed option corresponds to one video playback speed.

When the computer instruction is executed by the processor, the electronic device is enabled to perform the following steps: displaying the plurality of speed options on the first screen in response to a tap operation on the first preset control by the user, where the first operation is a select operation by the user on a first speed option in the plurality of speed options, and the first speed option corresponds to the second speed.

In another possible design manner of the fourth aspect, in a case that the first speed is not equal to a second preset speed, the first screen further includes a second preset control; and; in a case that the second speed is not equal to the second preset speed, the second screen further includes the second preset control; where the second preset control is used to trigger adjustment to play the recorded video at the second preset speed.

In another possible design manner of the fourth aspect, in a case that the first speed is not equal to a second preset speed, the first screen further includes a third preset control; and in a case that the second speed is not equal to the second preset speed, the second screen further includes the third preset control. The third preset control is used to trigger to terminate video recording.

In another possible design manner of the fourth aspect, when the computer instruction is executed by the processor, the electronic device is enabled to perform the following steps: displaying a fourth screen, where the fourth screen is a viewfinder screen during video recording, the fourth screen includes a fifth preview image captured by the first camera and a sixth preview image captured by the second camera, the fourth screen further includes a third icon, and the third icon is used to indicate that the electronic device is to play a recorded video at the second preset speed; receiving a fifth operation by the user on the fourth screen, where the fifth operation is used to trigger adjustment to play the recorded video at the first speed; and displaying the first screen in response to the fifth operation.

In another possible design manner of the fourth aspect, when the computer instruction is executed by the processor, the electronic device is enabled to perform the following steps: if the first speed is less than the first preset speed, performing frame insertion processing on all the first preview images captured by the first camera, to obtain the first video stream including the plurality of frames of the first preview images, and performing frame insertion processing on all the second preview images captured by the second camera, to obtain the second video stream including the plurality of frames of the second preview images; and if the first speed is greater than the first preset speed, performing frame extraction processing on all the first preview images captured by the first camera, to obtain the first video stream including the plurality of frames of the first preview images, and performing frame extraction processing on all the second preview images captured by the second camera, to obtain the second video stream including the plurality of frames of the second preview images; if the second speed is less than the first preset speed, performing frame insertion processing on all the third preview images captured by the first camera, to obtain the third video stream including the plurality of frames of the third preview images, and performing frame insertion processing on all the fourth preview images captured by the second camera, to obtain the fourth video stream including the plurality of frames of the fourth preview images; and if the second speed is greater than the first preset speed, performing frame extraction processing on all the third preview images captured by the first camera, to obtain the third video stream including the plurality of frames of the third preview images, and performing frame extraction processing on all the fourth preview images captured by the second camera, to obtain the fourth video stream including the plurality of frames of the fourth preview images; and generating the first video file including the first video stream, the second video stream, the third video stream, and the fourth video stream.

In another possible design manner of the fourth aspect, when the computer instruction is executed by the processor, the electronic device is enabled to perform the following steps: in response to the first operation, if the first speed is less than the first preset speed, performing frame insertion processing on all the first preview images captured by the first camera, to obtain the first video stream including the plurality of frames of the first preview images, and performing frame insertion processing on all the second preview images captured by the second camera, to obtain the second video stream including the plurality of frames of the second preview images; and if the first speed is greater than the first preset speed, performing frame extraction processing on all the first preview images captured by the first camera, to obtain the first video stream including the plurality of frames of the first preview images, and performing frame extraction processing on all the second preview images captured by the second camera, to obtain the second video stream including the plurality of frames of the second preview images; in response to the second operation, if the second speed is less than the first preset speed, performing frame insertion processing on all the third preview images captured by the first camera, to obtain the third video stream including the plurality of frames of the third preview images, and performing frame insertion processing on all the fourth preview images captured by the second camera, to obtain the fourth video stream including the plurality of frames of the fourth preview images; and if the second speed is greater than the first preset speed, performing frame extraction processing on all the third preview images captured by the first camera, to obtain the third video stream including the plurality of frames of the third preview images, and performing frame extraction processing on all the fourth preview images captured by the second camera, to obtain the fourth video stream including the plurality of frames of the fourth preview images; and generating the first video file including the first video stream, the second video stream, the third video stream, and the fourth video stream.

In another possible design manner of the fourth aspect, when the computer instruction is executed by the processor, the electronic device is enabled to perform the following steps: if the first speed is less than the first preset speed and the second speed is greater than the first preset speed, adding a plurality of preset video frames between the first video stream and the third video stream, and adding a plurality of preset video frames between the second video stream and the fourth video stream; and if the first speed is greater than the first preset speed and the second speed is less than the first preset speed, adding a plurality of preset video frames between the first video stream and the third video stream, and adding a plurality of preset video frames between the second video stream and the fourth video stream.

According to a fifth aspect, an embodiment of this application provides a chip system, where the chip system is applied to an electronic device including a display and a memory; the chip system includes one or more interface circuits and one or more processors; the interface circuit and the processor are interconnected through lines; the interface circuit is configured to receive a signal from the memory of the electronic device and send the signal to the processor, where the signal includes a computer instruction stored in the memory; and when the processor executes the computer instruction, the electronic device performs the method described in the first aspect, the second aspect, and any one of the possible design manners.

According to a sixth aspect, this application provides a computer storage medium, where the computer storage medium includes a computer instruction, and when the computer instruction is run on an electronic device, the electronic device is enabled to perform the method described in the first aspect, the second aspect, and any one of the possible design manners.

According to a seventh aspect, this application provides a computer program product, where when the computer program product is run on a computer, the computer is enabled to perform the method described in the first aspect, the second aspect, and any one of the possible design manners.

It can be understood that for beneficial effects that can be achieved by the electronic device described in the third aspect and the fourth aspect, the chip system described in the fifth aspect, the computer storage medium described in the sixth aspect, and the computer program described in the seventh aspect, reference may be made to the beneficial effects in the first aspect, the second aspect, and any one of the possible design manners, and details are not repeated herein.

BRIEF DESCRIPTION OF DRAWINGS

FIG. 15A and FIG. 15B are a flowchart of another video processing method according to an embodiment of this application;

DETAILED DESCRIPTION OF EMBODIMENTS

The terms "first" and "second" mentioned below are merely used for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, "plurality" means at least two, unless otherwise specified.

The following further describes implementations of the embodiments of this application in detail with reference to the accompanying drawings. In order to facilitate understanding of the video processing method provided by the embodiments of this application, the following uses the electronic device being a mobile phone as an example, and combines a beauty adjustment function shown in (a) to (c) of FIG. 1 to illustrate disadvantages of conventional technical means.

Figure 1:
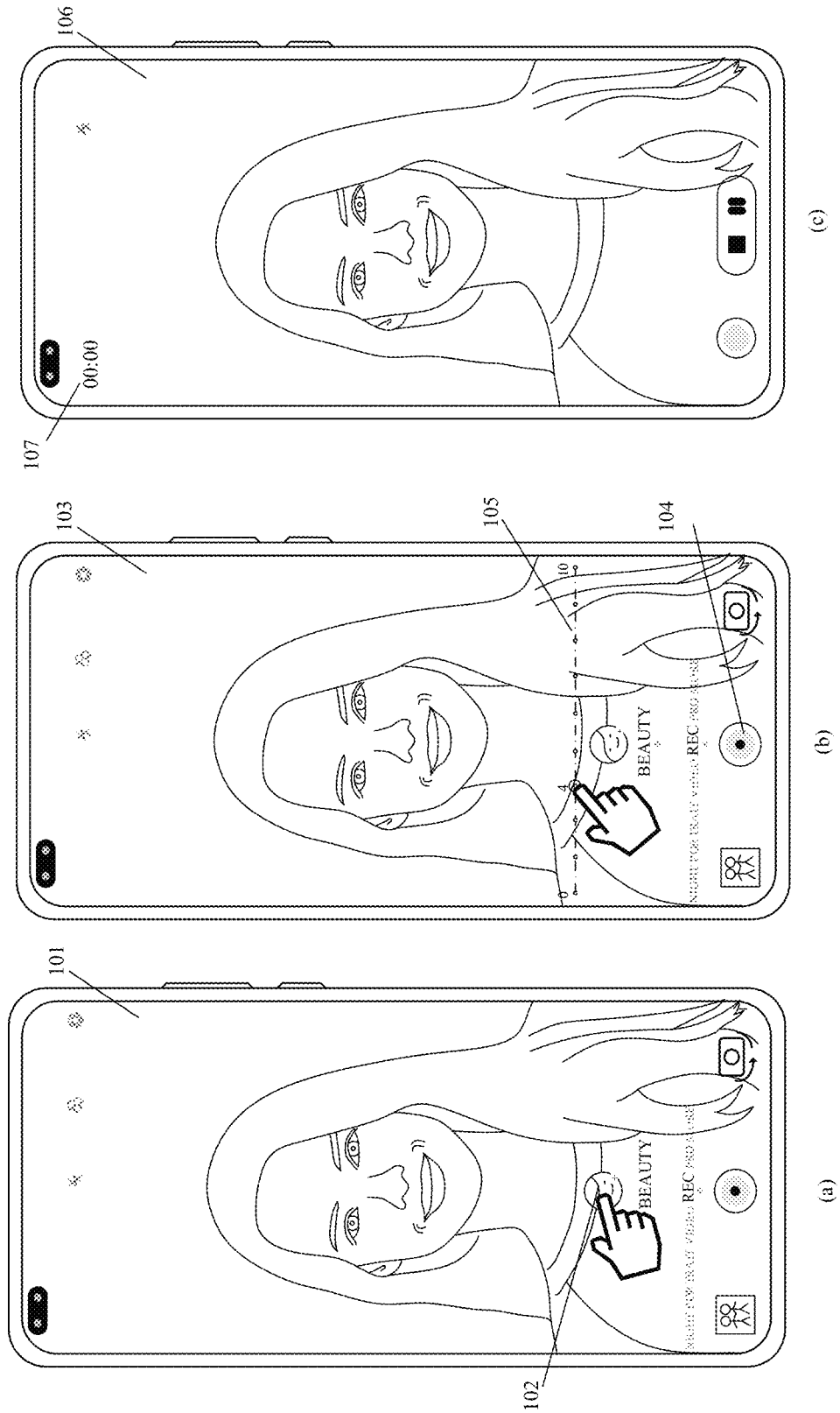
FIG. 1 is a schematic diagram of a before-recording screen on a mobile phone according to an embodiment of this application.

Under the conventional technology, before video shooting, the mobile phone may display a before-shooting screen 101 shown in (a) of FIG. 1. The before-shooting screen 101 includes a beauty icon 102. The mobile phone may receive a trigger operation (for example, a tap operation) on the beauty icon 102 by the user. In response to the trigger operation on the beauty icon 102 by the user, the mobile phone may display a before-shooting screen 103 shown in (b) of FIG. 1, where the before-shooting screen 103 includes a start shooting button 104 and a beauty level adjustment bar 105. The mobile phone may receive a trigger operation (for example, a slide operation) on the beauty level adjustment bar 105 by the user, and may also receive a trigger operation (for example, a tap operation) on the start shooting button 104 by the user. In response to the trigger operation on the beauty level adjustment bar 105 by the user, the mobile phone may select a corresponding beauty level (for example, a beauty level 4 shown in (b) of FIG. 1). Then, in response to the trigger operation on the start shooting button 104 by the user, the mobile phone may display an on-shooting screen 106 shown in (c) of FIG. 1, and a shooting time 107 (for example, 00:00) is displayed in the on-shooting screen 106. Different from the before-shooting screen 101 and the before-shooting screen 103, the on-shooting screen 106 includes no beauty icon, and therefore, beauty adjustment cannot be implemented for some video frames during video shooting.

(a) of FIG. 1, (b) of FIG. 1, and (c) of FIG. 1 are described by using the beauty adjustment function. Similarly, in the conventional technologies, functions such as adding filters and turning on flash can be usually turned on before video shooting, to implement processing only on the entire video. Setting filters, turning on flash, and the like cannot be implemented for part of video frames.

To sum up, in the conventional technical means, setting and processing for part of video frames cannot be implemented during video shooting, featuring extremely low flexibility of video processing.

In some cases, video processing also includes playback at an accelerated or slowed-down speed. In the conventional technical means, processing is usually performed by professionals or by using professional processing software after video shooting is completed, so as to implement variable-speed-based playback. This imposes a relatively high professional requirement, and ordinary users cannot perform simple operations to implement variable-speed-based playback of part of video frames of a shot video.

An embodiment of this application provides a video processing method, and the method may be applied to an electronic device, where the electronic device includes a camera and can provide a video recording function. During video recording, the electronic device can adjust a playback speed of a recorded video in response to an operation by the user. Then, in the process of playing the recorded video, the electronic device can play, at different speeds, video streams recorded before and after adjustment. In this way, according to an operation by a user during video recording, the electronic device can accelerate or slow down (hereinafter collectively referred to as variable speed) playback of part of video frames, thereby improving flexibility of playback. In addition, the user does not need to perform complex operations, thereby reducing difficulties in implementing variable-speed-based playback.

For example, the electronic device in the embodiments of this application may be a device including a folding screen, for example, a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistants (personal digital assistant, PDA), and an augmented reality (augmented reality, AR)\virtual reality (virtual reality, VR) device, and a specific form of the electronic device is not particularly limited in the embodiments of this application.

The following further describes implementations of the embodiments of this application in detail with reference to the accompanying drawings.

Figure 2:
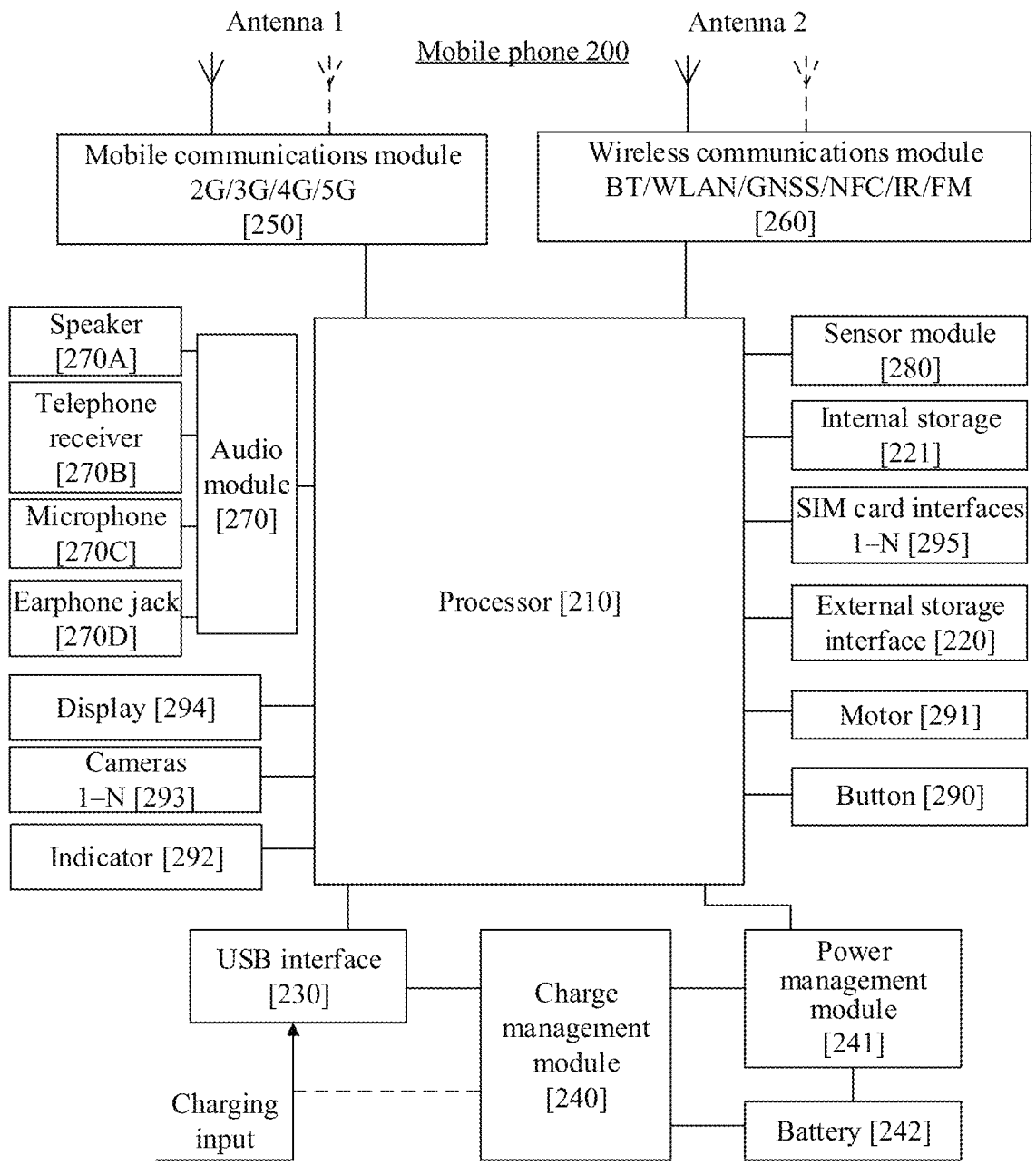
FIG. 2 is a schematic diagram of a hardware structure of a mobile phone according to an embodiment of this application.

Referring to FIG. 2, FIG. 2 is a schematic structural diagram of an electronic device according to an embodiment of this application. A structure of the electronic device is described below by using the electronic device being a mobile phone as an example. As shown in FIG. 2, the mobile phone 200 may include a processor 210, an external storage interface 220, an internal storage 221, a universal serial bus (universal serial bus, USB) interface 230, a charge management module 240, a power management module 241, a battery 242, an antenna 1, an antenna 2, a mobile communications module 250, a wireless communications module 260, an audio module 270, a speaker 270A, a telephone receiver 270B, a microphone 270C, an earphone jack 270D, a sensor module 280, a button 290, a motor 291, an indicator 292, a camera 293, a display 294, a subscriber identification module (subscriber identification module, SIM) card interface 295, and the like.

It can be understood that the structure illustrated in this embodiment does not constitute any specific limitation on the electronic device. In some other embodiments, the electronic device may include more or fewer components than those shown in the figure, or combine some components, or split some components, or have different component arrangements. The components shown in the figure may be implemented in hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural network processing unit (neural network processing unit, NPU), and/or the like. Different processing units may be separate components or integrated in one or more processors.

A controller may be a nerve center and command center of the electronic device. The controller may generate an operation control signal according to an instruction operation code and a timing signal, to complete control of instruction fetching and execution.

A memory may be further provided in the processor 210 for storing instructions and data. In some embodiments, the memory in the processor 210 is a cache. The cache may store instructions or data recently used or repeatedly used by the processor 210. If the processor 210 needs to use the instruction or data again, the processor 210 can directly invoke the instruction or data from the cache. This avoids repeated access and reduces a waiting time of the processor 210, thereby improving efficiency of a system.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like.

It can be understood that an interface connection relationship between the modules shown in this embodiment is merely an example for description, and does not constitute any limitation on the structure of the electronic device. In some other embodiments, the electronic device may alternatively use an interface connection manner different from those in the foregoing embodiment or a combination of a plurality of interface connection manners.

The charge management module 240 is configured to receive a charging input from a charger. The charger may be a wireless charger or a wired charger. The power management module 241 is configured to connect to the battery 242, the charge management module 240, and the processor 210. The power management module 241 receives an input from the battery 242 and/or the charge management module 240, and supplies power to the processor 210, the internal storage 221, the external storage, the display 294, the camera 293, the wireless communications module 260, and the like.

A wireless communication function of the electronic device may be implemented by using the antenna 1, the antenna 2, the mobile communications module 250, the wireless communications module 260, the modem processor, the baseband processor, and the like.

The antenna 1 and the antenna 2 are configured to transmit and receive electromagnetic wave signals. Each antenna in the electronic device may be configured to cover one or more communication frequency bands. Different antennas may be further multiplexed to improve utilization of the antennas. For example, the antenna 1 may multiplex a diversity antenna used in a wireless local area network. In some other embodiments, the antenna may be used in combination with a tuning switch.

The mobile communications module 250 may provide wireless communication solutions for use on the electronic device, including 2G, 3G, 4G, 5G, and the like. The mobile communications module 250 may include at least one filter, a switch, a power amplifier, a low noise amplifier (low noise amplifier, LNA), and the like.

The wireless communications module 260 may provide wireless communication solutions for the electronic device, including wireless local area network (wireless local area networks, WLAN) (for example, wireless fidelity (wireless fidelity, Wi-Fi) network), Bluetooth (bluetooth, BT), global navigation satellite system (global navigation satellite system, GNSS), frequency modulation (frequency modulation, FM), near field communication (near field communication, NFC), infrared (infrared, IR) technology, and the like.

In some embodiments, the wireless communications module 360 may include an NFC chip, and the NFC chip may include an NFC controller (NFC controller, NFCC). The NFC chip can perform processing such as amplification, analog-to-digital conversion, digital-to-analog conversion, and storage on signals. The NFCC is responsible for physical transmission of data through the antenna. The NFCC may be included in the NFC chip of the electronic device. The device host (device host, DH) is responsible for managing the NFCC, such as initialization, configuration, and power management. The DH may be included in the main chip of the electronic device, or may be integrated with the processor of the electronic device.

In some embodiments, in the electronic device, the antenna 1 is coupled to the mobile communications module 250, and the antenna 2 is coupled to the wireless communications module 260, so that the electronic device can communicate with a network and other devices by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR technology, and/or the like.

The electronic device implements a display function by using the GPU, the display 294, the application processor, and the like. The GPU is an image processing microprocessor and connects to the display 294 and the application processor. The GPU is configured to perform mathematical and geometric computation for graphics rendering. The processor 210 may include one or more GPUs, which execute program instructions to generate or change display information.

The display 294 is configured to display images, videos, and the like. The display 294 includes a display panel. The display panel may use a liquid crystal display (liquid crystal display, LCD), an organic light-emitting diode (organic light-emitting diode, OLED), an active-matrix organic light-emitting diode or an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diodes, QLED), and the like.

The electronic device may implement a photographing function by using the ISP, the camera 293, the video codec, the GPU, the display 294, the application processor, and the like. The ISP is configured to process data fed back by the camera 293. For example, during photographing, the shutter is turned on, light is transmitted to a photosensitive element of the camera through the lens, light signals are converted into electrical signals, and the photosensitive element of the camera transmits the electrical signals to the ISP for processing, so as to convert the signals into an image visible to naked eyes. The ISP may also perform algorithm optimization on noise, brightness, and skin tone of the image. The ISP may also optimize parameters such as exposure and color temperature of a shooting scene. In some embodiments, the ISP may be disposed in the camera 293.

The camera 293 is configured to capture a static image or a video. An optical image of an object is generated by using a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts light signals into electrical signals, and then transmits the electrical signals to the ISP to convert the signals into digital image signals. The ISP outputs the digital image signals to the DSP for processing. The DSP converts the digital image signals into image signals in standard RGB, YUV, or other formats. In some embodiments, the electronic device may include one or N cameras 293, where N is a positive integer greater than 1.

The N cameras 293 may include one or more of the following cameras: a main camera, a telephoto camera, a wide-angle camera, an ultra-wide-angle camera, a macro camera, a fisheye camera, an infrared camera, a depth camera, and a black and white camera.

(1) Main Camera

The main camera features large light intake, high resolution, and a centered field of view. The main camera usually serves as a default camera of the electronic device (such as a mobile phone). That is, in response to an operation of starting the "camera" application by the user, the electronic device (such as a mobile phone) may start the main camera by default, and display an image captured by the main camera on a preview screen. The view range of the camera is determined by a field of view (field of view, FOV) of the camera. A larger FOV of the camera indicates a larger field of view of the camera.

(2) Telephoto Camera

The telephoto camera has a longer focal length and can be used to shoot a subject farther away from the mobile phone (that is, a distant object). However, the telephoto camera allows relatively small light intake. Using the telephoto camera to shoot images in low-light scenes may affect image quality due to insufficient light intake. In addition, the telephoto camera has a relatively small field of view, and is not suitable for shooting images of relatively large scenes, that is, not suitable for shooting relatively large subjects (such as buildings or landscapes).

(3) Wide-Angle Camera

The wide-angle camera has a relatively large field of view and is suitable for shooting relatively large subjects (such as buildings or landscapes). However, the wide-angle camera has a relatively low resolution. In addition, a photographed subject presented in an image photographed by using the wide-angle camera is easily distorted, that is, the image of the photographed object is easily deformed.

(4) Ultra-Wide-Angle Camera

The ultra-wide-angle camera is the same type of camera as the wide-angle camera; or, compared with the wide-angle camera, the ultra-wide-angle camera has a larger field of view.

(5) Macro Camera

The macro camera is a special lens used for macro photography, mainly used to shoot very subtle objects, such as flowers and insects. Microscopic scenes that people generally cannot see can be photographed by using a macro lens to shoot small natural scenes.

(6) Fisheye Camera

The fisheye camera is an auxiliary lens with a focal length of 16 mm or less and a field of view close to or equal to 180°. The fisheye camera may be considered as an extreme wide-angle camera. A front lens of such camera is very short in diameter and protrudes to the front of the lens in a parabolic shape, quite similar to eyes of a fish, and therefore is called fisheye camera. An image photographed by the fisheye camera is very different from an image of the real world in people's eyes; therefore, the fisheye camera is generally used to obtain special shooting effects.

(7) Infrared Camera

The infrared camera features a large spectral range. For example, the infrared camera can sense not only visible light, but also infrared light. In dark light scenes (with weak visible light), the infrared camera can be used to photograph an image by using a characteristic that the infrared camera is able to sense infrared light, thereby improving image quality.

(8) Depth Camera

Time of flight (time of flight, ToF) cameras or structured light cameras are all depth cameras. The depth camera being a ToF camera is used as an example. The ToF camera has the characteristics of accurately acquiring depth information of a photographed subject. The ToF camera is applicable to scenarios such as face recognition.

(9) Black and White Camera

The black and white camera has no filters. Therefore, compared with the color camera, the black and white camera has relatively large light intake. However, images photographed by the black and white camera can only show different levels of grayscale, and cannot show true colors of the subject. It should be noted that the foregoing main camera, telephoto camera, and wide-angle camera are all color cameras.

The digital signal processor is configured to process digital signals, including digital image signals and other digital signals. For example, when the electronic device is performing frequency selection, the digital signal processor is configured to perform Fourier transform or the like on energy of frequencies.

The video codec is configured to compress or decompress a digital video. The electronic device may support one or more types of video codecs. In this way, the electronic device can play or record videos in a plurality of encoding formats, for example, moving picture experts group (moving picture experts group, MPEG) 1, MPEG 2, MPEG 3, and MPEG 4.

The NPU is a neural network (neural-network, NN) computing processor. By learning from structures of biological neural networks (for example, from the mode of transmission between neurons in a human brain), the NPU can quickly process input information and perform self-learning continuously. With the NPU, applications such as intelligent cognition of the electronic device can be implemented, such as image recognition, face recognition, speech recognition, and text understanding.

The external storage interface 220 may be configured to connect an external memory card, for example, a micro SD card, to extend a storage capacity of the electronic device. The external memory card communicates with the processor 210 by using the external storage interface 220, to implement a data storage function. For example, files such as music and videos are stored in the external memory card.

The internal storage 221 may be configured to store computer executable program code, where the executable program code includes instructions. The processor 210 executes various functional applications of the electronic device and data processing by executing the instructions stored in the internal storage 221. For example, in response to an operation of expanding the display 294 by the user, the processor 210 may display different content on the display 284 by executing the instructions stored in internal storage 221. The internal storage 221 may include a program storage area and a data storage area. The program storage area may store an operating system, an application program required by at least one function (for example, a sound playback function or an image playback function), and the like. The data storage area may store data (for example, audio data or a phone book) and the like that are created during use of the electronic device. In addition, the internal storage 221 may include a high-speed random access memory, and may further include a nonvolatile memory, for example, at least one magnetic disk storage device, flash memory device, or universal flash storage (universal flash storage, UFS).

The electronic device may implement an audio function, for example, music playing or recording, by using the audio module 270, the speaker 270A, the telephone receiver 270B, the microphone 270C, the earphone jack 270D, the application processor, and the like.

The button 290 includes a power key, a volume key, and the like. The button 290 may be a mechanical key, or may be a touch button. The electronic device may receive a button input and generate a button signal input related to user settings and function control of the electronic device. The motor 291 may generate vibrating alerts. The motor 291 may be used to vibrate to provide alerts for incoming calls, or may be used to vibrate to provide touch feedback. The indicator 292 may be an indicator light, and may be used to indicate a charging status and power change, or may be used to indicate messages, missed calls, notifications, and the like. The SIM card interface 295 is configured to connect a SIM card. The SIM card may be inserted into the SIM card interface 295 or removed from the SIM card interface 295 to implement contact with or separation from the electronic device. The electronic device may support one or N SIM card interfaces, where N is a positive integer greater than 1.

The methods in the following embodiments can be all implemented in the electronic device 200 having the foregoing hardware structure, and the methods in the embodiments of this application are described below by using the electronic device 200 being a mobile phone as an example.

The video processing method provided in the embodiment of this application can be applied to a single-cam recording scenario and a multi-cam recording scenario. Single-cam recording is a manner in which only one camera is turned on at one moment to photograph an image, and the image photographed by the one camera is displayed on a viewfinder screen of the mobile phone. Correspondingly, multi-cam recording is a manner in which at least two cameras are turned on at one moment to photograph images, and the images photographed by the at least two cameras are displayed on a viewfinder screen of the mobile phone.

The following describes the video processing method provided by the embodiment of this application separately in the single-cam recording scenario and the multi-cam recording scenario.

Scenario 1: Single-Cam Recording Scenario

Figure 3:
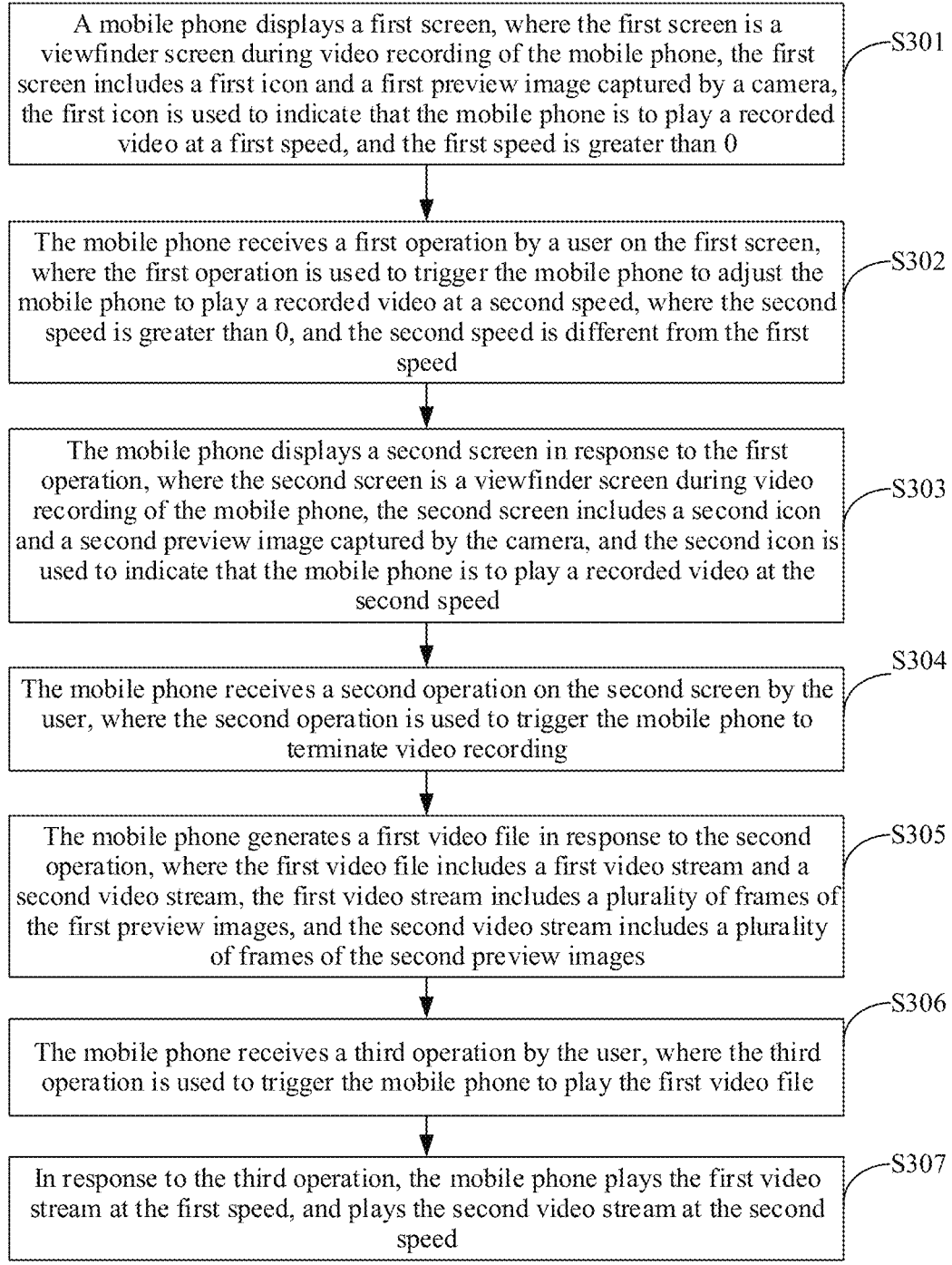
FIG. 3 is a flowchart of a video processing method according to an embodiment of this application.

An embodiment of this application provides a video processing method, and the method may be applied to a mobile phone, where the mobile phone includes a camera and can provide a video recording function. As shown in FIG. 3, the method includes S301 to S307.

S301: The mobile phone displays a first screen, where the first screen is a viewfinder screen during video recording of the mobile phone, the first screen includes a first icon and a first preview image captured by the camera, the first icon is used to indicate that the mobile phone is to play a recorded video at a first speed, and the first speed is greater than 0.

Figure 4:
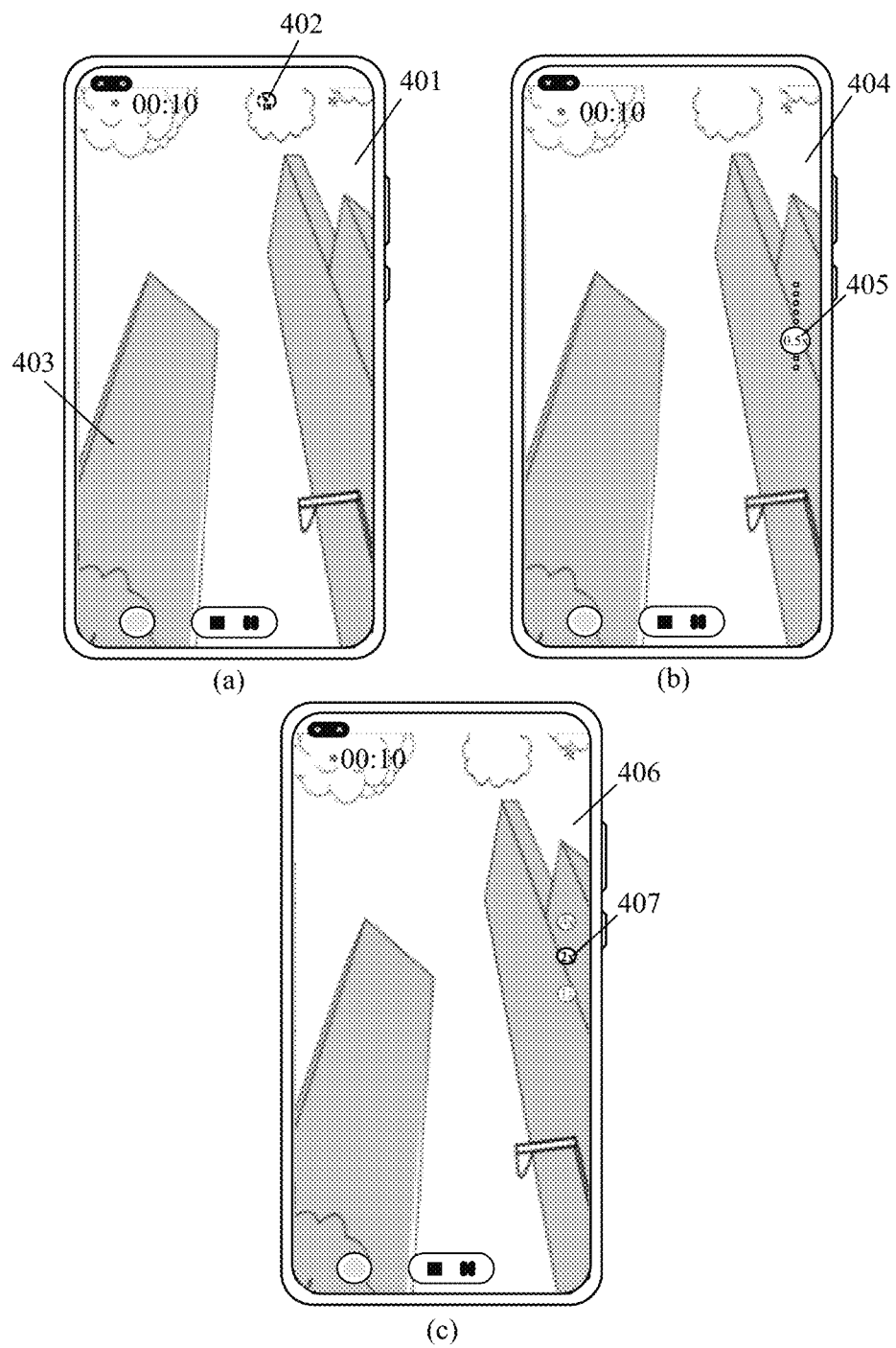
FIG. 4 is a schematic diagram of a recording screen on a mobile phone according to an embodiment of this application.

For example, the mobile phone may display a first screen 401 shown in (a) of FIG. 4, a first screen 404 shown in (b) of FIG. 4, or a first screen 406 shown in (c) of FIG. 4. (a) of FIG. 4 is used as an example. Assuming that a rear-facing camera of the mobile phone is used as a preview camera, the first screen 401 is a viewfinder screen during video recording of the mobile phone, and the first screen 401 includes a first icon 402 and a first preview image 403 captured by the camera (for example, the rear-facing camera) The first icon 402 is used to indicate that the mobile phone is to play a recorded video at 1× speed. It should be understood that the 1× speed is usually a default normal playback speed of the mobile phone, and may also be referred to as a first preset speed herein. Broadly, the first preset speed may be in a speed range of 1× speed or close to 1× speed. For example, the first preset speed may be a speed value ranging from 0.9× to 1.1×. Alternatively, the first preset speed is the foregoing speed range. For example, the first preset speed may be a speed range from 0.9× to 1.1×.

It should be noted that a shape and a position of the first icon are not limited to the first icon 403 shown in (a) of FIG. 4. For example, the first icon may also be a first icon 405 shown in (b) of FIG. 4 or a highlighted first icon 407 shown in (c) of FIG. 4.

For example, the first icon 402 shown in (a) of FIG. 4 indicates that the mobile phone is to play the recorded video at 1× speed (which is "1×"), that is, the first speed is equal to 1× speed. The first icon 405 shown in (b) of FIG. 4 is used to indicate that the mobile phone is to play the recorded video at 0.5× speed (which is "0.5×"), that is, the first speed is equal to 0.5× speed. The first icon 407 shown in (c) in FIG. 4 is used to indicate that the mobile phone is to play the recorded video at 2× speed (which is "2×"), that is, the first speed is equal to 2× speed. In addition, the first speed being greater than 0 and less than 1× speed is a slowed-down playback speed; the first speed being greater than 1× speed is an accelerated playback speed; and the first speed being equal to 1× speed is a normal playback speed.

S302: The mobile phone receives a first operation by the user on the first screen, where the first operation is used to trigger the mobile phone to adjust the mobile phone to play a recorded video at a second speed, where the second speed is greater than 0, and the second speed is different from the first speed.

It should be understood that the speeds (for example, the first speed or the second speed) herein are all values greater than 0.

In this embodiment of this application, adjacent playback speeds before and after adjustment are different. For example, the second speed is different from the first speed. Similarly, the second speed being greater than 1× speed is an accelerated playback speed; the second speed being greater than 0 and less than 1× speed is a slowed-down playback speed; and the second speed being equal to 1× speed is a normal playback speed.

In this embodiment of this application, a specific form of the first operation is not limited.

Figure 5:
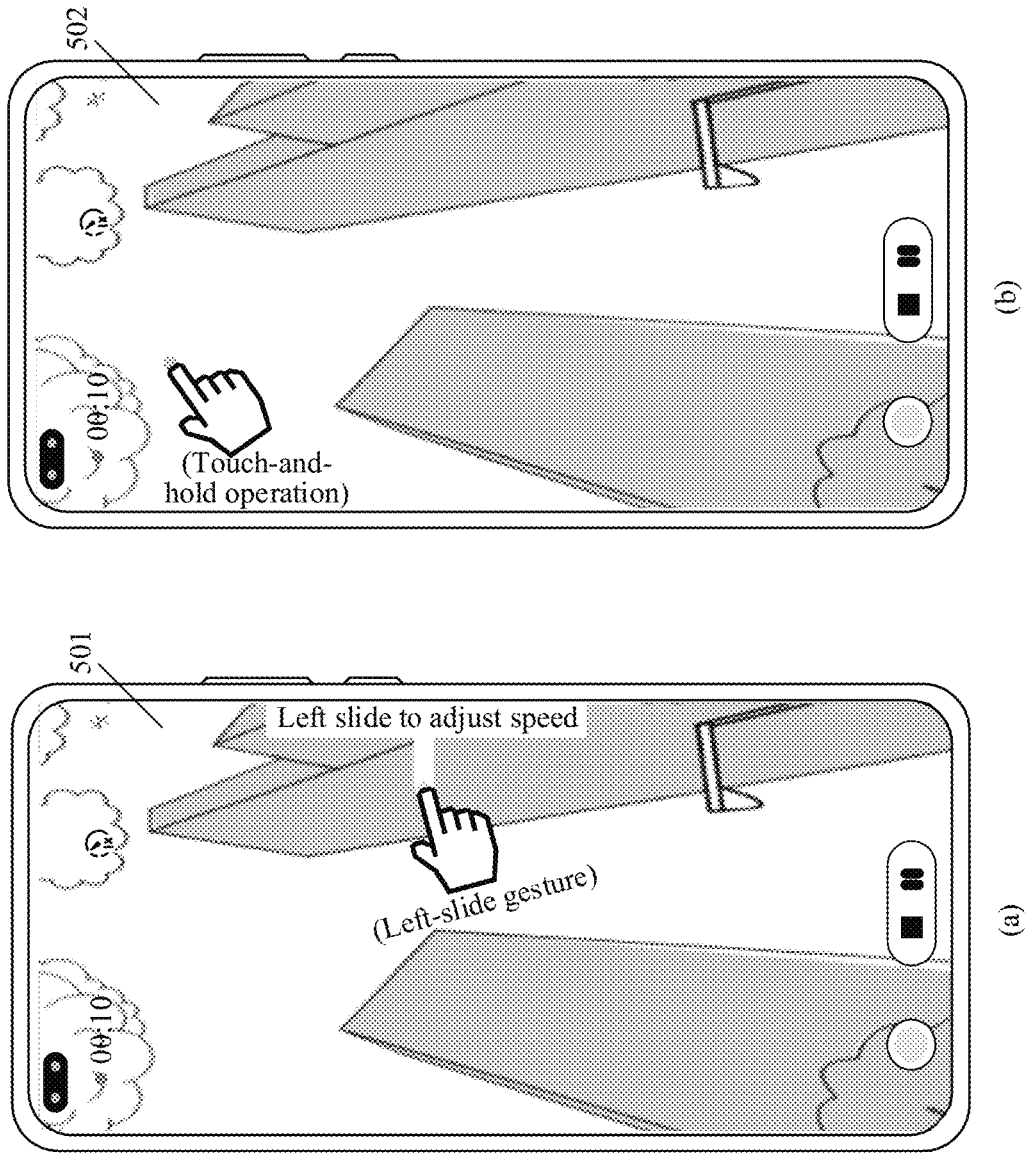
FIG. 5 is a schematic diagram of another recording screen on a mobile phone according to an embodiment of this application.

In some embodiments, the first operation may be a first preset gesture, or a touch-and-hold operation on a region, displaying no control or icon, of the first screen. For example, the first operation may be a left slide gesture in a first screen 501 shown in (a) of FIG. 5, that is, the first preset gesture is a left slide gesture. During left sliding, the mobile phone may determine a to-be-adjusted-to second speed based on a sliding distance. For another example, the first operation may be a touch-and-hold operation on a first screen 502 shown in (b) of FIG. 5. During touch-and-hold, the mobile phone may determine a to-be-adjusted-to second speed based on a touch-and-hold time.

Figure 6:
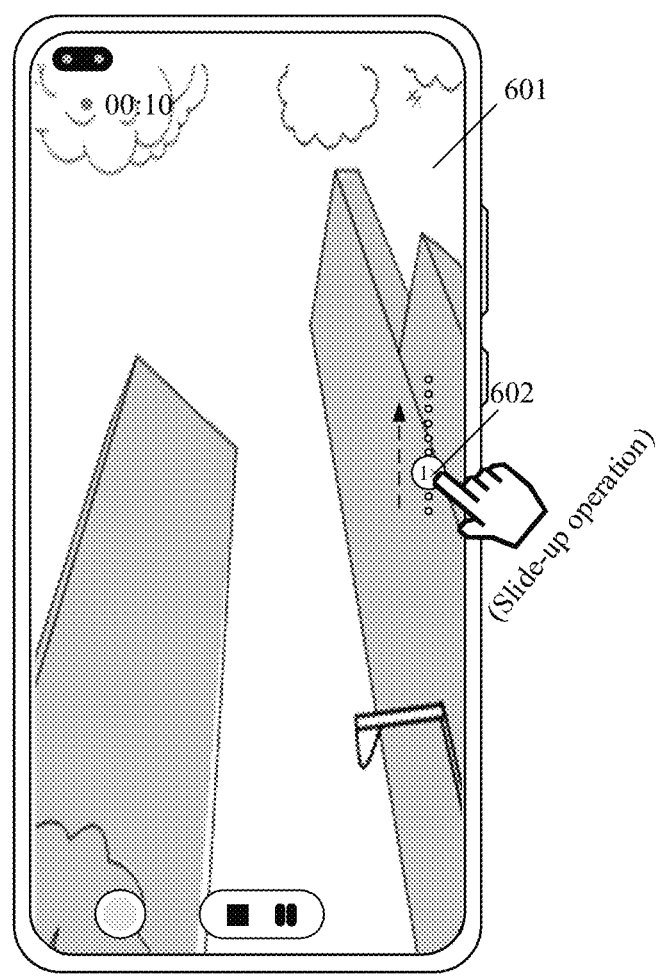
FIG. 6 is a schematic diagram of another recording screen on a mobile phone according to an embodiment of this application.

In some other embodiments, the first screen includes a speed adjustment control, and the first operation may be an operation (for example, a tap operation or a slide operation) that triggers the speed adjustment control. For example, the first operation is a slide-up (denoted by a dashed arrow) operation on the speed adjustment control 602 in the first screen 601 shown in FIG. 6.

In some other embodiments, the first screen may include a first preset control, where the first preset control is used to trigger the mobile phone to display a plurality of speed options, and each speed option corresponds to one video playback speed. The mobile phone may receive a tap operation on the first preset control by the user. The mobile phone may display the plurality of speed options only in response to the tap operation on the first preset control by the user. In this way, displaying of the plurality of speed options is triggered only when speed adjustment is required, so that the user can select a to-be-adjusted-to speed. In this way, when speed adjustment is not required, less element content is displayed on the first screen, and the user can be guided to select a speed in a targeted manner.

Figure 7:
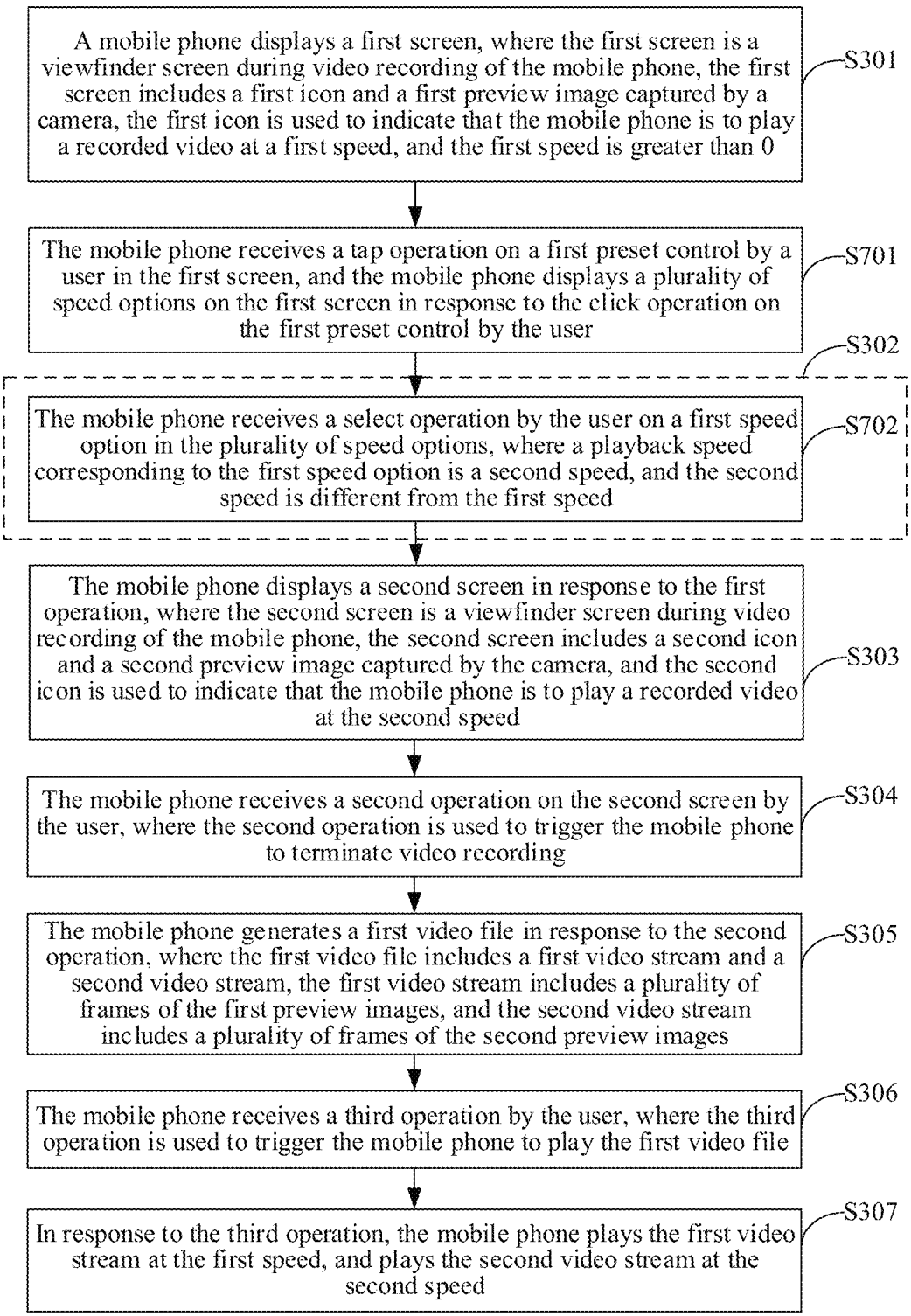
FIG. 7 is a flowchart of another video processing method according to an embodiment of this application.

In this embodiment, the first operation is a select operation for the user to select, from the plurality of speed options, a speed option corresponding to the second speed. Specifically, as shown in FIG. 7, before S302, S701 is further included, and S302 further includes S702.

S701: The mobile phone receives a tap operation on the first preset control by the user in the first screen. The mobile phone displays the plurality of speed options on the first screen in response to the tap operation on the first preset control by the user.

Figure 8:
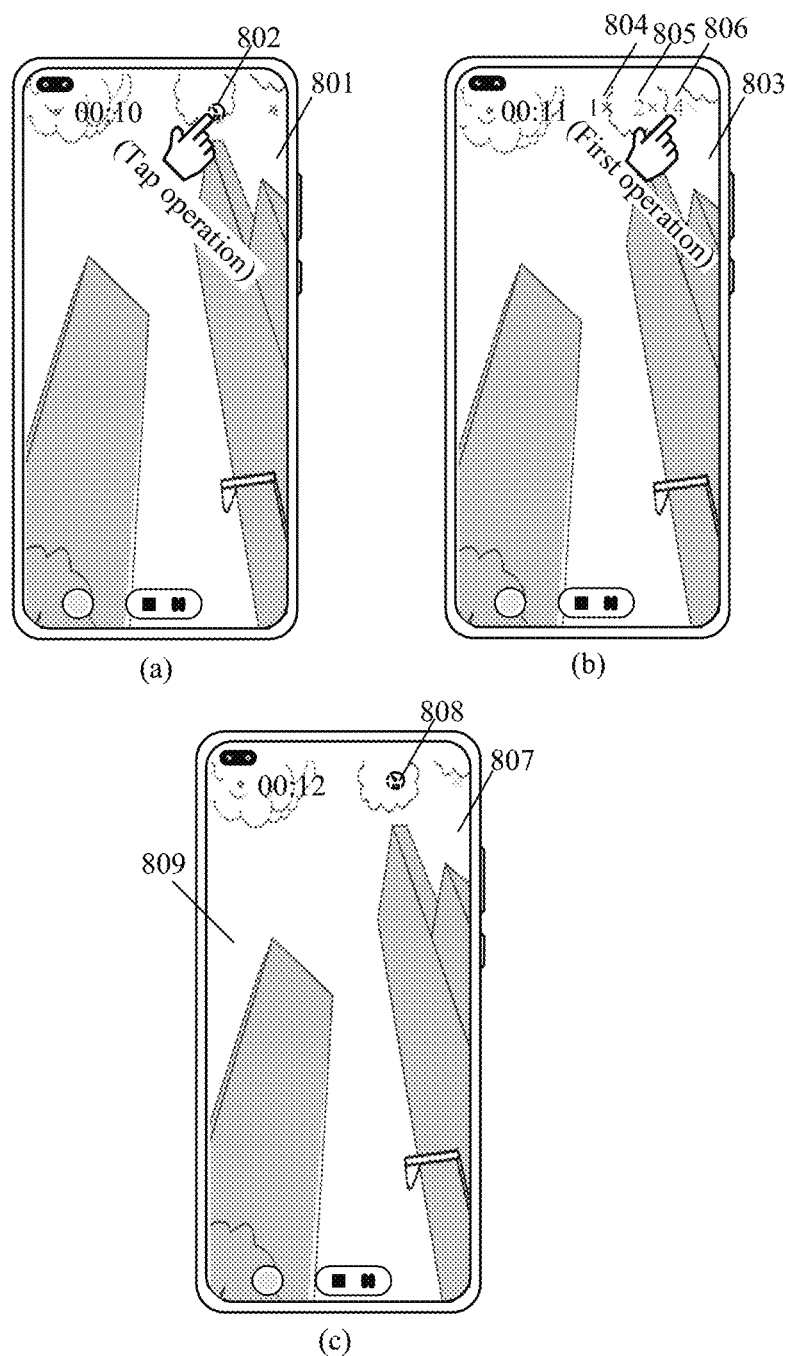
FIG. 8 is a schematic diagram of another recording screen on a mobile phone according to an embodiment of this application.

For example, the mobile phone may receive a tap operation by the user on a first preset control 802 in a first screen 801 shown in (a) of FIG. 8. In response to the tap operation on the first preset control by the user 802, the mobile phone displays a first screen 803 shown in (b) of FIG. 8. The first screen 803 includes the following plurality of speed options: a speed option 804, a speed option 805, and a speed option 806. A playback speed corresponding to the speed option 804 is 1× speed, a playback speed corresponding to the speed option 805 is 2× speed, and a playback speed corresponding to the speed option 806 is 4× speed. It should be noted that when the plurality of speed options are displayed, function icons around the plurality of speed options are hidden. For example, a flash icon is hidden. In this way, screen elements can be simplified, facilitating selection of the playback speed by the user.

S702: The mobile phone receives a select operation by the user on the first speed option in the plurality of speed options, where a playback speed corresponding to the first speed option is the second speed, and the second speed is different from the first speed.

The select operation may be a tap operation, a touch-and-hold operation, or the like.

For example, the first speed option is a speed option 806 shown in (b) of FIG. 8. The mobile phone may receive a tap operation by the user on the speed option 806 in the plurality of speed options (such as the speed option 804, the speed option 805, and the speed option 806) shown in (b) of FIG. 8. The speed option 806 corresponds to a playback speed being 4× speed, that is, the second speed is equal to 4× speed.

In the following embodiments, the methods in the embodiments of this application are mainly described by using an example in which the first operation is a select operation by the user on a speed option, corresponding to the second speed, in the plurality of speed options.

It should be noted that, in some embodiments, in order to simplify the screen elements, the first icon and the speed adjustment control may be a same screen element. For example, the speed adjustment control 602 in FIG. 6 may also be used as the first icon to indicate that the mobile phone is to play the recorded video at 1× speed. Alternatively, the first icon and the first preset control may be a same screen element. For example, the first preset control 802 in (a) of FIG. 8 may also be used as the first icon to indicate that the mobile phone is to play the recorded video at 1× speed.

S303: The mobile phone displays a second screen in response to the first operation, where the second screen is a viewfinder screen during video recording of the mobile phone, the second screen includes a second icon and a second preview image captured by the camera, and the second icon is used to indicate that the mobile phone is to play a recorded video at a second speed.

For example, the first speed option is a speed option 806 shown in (b) of FIG. 8. In response to a tap operation by the user on the speed option 806 in the plurality of speed options (for example, the speed option 804, the speed option 805, and the speed option 806) shown in (b) of FIG. 8, the mobile phone may display a second screen 807 shown in (c) of FIG. 8. The second screen 807 is a viewfinder screen during video recording of the mobile phone, and the second screen 807 includes a second icon 808 and a second preview image 809 captured by the camera. The second icon 808 is used to indicate that the mobile phone is to play the recorded video at 4× speed, that is, the second speed is equal to 4× speed.

So far, it should be noted that there is no essential difference between the second screen and the first screen, and both are viewfinder screens during video recording of the mobile phone. The difference lies in that a playback speed indicated by the second icon that is displayed in the second screen is the second speed, and a playback speed indicated by the first icon that is displayed on the first screen is the first speed. That is, the first screen is a viewfinder screen corresponding to the playback speed being the first speed. The second screen is a viewfinder screen corresponding to the playback speed being the second speed.

A form of the second icon is consistent with a form of the first icon in the foregoing description, and a position of the second icon is consistent with a position of the first icon in the foregoing description, thereby ensuring consistency of elements before and after speed adjustment. For description of the second icon, reference may be made to the foregoing description of the first icon, and details are not repeated herein.

It should be noted that both the second preview image and the first preview image in the foregoing description are preview images captured by the camera in real time. Specifically, the second preview image is a preview image captured in real time by the camera when the playback speed is the second speed, and the first preview image is a preview image captured in real time by the camera when the playback speed is the first speed. In practice, the second preview image may be the same as or different from the first preview image.

In some embodiments, in order to facilitate restoring to the second preset speed, when a playback speed indicated by the speed icon (for example, the first icon and the second icon) is not equal to the second preset speed, the viewfinder screen (for example, the first screen and the second screen) during video recording of the mobile phone further includes the second preset control. The second preset control is used to trigger the mobile phone to play the recorded video at the second preset speed. That is, the user operates the second preset control to trigger the mobile phone to restore the playback speed to the second preset speed. This can improve convenience of restoring to the second preset speed. It should be noted that the second preset speed is a default normal playback speed for the user. Generally, the second preset speed is equal to the first preset speed, and both are 1× speed. This case may be mainly described in this specification. In some applications that support video recording, a specific speed value (for example, 2× speed or 0.5× speed) may be set before video recording, and then the specific speed value is used as a speed value for playing the video. In such applications, the second preset speed may be the specific speed value, and in this case, the second preset speed may be different from the first preset speed.

For example, the second preset speed being 1× speed is used as an example. In a case that the playback speed indicated by the first icon is not equal to 1× speed (that is, the first speed is not equal to 1× speed), the first screen further includes the second preset control. In a case that the playback speed indicated by the second icon is not equal to 1× speed (that is, the second speed is not equal to 1× speed), the second screen further includes the second preset control. In response to a tap operation by the user on the second preset control, the mobile phone may make adjustment to play the recorded video at 1× speed.

Figure 9:
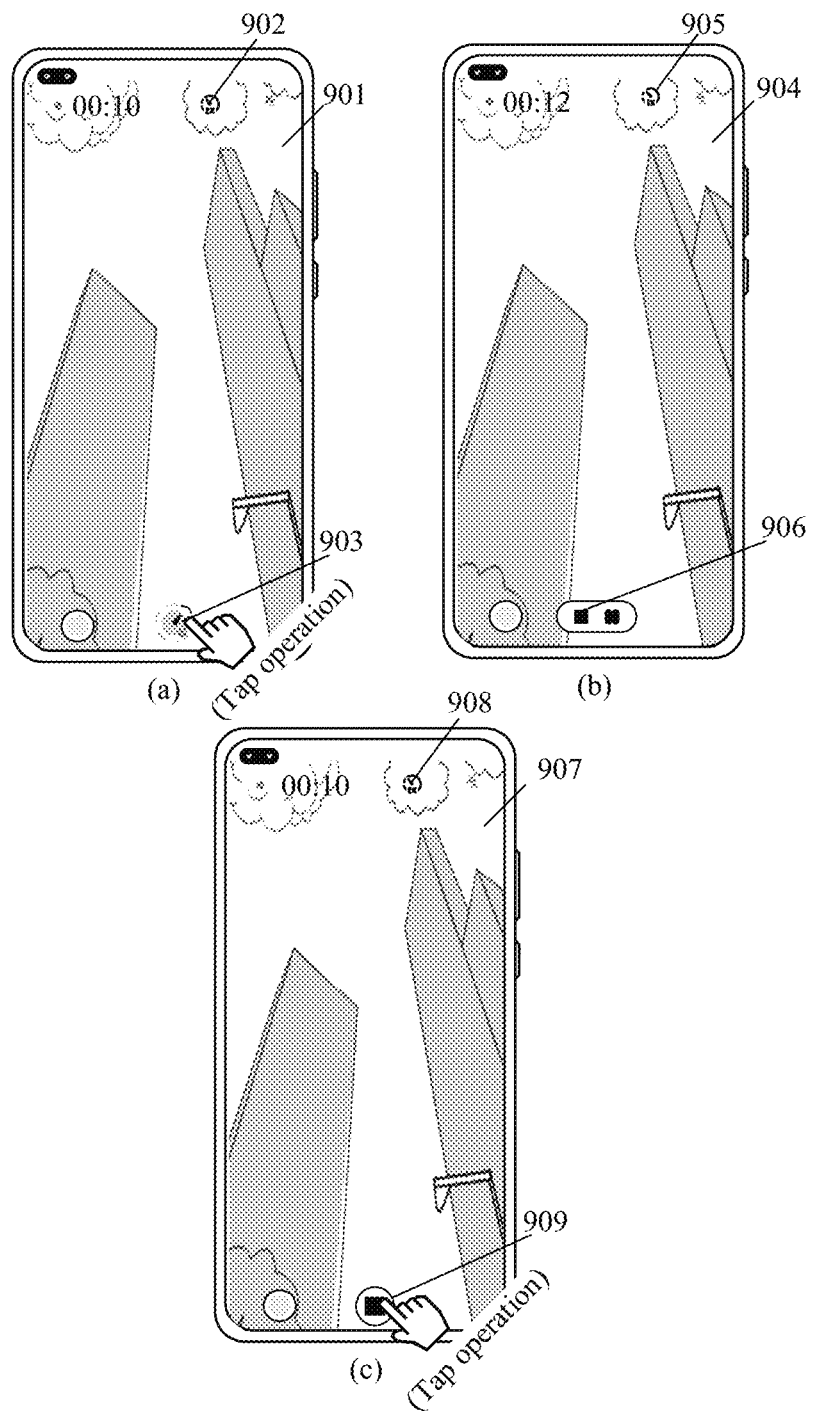
FIG. 9 is a schematic diagram of another recording screen on a mobile phone according to an embodiment of this application.

For example, a first screen 901 shown in (a) of FIG. 9 includes a first icon 902, and the first icon 902 is used to indicate that the mobile phone is to play the recorded video at 2× speed, that is, the indicated playback speed is equal to 2× speed. In other words, the first speed is not equal to 1× speed. In this case, the first screen 901 may include a second preset control 903. Then, in response to a tap operation by the user on the second preset control 903, the mobile phone displays a second screen 904 shown in (b) of FIG. 9. The second screen 904 includes a second icon 905, and the second icon 905 indicates that the mobile phone is to play the recorded video at 1× speed, that is, the playback speed is equal to 1× speed. In this case, the second screen 906 does not include the second preset control. That is, when the first screen 901 includes the second preset control, the mobile phone can conveniently switch to 1× speed in response to a tap operation by the user on the second preset control.

It should be noted herein that the variable-speed-based playback means that after the video recording is completed, when the user triggers video playback, the recorded video is played at a corresponding speed. Such variable-speed-based playback is not a speed-based preview on the viewfinder screen. For example, variable-speed-based playback means that after the mobile phone stores a recorded video in an album, the mobile phone plays the video at a corresponding playback speed in response to a tap operation by the user on a play button of the video in the album. On the viewfinder screen, the first preview image or the second preview image is displayed for preview at a normal 1× speed. Specifically, after capturing a preview image, the camera sends the preview image to the image signal processing module, and the image signal processing module sends the preview image to the camera application. In such process, the image signal processing module does not adjust (such as frame extraction processing) the playback speed of the preview image. Then, the camera application displays the preview image on the viewfinder screen, and the plurality of frames of preview images in the viewfinder screen are not displayed for preview at an accelerated speed or a slowed-down speed.

S304: The mobile phone receives a second operation on the second screen by the user, where the second operation is used to trigger the mobile phone to terminate video recording.

In this embodiment of this application, a specific form of the second operation is not limited. For example, the second screen includes a recording end control, and the second operation may be a trigger operation (such as a tap operation or a touch-and-hold operation) on the recording end control.

For example, the second screen 904 shown in (b) of FIG. 9 includes an end recording control 906, and the second operation may be a tap operation by the user on the end recording control 906. It should be noted that the shape and position of the end recording control 906 shown in FIG. 9 are only an example, and are not limited thereto in actual implementation. For example, the recording end control may alternatively be set in an upper left corner or a lower right corner of the viewfinder screen during video recording of the mobile phone. For another example, the recording end control may be in a shape of a circle, a rectangle with rounded corners, or the like.

In addition, in some embodiments, in a case that the playback speed indicated by the first icon is not equal to the second preset speed (that is, the first speed is not equal to the second preset speed), the first screen further includes a third preset control. In a case that the playback speed indicated by the second icon is not equal to the second preset speed (that is, the second speed is not equal to the second preset speed), the second screen further includes a third preset control. The third control is used to trigger the mobile phone to terminate video recording. The mobile phone may terminate video recording in response to a tap operation by the user on the third preset control. That is, recording can be directly terminated at a speed other than the second preset speed by using the third control.

For example, the second preset speed being 1× speed is used as an example. A second screen 907 shown in (c) of FIG. 9 includes a second icon 908, and a playback speed indicated by the second icon 908 is 2× speed, that is, the second speed is not equal to the second preset speed. The second screen 907 further includes a third preset control 909, and the third preset control 909 is used to trigger the mobile phone to terminate video recording. The mobile phone may terminate video recording in response to a tap operation by the user on the third preset control 909.

That is, when the playback speed is not equal to the second preset speed, switching to the second preset speed does not need to be performed before video recording is terminated on a screen displaying the second preset speed. Instead, recording can be directly exited by using the third control from a screen displaying a speed other than the second preset speed. This simplifies an operation of exiting video recording from a screen displaying a speed other than the second preset speed.

Alternatively, the second operation may be a second preset gesture. For example, the second operation is a slide-up gesture in which the user slides up from the bottom of the second screen.

S305: The mobile phone generates a first video file in response to the second operation, where the first video file includes a first video stream and a second video stream, the first video stream includes a plurality of frames of the first preview images, and the second video stream includes a plurality of frames of the second preview images.

After recording is terminated, the mobile phone generates the first video file. The first video file is a video file to be played. For example, after the user taps on end recording, the mobile phone generates the first video file and stores the first video file in an album application. Then, the user can access the album application to trigger playback of the first video file.

Figure 10:
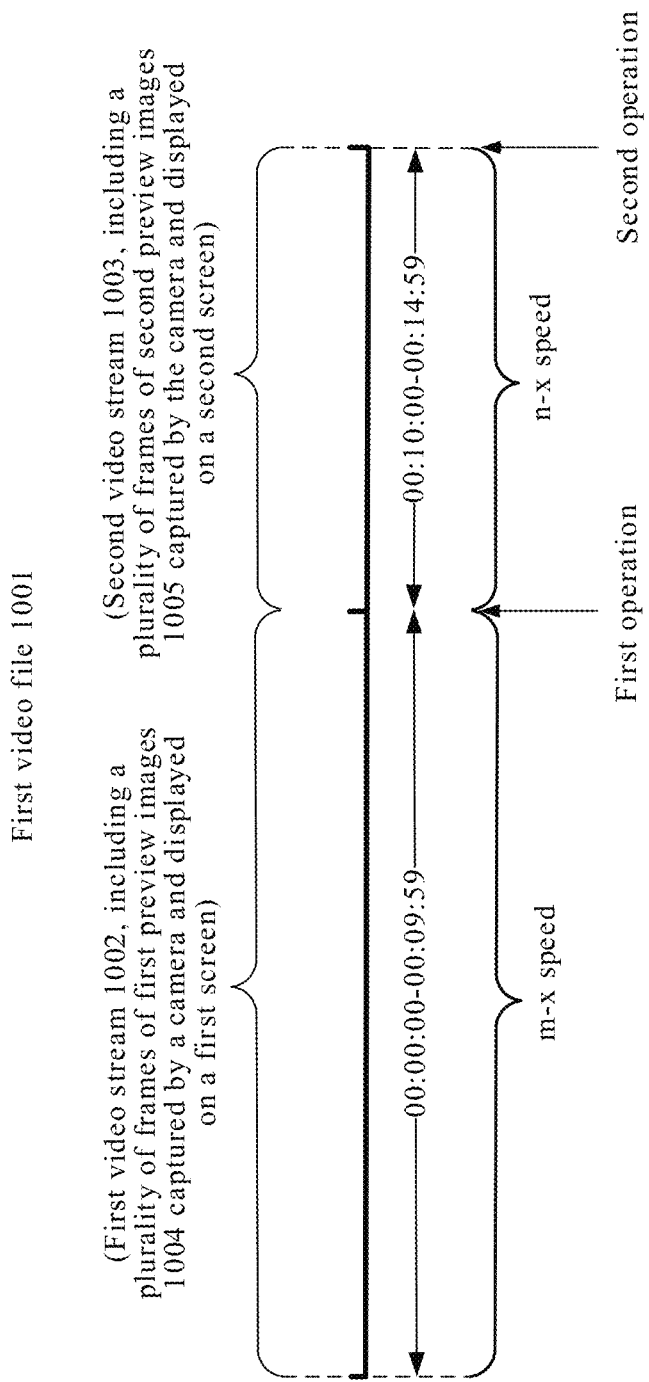
FIG. 10 is a schematic diagram of composition of a video file according to an embodiment of this application

For example, as shown in FIG. 10, in the first 10 seconds from 00:00:00 (from the 0th second) to 00:09:59 (until the 9th second), the playback speed is the first speed. At 00:09:59 (or 00:10:00), the mobile phone adjusts the playback speed to the second speed in response to the first operation by the user. Then, within 5 seconds from 00:10:00 (from the 10th second) to 00:14:59 (until the 14th second), the playback speed is the second speed. At 00:14:59, in response to the second operation by the user, the mobile phone generates a first video file 1001, where the first video file 1001 includes a first video stream 1002 and a second video stream 1003. The first video stream 1002 includes a plurality of frames of first preview images 1004 captured by the camera between 00:00:00 and 00:09:59 and displayed on the first screen. The second video stream 1003 includes a plurality of frames of second preview images 1005 captured by the camera between 00:10:00 and 00:14:59 and displayed on the second screen.

In some embodiments, the first video stream includes a plurality of frames of first preview images, where the plurality of frames of first preview images are all the first preview images captured by the camera. The second video stream includes a plurality of frames of second preview images, where the plurality of frames of second preview images are all the second preview images captured by the camera. In this embodiment, the mobile phone may construct all the first preview images to obtain the first video stream, and may construct all the second preview images to obtain the second video stream. This reduces image processing in the process of obtaining the first video stream and the second video stream, and it is good for keeping all the image frames.

For example, the camera captures preview images (such as the first preview images and the second preview images) at a frame rate of 30 frames per second, and a video playback speed corresponding to the first 10 seconds of video recording is the first speed. In this case, all the first preview images have a total of 30 frames per second*10 seconds, that is, 300 frames. A video playback speed corresponding to the last 5 seconds of video recording is the second speed, and all the second preview images have a total of 30 frames per second*5 seconds, that is, 150 frames. That is, in this embodiment, all the first preview images captured during video recording directly form the first video stream, and all the second preview images directly form the second video stream.

After obtaining the first video stream and the second video stream, the mobile phone may generate the first video file including the first video stream and the second video stream. The mobile phone adds a speed attribute to the first video file. Specifically, a speed attribute added to the first video stream is a first attribute, and the first attribute indicates that the playback speed of the first video stream is the first speed. A speed attribute added to the second video stream is a second attribute, and the second attribute indicates that the playback speed of the second video stream is the second speed. In this way, the mobile phone may subsequently play the first video file based on the speed attribute, which helps implement variable-speed-based playback.

In some other embodiments, in a case that the first speed is not equal to the first preset speed (for example, 1× speed), the first video stream includes a plurality of frames of first preview images, where the plurality of frames of first preview images are obtained through frame extraction or frame insertion processing on all the first preview images captured by the camera. In a case that the second speed is not equal to the first preset speed (for example, 1× speed), the second video stream includes a plurality of frames of second preview images, where the plurality of frames of second preview images are obtained through frame extraction or frame insertion processing on all the second preview images captured by the camera. For an accelerated playback speed (such as 2× speed) and a slowed-down playback speed (such as 0.5× speed), specific implementation of variable-speed-based processing is different.

The specific implementation of variable-speed-based processing is described below by using an example in which the first preset speed is equal to 1× speed, and the first video stream is obtained through variable-speed-based processing.

Figure 11:
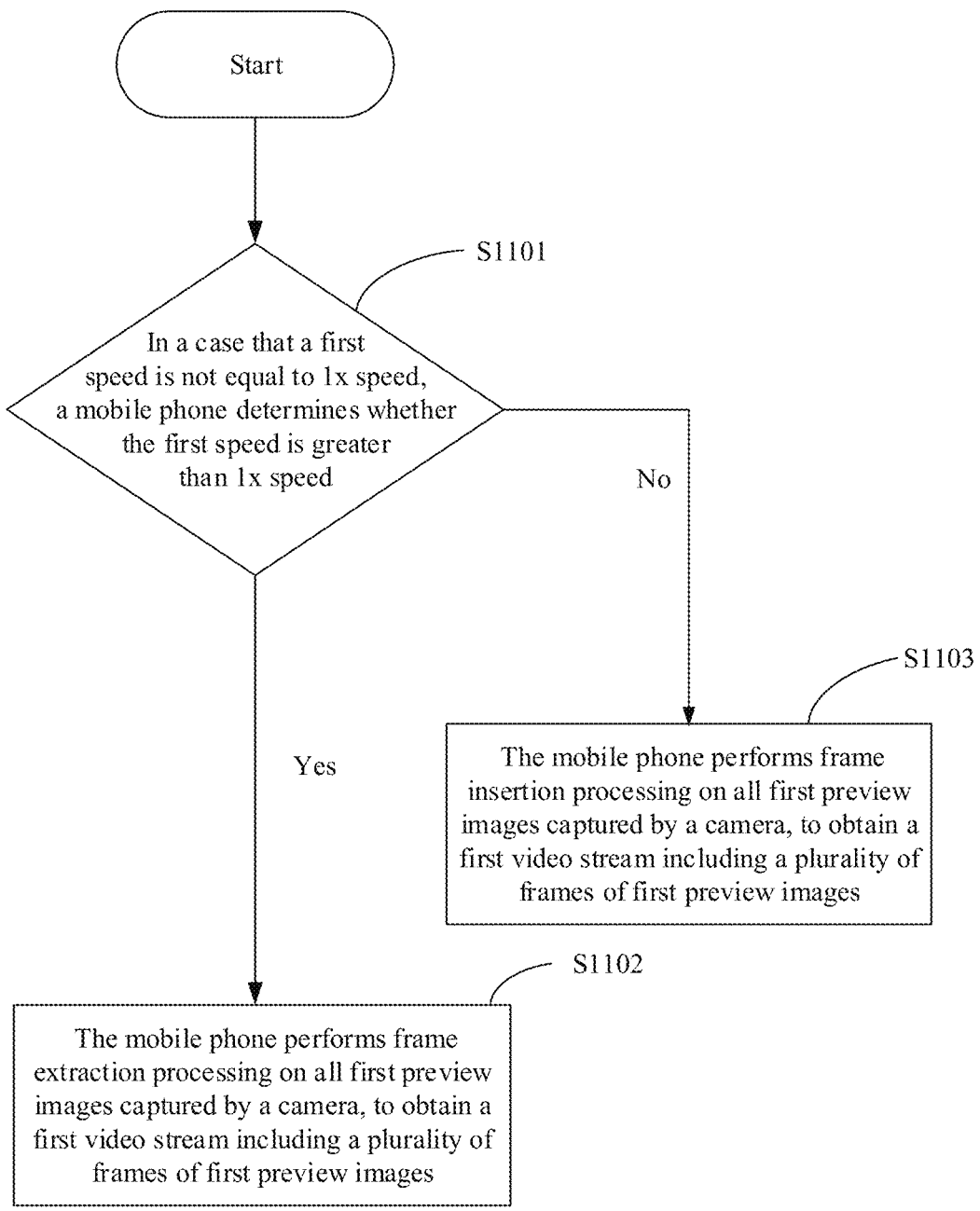
FIG. 11 is a flowchart of a variable-speed-based processing process according to an embodiment of this application.

As shown in FIG. 11, a variable-speed-based processing process includes S1101 to S1103.

S1101: In a case that the first speed is not equal to 1× speed, the mobile phone determines whether the first speed is greater than 1× speed; and if yes, performs S1102, or if not, performs S1103.

If the first speed is greater than 1× speed (for example, the first speed is equal to 2× speed), it indicates that an accelerated playback speed is used before adjustment. In this case, S1102 is performed to implement frame extraction processing. If the first speed is less than 1× speed (for example, the first speed is equal to 0.5× speed), it indicates that a slowed-down playback speed is used before adjustment. In this case, S1103 is performed to implement frame insertion processing.

In some embodiments, the mobile phone may determine whether the first speed is less than 1× speed, and if yes, performs S1103, or if not, performs S1102. It should be noted that the first speed is always greater than or equal to 1× speed for some mobile phones that support playback only at 1× speed or an accelerated speed. In a case that the first speed is not equal to 1× speed, the first speed is always greater than 1× speed. In this case, the mobile phone may directly perform frame extraction processing.

S1102: The mobile phone performs frame extraction processing on all the first preview images captured by the camera, to obtain the first video stream including the plurality of frames of first preview images.

If the first speed is greater than 1× speed, the mobile phone performs frame extraction processing on all the first preview images captured by the camera, so that a ratio of the number of image frames before frame extraction to the number of image frames after frame extraction is equal to m, where m is a speed value of the first speed. Specifically, one frame of first preview image may be retained in every m frames of first preview images. For example, if the first speed is equal to 4× speed, and the speed value of the first speed is equal to 4, one frame of first preview image may be retained in every four frames of first preview images. If all the first preview images have a total of 300 frames, the 1st, 5th, 9th, 13th, . . . , frames of first preview images may be retained.

After frame extraction processing, the number of image frames of the first preview images is reduced. That is, the first video stream includes a plurality of frames of first preview images, and the plurality of frames of first preview images are some first preview images in all the first preview images.

S1103: The mobile phone performs frame insertion processing on all the first preview images captured by the camera, to obtain the first video stream including the plurality of frames of first preview images.

If the first speed is greater than 0 and less than 1, the mobile phone performs frame insertion processing on all the second preview images captured by the camera, so that a ratio of the number of image frames before frame insertion to the number of image frames after frame insertion is equal to m.

In some embodiments, frame insertion processing is to insert a blank image (for example, a pure black or pure white image). Specifically, before or after every one frame of first preview image, 1/m−1 frames of blank images are inserted.

For example, if the first speed is equal to 0.25× speed, 1/0.25−1=3 frames of pure black images can be inserted after each frame of first preview image. Assuming that all the first preview images are sequentially a first preview image 1, a first preview image 2, a first preview image 3, . . . , and so on, image frames of the first video stream obtained through frame insertion processing may be sequentially the first preview image 1, a pure black image, a pure black image, a pure black image, the first preview image 2, a pure black image, a pure black image, a pure black image, the first preview image 3, a pure black image, a pure black image, a pure black image, . . . , and so on.

It can be learned from the foregoing that the first video stream obtained by inserting blank images includes not only all the first preview images, but also a plurality of frames of blank images.

In some other embodiments, frame insertion processing is to insert repeated first preview images. Specifically, before or after every one frame of second preview image, 1/m−1 frames of repeated second preview images are inserted.

For example, if the first speed is equal to 0.5× speed, 1/0.5−1=1 frame of repeated first preview image may be inserted after each frame of first preview image. If all the first preview images are sequentially a first preview image 1, a first preview image 2, a first preview image 3, . . . , and so on, image frames of the first video stream obtained through frame insertion processing may be sequentially the first preview image 1, the first preview image 1, the first preview image 2, the first preview image 2, the first preview image 3, the first preview image 3, . . . , and so on.

It can be learned from the foregoing that the second video stream obtained by inserting the repeated first preview images includes all the first preview images and their repeated images.

To sum up, the first video stream matching the first speed can be obtained through frame insertion processing or frame extraction processing described above. It should be understood that the first video stream obtained through frame insertion processing or frame extraction processing can be played normally during playback, to implement variable-speed-based playback, thereby simplifying implementation of subsequent variable-speed-based playback.

In the foregoing FIG. 11, the first video stream obtained through frame insertion processing or frame extraction processing is used as an example to describe specific implementation of frame insertion processing or frame extraction processing. For a process of obtaining the second video stream, reference may be made to the flowchart of FIG. 11 and related descriptions thereof, and details are not repeated herein. The difference lies in that it is necessary to replace the first speed with the second speed, replace the speed value (for example, m) of the first speed with the speed value (for example, n) of the second speed, replace the first preview image with the second preview image, and replace the first video stream with the second video stream.

In the foregoing description of frame insertion processing and frame extraction processing, a process of even frame insertion or even frame extraction to obtain the number of image frames corresponding to the playback speed is mainly described in detail. For example, 3 frames of first preview images are extracted from every 4 frames of the first preview image, to implement playback at 4× speed.

In some other embodiments, uneven frame extraction or uneven frame insertion may be alternatively performed. For example, frame extraction or frame insertion is performed randomly, and/or, it is acceptable that an approximate playback speed (for example, the first speed or the second speed) can be implemented based on a frame extraction or frame insertion result, and does not need to be exactly the same as the playback speed. This can simplify a program algorithm of frame extraction or frame insertion, and improve processing efficiency.

In addition, after video recording is terminated, capturing of the first preview image and the second preview image has already ended. Therefore, in some embodiments, in response to the second operation, the mobile phone may complete frame insertion processing or frame extraction processing on all the first preview images to obtain the first video stream; and in response to the second operation, the mobile phone may complete frame insertion processing or frame extraction processing on all the second preview images to obtain the second video stream. In this way, in response to the second operation, frame insertion processing or frame extraction processing can be completed at one time, which can avoid invoking the same processing program multiple times.

A difference from capturing of the second preview image lies in that after the playback speed is adjusted to the second speed, capturing of the first preview image has been terminated. Therefore, in some other embodiments, in response to the first operation, the mobile phone may complete frame insertion processing or frame extraction processing on all the first preview images to obtain the first video stream; and then, in response to the second operation, the mobile phone may complete frame insertion processing or frame extraction processing on all the second preview images to obtain the second video stream. In this way, frame insertion processing or the frame extraction processing can be started in a timely manner after capturing of the first preview image is terminated. This avoids processing a large number of processing tasks in a concentrated period of time, and can reduce pressure of instantaneous data processing.

After obtaining the first video stream and the second video stream, the mobile phone may generate the first video file including the first video stream and the second video stream. In a specific implementation, the camera application may perform frame insertion processing or frame extraction processing, and generate the first video file after completing the frame insertion processing or frame extraction processing. Then, the camera application stores the first video file in an application such as album or file manager.

S306: The mobile phone receives a third operation by the user, where the third operation is used to trigger the mobile phone to play the first video file.

Figure 12:
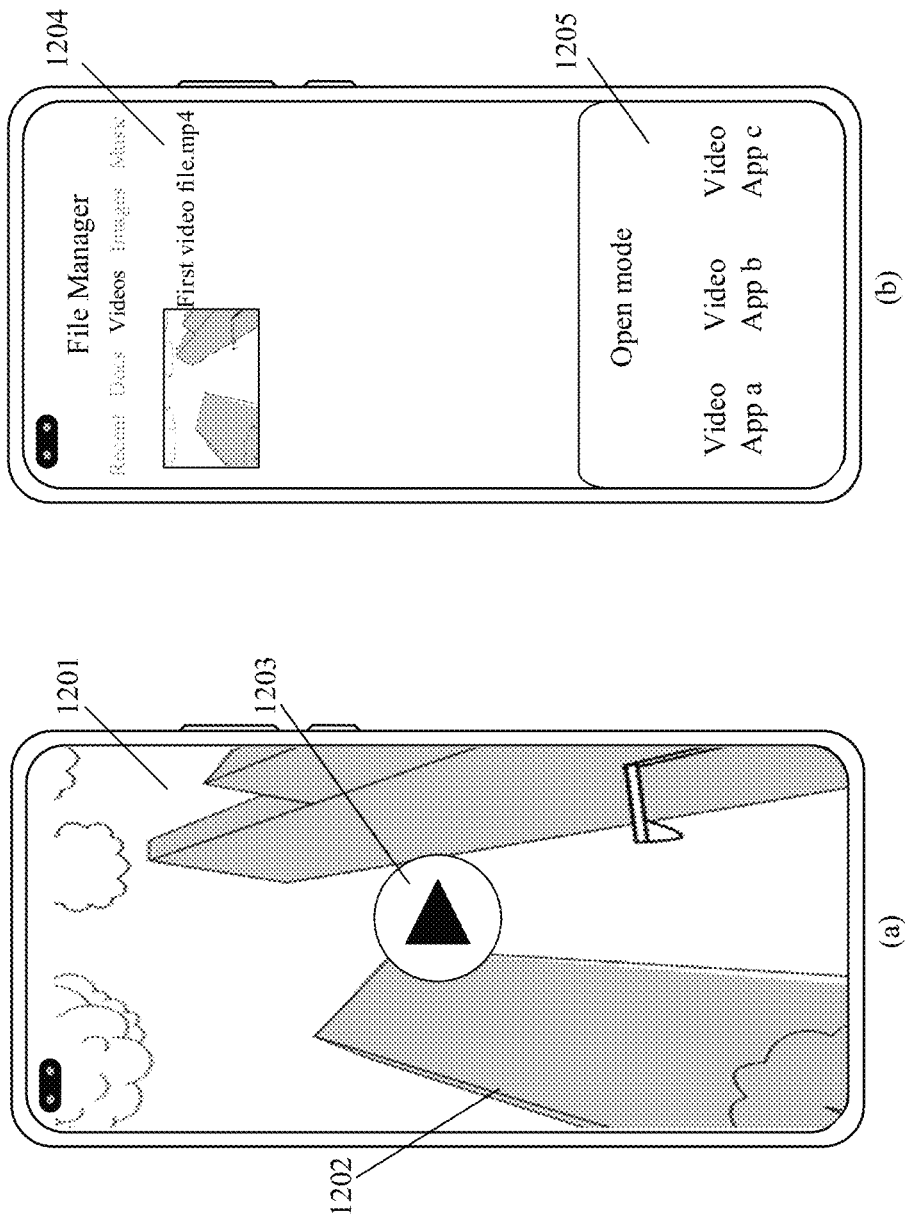
FIG. 12 is a schematic diagram of a video playback entry according to an embodiment of this application.

For example, the third operation is a tap operation by the user on a play button of the first video file in the album (or gallery) application. For example, in response to a select operation by the user on the first video file in the album (or gallery) application, the mobile phone displays a screen 1201 shown in (a) of FIG. 12. The screen 1201 includes a cover image 1202 of the first video file and a play button 1203 of the first video file. The third operation may be a tap operation by the user on the play button 1203.

Alternatively, the third operation is a select operation by the user on an opening mode of the first video file in the file manager application. For example, in the file manager application of the mobile phone, the mobile phone may display a screen 1204 shown in (b) of FIG. 12, in response to an operation of triggering by the user to display the opening mode of the first video file, and the screen 1204 includes an opening mode window 1205. The opening mode window includes three opening mode options (for example, a video application a, a video application b, and a video application c). The third operation may be a tap operation by the user on any one of the three opening mode options, that is, the select operation is a tap operation.

S307: In response to the third operation, the mobile phone plays the first video stream at the first speed, and plays the second video stream at the second speed.

During playing of the first video file by the mobile phone, videos recorded before and after adjustment are played at different playback speeds. In this way, different clips of a video can be played at different speeds based on the first operation by the user during video recording.

In a case that the first speed is less than the first preset speed, playing duration for playing the first video stream is greater than capturing duration for capturing all the first preview images by the camera. In ideal cases, the playback duration is m times the capturing duration. In a case that the first speed is equal to the first preset speed, the playing duration for playing the first video stream is equal to the capturing duration for capturing all the first preview images by the camera. In a case that the first speed is greater than the first preset speed, the playing duration for playing the first video stream is less than the capturing duration for capturing all the first preview images by the camera. In ideal cases, the capturing duration is m times the playback duration.

For example, the first preset speed being 1× speed is used as an example. In FIG. 10, the playback speed is switched at the 10th second, and the camera keeps capturing the first preview images in the first 10 seconds. Assuming that the first speed is equal to 1, a result of playing the first video stream at the first speed should be: the playback duration of the first video stream is equal to 10 seconds. Assuming that the first speed is equal to 2, a result of playing the first video stream at the first speed should be: the playback duration of the first video stream is equal to 5 seconds. Assuming that the first speed is equal to 0.5, a result of playing the first video stream at the first speed should be: the playback duration of the first video stream is equal to 20 seconds.

In a case that the second speed is less than the first preset speed, playing duration for playing the second video stream is greater than capturing duration for capturing all the second preview images by the camera. In ideal cases, the playback duration is m times the capturing duration. In a case that the second speed is equal to the first preset speed, the playing duration for playing the second video stream is equal to the capturing duration for capturing all the second preview images by the camera. In a case that the second speed is greater than the first preset speed, the playing duration for playing the second video stream is less than the capturing duration for capturing all the second preview images by the camera. In ideal cases, the capturing duration is m times the playback duration.

Corresponding to different manners of obtaining the first video stream and the second video stream in S305, variable-speed-based playback manners in S307 are correspondingly different.

In some embodiments, corresponding to the manner of obtaining the first video stream and the second video stream through frame insertion processing or frame extraction processing, playing the first video stream normally is playing the first video stream at the first speed; and playing the second video stream normally is playing the second video stream at the second speed. In this way, the first video stream and the second video stream are obtained by performing frame insertion processing or frame extraction processing in advance, so that variable-speed-based playback can be implemented without video processing during video playback, thereby improving smoothness of variable-speed-based playback.

For example, assuming that the first speed is equal to 2 and all the first preview images have a total of 300 frames, the first video stream generated by the mobile phone through frame extraction processing has a total of 150 frames. Obviously, a time of playing 150 frames of images is ½ of a time of playing 300 frames. That is, the first video stream including 150 frames of images is normally played, to implement 2× speed-based playback.

In some other embodiments, corresponding to the manner of constructing all the first preview images to obtain the first video stream, constructing all the second preview images to obtain the second video stream, and adding the speed attribute, variable-speed-based playback is implemented based on the speed attribute during playback.

In a specific implementation, variable-speed-based playback based on the speed attribute includes frame skip playback and/or frame insertion playback.

For example, if the first speed indicated by the first attribute satisfies the first speed being greater than 1, variable-speed-based playback based on the speed attribute may be: playing only one frame of first preview image in every m frames of first preview images (that is, in a skip playback manner). If the first speed indicated by the first attribute satisfies the first speed being greater than 0 and less than 1, variable-speed-based playback based on the speed attribute may be: before or after every frame of first preview image, inserting 1/m−1 frames of blank images (for example, pure black images) or inserting 1/m−1 frames of repeated first preview images (that is, in an insertion playback manner).

For example, if the second speed indicated by the second attribute satisfies the second speed being greater than 1, variable-speed-based playback based on the speed attribute may be: playing only one frame of second preview image in every n frames of second preview images (that is, in a skip playback manner). If the second speed indicated by the second attribute satisfies the second speed being greater than 0 and less than 1, variable-speed-based playback based on the speed attribute may be: before or after every frame of second preview image, inserting 1/n−1 frames of blank images (for example, pure black images) or inserting 1/n−1 frames of repeated second preview images (that is, in an insertion playback manner).

In another specific implementation, variable-speed-based playback based on the speed attribute includes time-reduced playback and/or time-prolonged playback.

For example, if the first speed indicated by the first attribute satisfies the first speed being greater than 1, variable-speed-based playback based on the speed attribute may be reducing playback duration of each frame of first preview image, so that reduced playback duration is 1/m times normal playback duration (which is time-reduced playback); if the first speed indicated by the first attribute satisfies the first speed being greater than 0 and less than 1, variable-speed-based playback based on the speed attribute may be prolonging playback duration of each frame of first preview image, so that prolonged playback duration is m times normal playback duration (which is time-prolonged playback).

For example, if the second speed indicated by the second attribute satisfies the second speed being greater than 1, variable-speed-based playback based on the speed attribute may be reducing playback duration of each frame of second preview image, so that reduced playback duration is 1/n times normal playback duration (which is time-reduced playback); if the second speed indicated by the second attribute satisfies the second speed being greater than 0 and less than 1, variable-speed-based playback based on the speed attribute may be prolonging playback duration of each frame of second preview image, so that prolonged playback duration is n times normal playback duration (which is time-prolonged playback).

It can be learned from the foregoing that, in this embodiment, variable-speed-based playback can be implemented in real time during playback, and all image frames originally captured can be retained.

To sum up, with the video processing method provided by this embodiment of this application, during video recording, the mobile phone can adjust the playback speed from the first speed to the second speed in response to the first operation by the user on the first screen. That is, the playback speed can be adjusted during video recording, to provide a new playback speed adjustment manner, thereby improving flexibility of playback speed adjustment.

In addition, the mobile phone uses the first preview images captured before playback speed adjustment to form the first video stream, and uses the second preview image captured after playback speed adjustment to form the second video stream. Then, during video playback, the first video stream is played at the first speed, and the second video stream is played at the second speed. In this way, after recording is completed, different video streams can be played at different speeds, not requiring the user to perform any operation, so that a time point for changing the playback speed is consistent with a time point at which the user performs the first operation during recording, thereby improving intelligence of variable-speed-based playback.

In the foregoing embodiment, only a process of adjusting the playback speed once is described in detail. In an actual implementation process, one case is that the playback speed is adjusted only once in one complete recording process from start of recording to end of recording. That is, from the start of recording, the playback speed is always the first speed, and then the playback speed is adjusted to the second speed. Another case is that the playback speed is adjusted multiple times in one complete recording process from start of recording to end of recording. For example, the playback speed is adjusted two or three times. That is, before the first screen is displayed, the playback speed is also adjusted. The following separately describes the video processing method provided by this embodiment of this application in these two cases.

Figure 13:
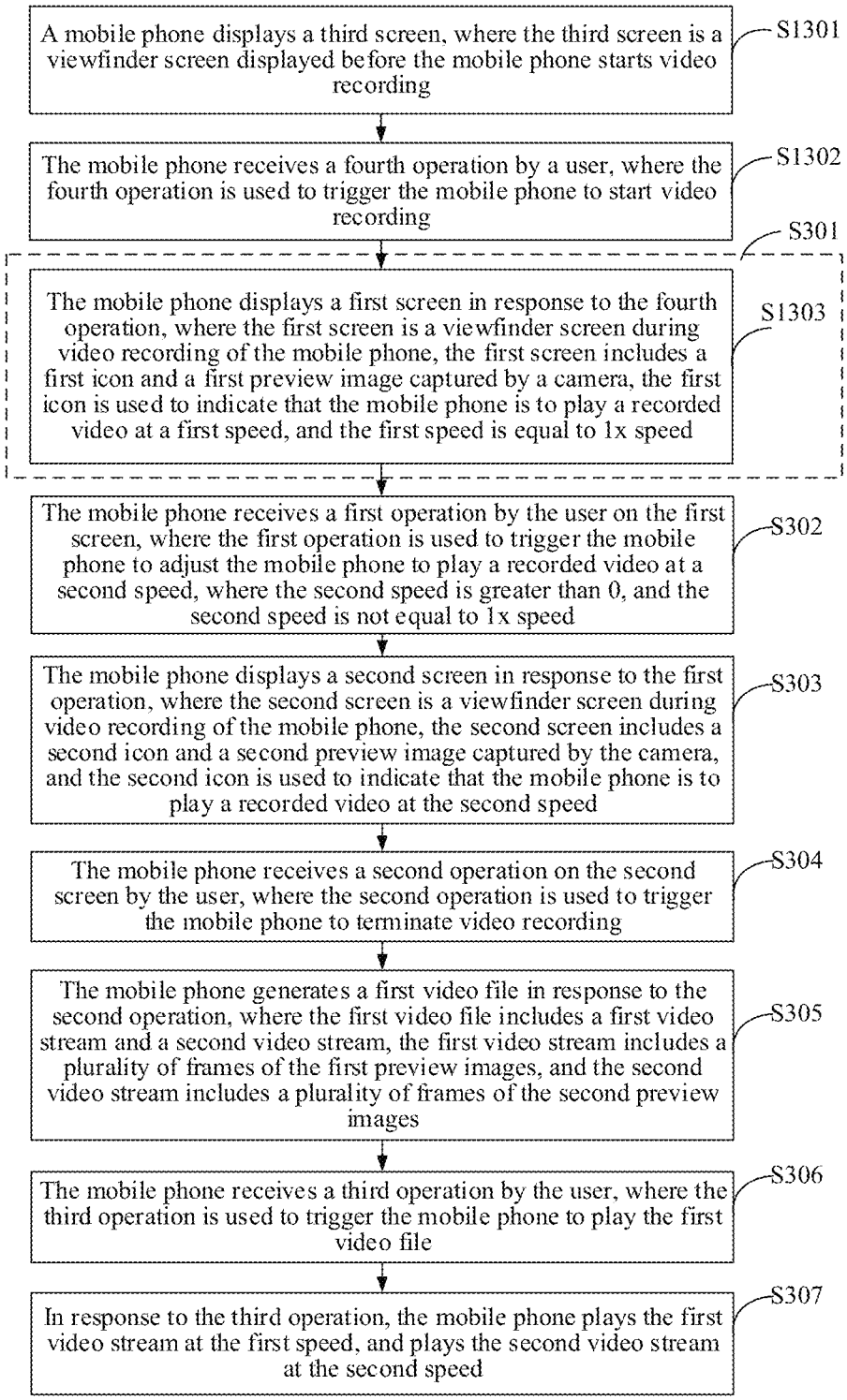
FIG. 13 is a flowchart of another video processing method according to an embodiment of this application.

In one case, from the start of recording, the playback speed is the first speed, and then the playback speed is adjusted to the second speed. That is, before the first screen is displayed in S301, the playback speed has never been adjusted. An embodiment of this application provides a video processing method, and the method may be applied to a mobile phone, where the mobile phone includes a camera and can provide a video recording function. In this embodiment, the video processing method is mainly described based on the first speed being 1× speed (that is, the second preset speed is equal to 1× speed). That is, this embodiment is a solution for adjusting the playback speed from 1× speed to the second speed. Specifically, as shown in FIG. 13, S1301 and S1302 are further included before S301, and S301 includes S1303.

S1301: The mobile phone displays a third screen, where the third screen is a viewfinder screen displayed before the mobile phone starts video recording.

The third screen includes a real-time preview image captured by the camera.

Figure 14:
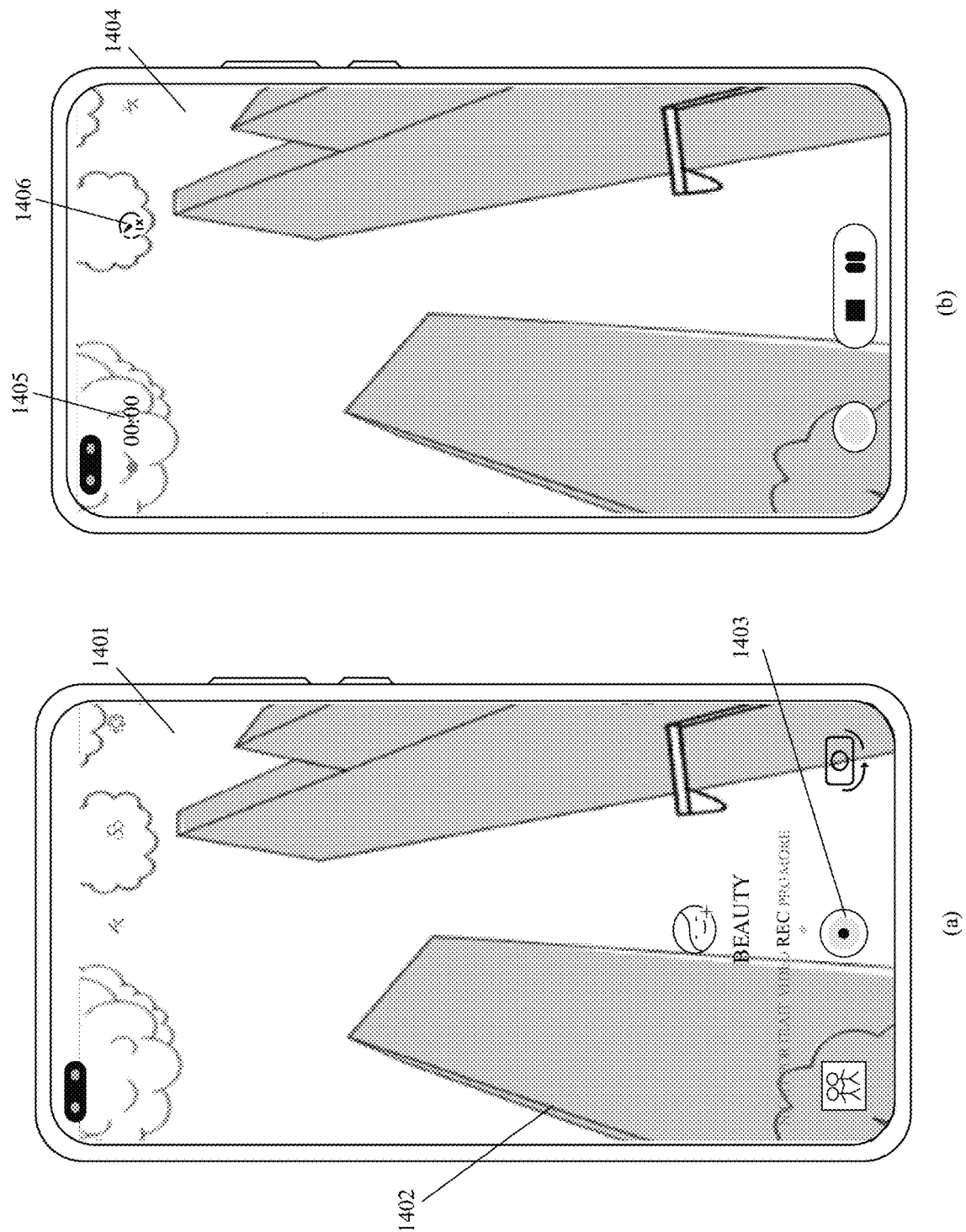
FIG. 14 is a schematic diagram of a video recording screen on a mobile phone according to an embodiment of this application.

For example, assuming that the rear-facing camera is a preview camera, the mobile phone displays a third screen 1401 shown in (a) of FIG. 14. The third screen 1401 is a viewfinder screen displayed before the mobile phone starts video recording. The third screen 1401 includes a real-time preview image 1402 captured by the camera (for example, the rear-facing camera).

S1302: The mobile phone receives a fourth operation by the user, where the fourth operation is used to trigger the mobile phone to start video recording.

In this embodiment of this application, a specific form of the fourth operation is not limited. For example, the fourth operation may be a double-tap operation or a tap operation on a region, displaying no control or icon, of the third screen; or the fourth operation may be a touch-and-hold operation on the volume button and/or the screen-off button, or a touch-and-hold operation on the volume button and/or the screen-off button; or the fourth operation may be a third preset gesture (for example, a two-finger slide gesture) performed on the third screen; or the third screen further includes a third preset control, and the third preset control is used to trigger the mobile phone to start video recording. The fourth operation is a trigger operation (for example, a tap operation, a touch-and-hold operation, or a slide operation) on the third preset control.

The fourth operation being a tap operation on the third preset control is used as an example. A third screen 1401 shown in (a) of FIG. 14 further includes a third preset control 1403, and the fourth operation may be a tap operation by the user on the third control 1403. It should be noted that the shape and position of the third preset control 1402 shown in (a) of FIG. 14 are only an example, and are not limited in actual implementation. For example, the third preset control may alternatively be provided at a right edge position of the third screen. For another example, the third preset control may alternatively be a camera graphic.

S1303: The mobile phone displays a first screen in response to the fourth operation, where the first screen is a viewfinder screen during video recording of the mobile phone, the first screen includes a first icon and a first preview image captured by the camera, the first icon is used to indicate that the mobile phone is to play a recorded video at a first speed, and the first speed is equal to 1× speed.

The mobile phone displays the first screen in response to the fourth operation. That is, the first screen is a viewfinder screen for entering video recording at the beginning, that is, from start of recording, the playback speed is the first speed.

For example, in response to a tap operation by the user on a start recording control 1403 in the third screen 1401 shown in (a) of FIG. 14, the mobile phone displays a first screen 1404 shown in (b) of FIG. 14. The first screen 1404 includes a first icon 1405, and the first icon 1405 is used to indicate that the mobile phone is to play the recorded video at 1× speed, that is, the first speed is equal to 1. That is, a corresponding playback speed when recording starts is 1× speed.

For descriptions of the first screen, the first icon, and the like in S1303, reference may be made to the description of the foregoing S301 and its related parts, and details are not repeated herein.

S302: The mobile phone receives a first operation by the user on the first screen. The first operation is used to trigger the mobile phone to adjust the mobile phone to play a recorded video at a second speed, where the second speed is greater than 0, and the second speed is not equal to 1× speed.

S303: The mobile phone displays a second screen in response to the first operation, where the second screen is a viewfinder screen during video recording of the mobile phone, the second screen includes a second icon and a second preview image captured by the camera, and the second icon is used to indicate that the mobile phone is to play a recorded video at the second speed.

S304: The mobile phone receives a second operation on the second screen by the user, where the second operation is used to trigger the mobile phone to terminate video recording.

S305: The mobile phone generates a first video file in response to the second operation, where the first video file includes a first video stream and a second video stream, the first video stream includes a plurality of frames of the first preview images, and the second video stream includes a plurality of frames of the second preview images.

S306: The mobile phone receives a third operation by the user, where the third operation is used to trigger the mobile phone to play the first video file.

S307: In response to the third operation, the mobile phone plays the first video stream at the first speed, and plays the second video stream at the second speed.

To sum up, according to the video processing method provided by this embodiment of this application, the playback speed can be adjusted from initial 1× speed to the second speed in one complete recording process from start of recording to end of recording. Then, during playback, the video recorded before adjustment is played at 1× speed, and the video recorded after adjustment is played at the second speed. In this way, after recording is completed, video streams before and after adjustment can be played at different speeds, not requiring the user to perform any operation, so that a time point for changing the playback speed is consistent with a time point at which the user performs the first operation during recording.

Figure 15A:
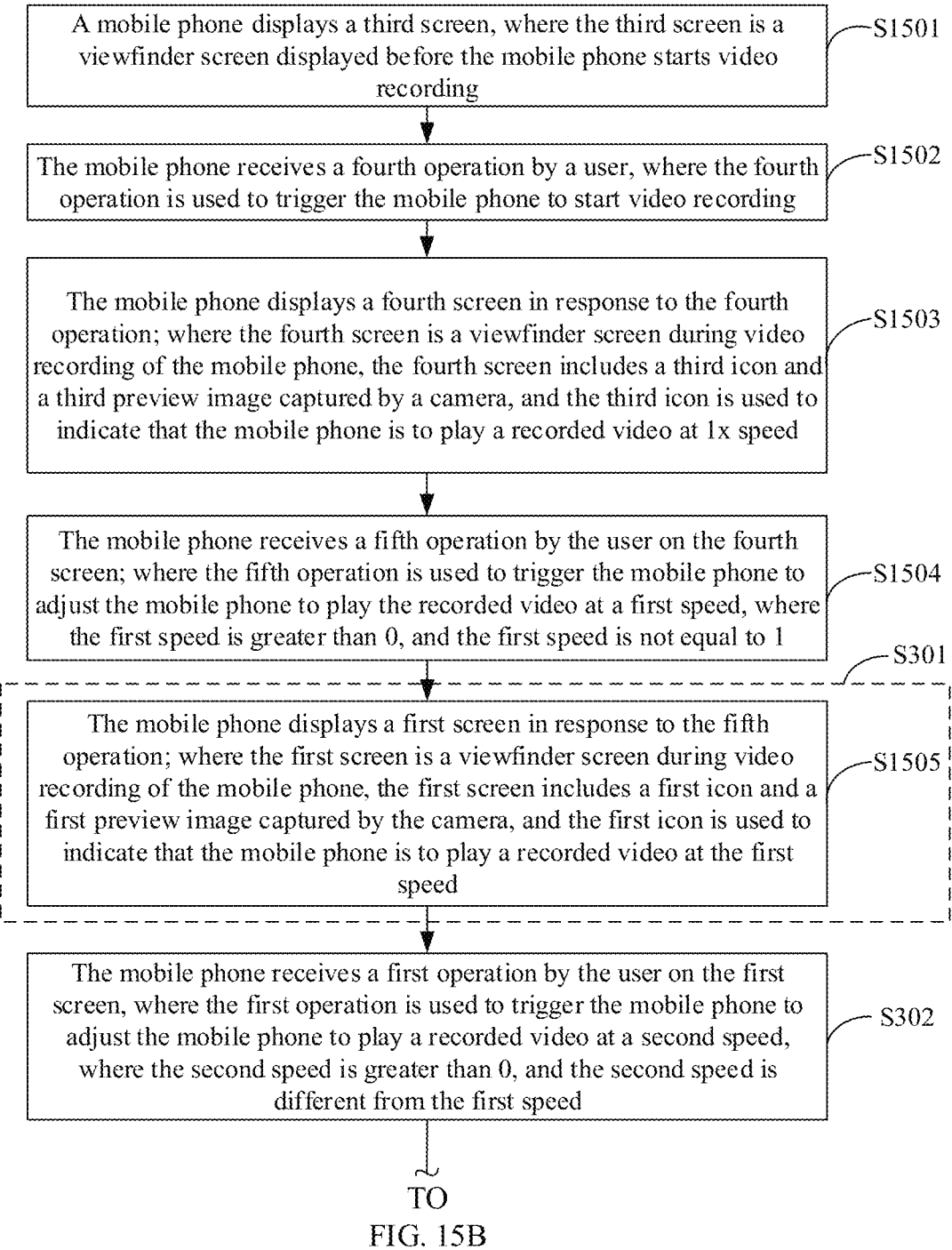

In another case, before the first screen is displayed, the playback speed is also adjusted. That is, before S301, the playback speed has been adjusted at least once. An embodiment of this application provides a video processing method, and the method may be applied to a mobile phone, where the mobile phone includes a camera and can provide a video recording function. In this embodiment, description is mainly provided by using an example in which the playback speed is adjusted twice in one complete recording process and a corresponding playback speed when recording is just started is 1× speed (that is, the second preset speed is 1× speed). Specifically, as shown in FIG. 15A and FIG. 15B, before S301, S1501 to S1504 are further included. S301 includes S1505, S305 includes S1506, and S307 includes S1507.

S1501: The mobile phone displays a third screen, where the third screen is a viewfinder screen displayed before the mobile phone starts video recording.

S1502: The mobile phone receives a fourth operation by the user, where the fourth operation is used to trigger the mobile phone to start video recording.

For specific implementation of the foregoing S1502 and S1502, reference may be made to related descriptions of the foregoing S1301 and S1302:

S1503: The mobile phone displays a fourth screen in response to the fourth operation; where the fourth screen is a viewfinder screen during video recording of the mobile phone, the fourth screen includes a third icon and a third preview image captured by the camera, and the third icon is used to indicate that the mobile phone is to play a recorded video at 1× speed.

The fourth screen is essentially the same as the first screen and the second screen, and each is a viewfinder screen during video recording of the mobile phone. The difference lies in that, in this embodiment, the fourth screen is a viewfinder screen for entering video recording at the beginning.

For specific implementation of S1503, refer to related description of the foregoing S1303. It is merely necessary to replace the first screen with the fourth screen, the first icon with the third speed icon, and the first preview image with the fourth preview image.

S1504: The mobile phone receives a fifth operation by the user on the fourth screen; where the fifth operation is used to trigger the mobile phone to adjust the mobile phone to play the recorded video at a first speed, where the first speed is greater than 0, and the first speed is not equal to 1.

The fifth operation is essentially the same as the first operation, and both are used to trigger the mobile phone to adjust the playback speed. For details about the fifth operation, reference may be made to the description about the first operation in the foregoing description, and details are not repeated herein. It should be noted that the fifth operation is used to trigger the mobile phone to adjust the mobile phone to play the recorded video at the first speed, and the first operation is used to trigger the mobile phone to adjust the mobile phone to play the recorded video at the second speed.

S1505: The mobile phone displays a first screen in response to the fifth operation; where the first screen is a viewfinder screen during video recording of the mobile phone, the first screen includes a first icon and a first preview image captured by the camera, and the first icon is used to indicate that the mobile phone is to play a recorded video at a first speed.

For the first screen in S1505, reference may be made to related description of S301 in the foregoing description, and details are not repeated herein.

S302: The mobile phone receives a first operation by the user on the first screen. The first operation is used to trigger the mobile phone to adjust the mobile phone to play a recorded video at a second speed, where the second speed is greater than 0, and the second speed is different from the first speed.

S303: The mobile phone displays a second screen in response to the first operation, where the second screen is a viewfinder screen during video recording of the mobile phone, the second screen includes a second icon and a second preview image captured by the camera, and the second icon is used to indicate that the mobile phone is to play a recorded video at a second speed.

In this embodiment, the playback speed can be adjusted from 1× speed to the first speed, and then be adjusted from the first speed to the second speed. The first speed is not equal to 1× speed, and the second speed is different from the first speed. That is, adjacent playback speeds before and after adjustment are different. However, non-adjacent playback speeds may be the same or different.

Figure 16:
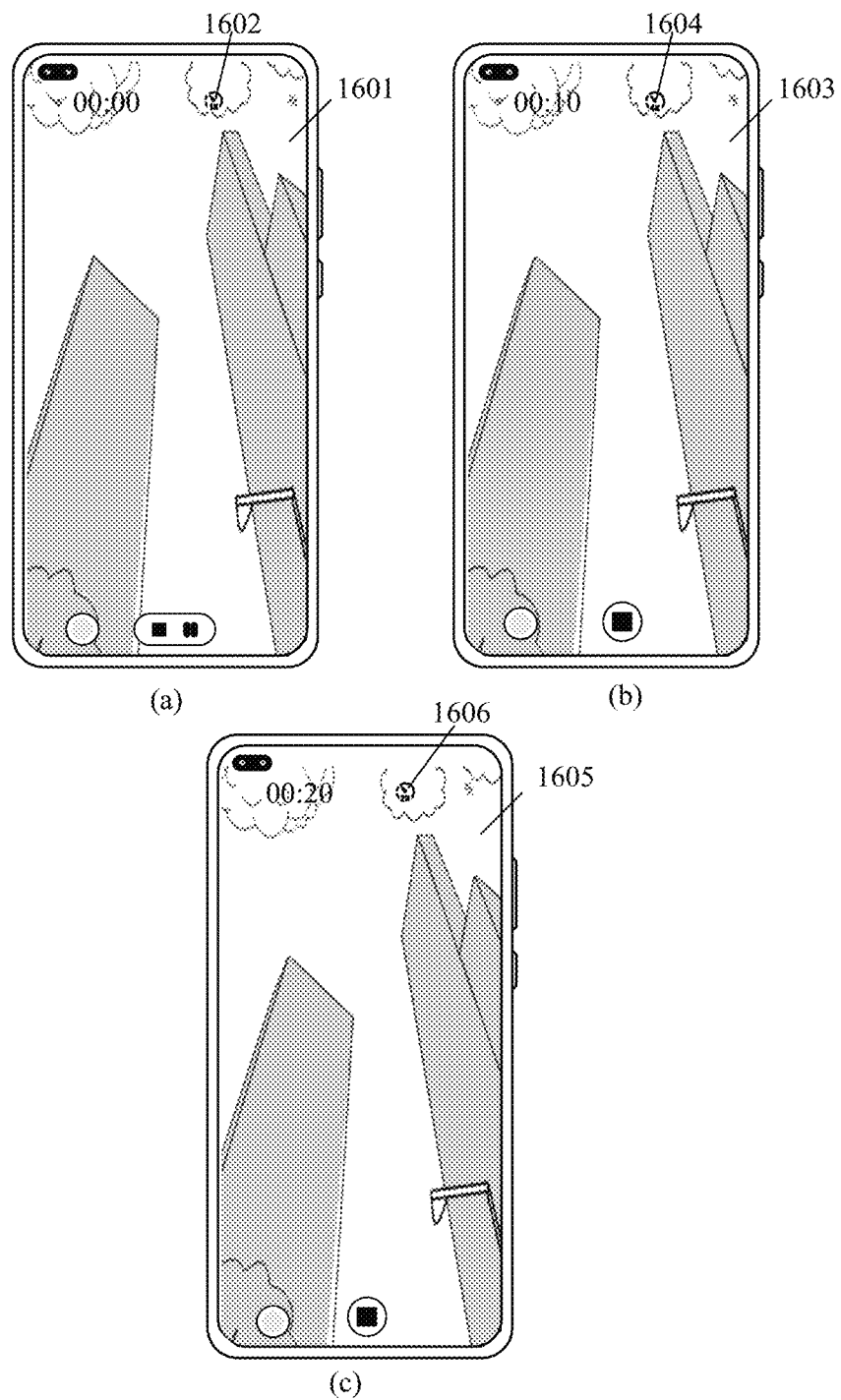
FIG. 16 is a schematic diagram of another recording screen on a mobile phone according to an embodiment of this application.

In example 1, non-adjacent playback speeds are different. A fourth screen 1601 shown in (a) of FIG. 16 includes a third speed icon 1602, and a playback speed indicated by the third speed icon 1602 is 1× speed, that is, the third speed is equal to 1× speed. A first screen 1603 shown in (b) of FIG. 16 includes a first icon 1604, and a playback speed indicated by the first icon 1604 is 4× speed, that is, the first speed is equal to 4× speed. A second screen 1605 shown in (c) of FIG. 16 includes a second icon 1606, and a playback speed indicated by the second icon 1606 is 2× speed, that is, the second speed is equal to 2× speed. That is, in a complete recording process, the playback speed is adjusted from 1× speed to 4× speed, and then is adjusted from 4× speed to 2× speed. Obviously, 2× speed is not equal to 1× speed, that is, non-adjacent playback speeds are different.

Figure 17:
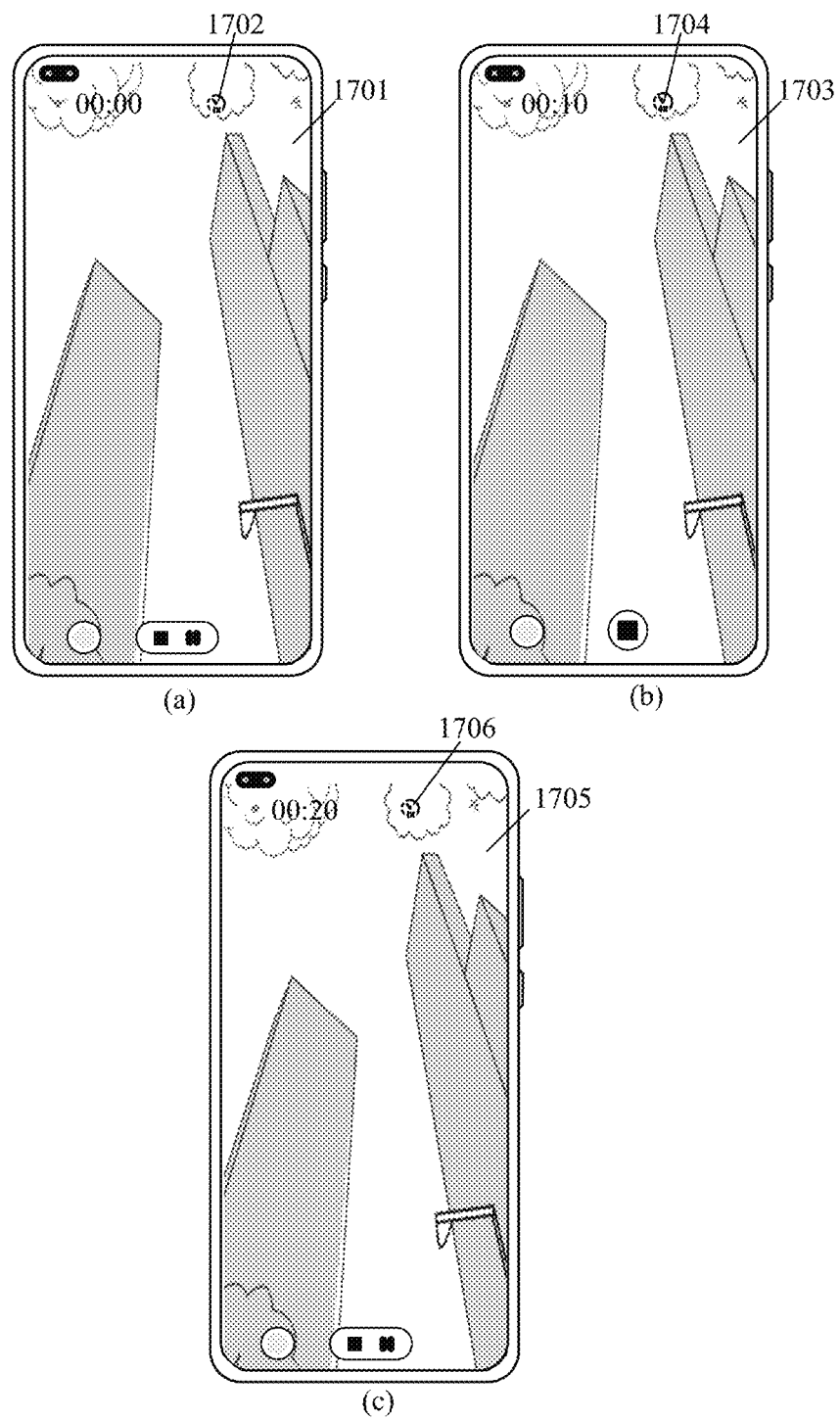
FIG. 17 is a schematic diagram of another recording screen on a mobile phone according to an embodiment of this application.

In example 2, non-adjacent playback speeds are the same. A fourth screen 1701 shown in (a) of FIG. 17 includes a third speed icon 1702, and a playback speed indicated by the third speed icon 1702 is 1× speed, that is, the third speed is equal to 1× speed. A first screen 1703 shown in (b) of FIG. 17 includes a first icon 1704, and a playback speed indicated by the first icon 1704 is 4× speed, that is, the first speed is equal to 4× speed. A second screen 1705 shown in (c) of FIG. 17 includes a second icon 1706, and a playback speed indicated by the second icon 1706 is 1× speed, that is, the second speed is equal to 1× speed. That is, in a complete recording process, the playback speed is adjusted from 1× speed to 4× speed, and then is adjusted from 4× speed to 1× speed. Obviously, non-adjacent playback speeds are the same.

S304: The mobile phone receives a second operation on the second screen by the user, where the second operation is used to trigger the mobile phone to terminate video recording.

S1506: The mobile phone generates a first video file in response to the second operation, where the first video file includes a first video stream, a second video stream, and a third video stream, the first video stream includes a plurality of frames of first preview images, the second video stream includes a plurality of frames of second preview images, and the third video stream includes a plurality of frames of third preview images.

Figure 18:
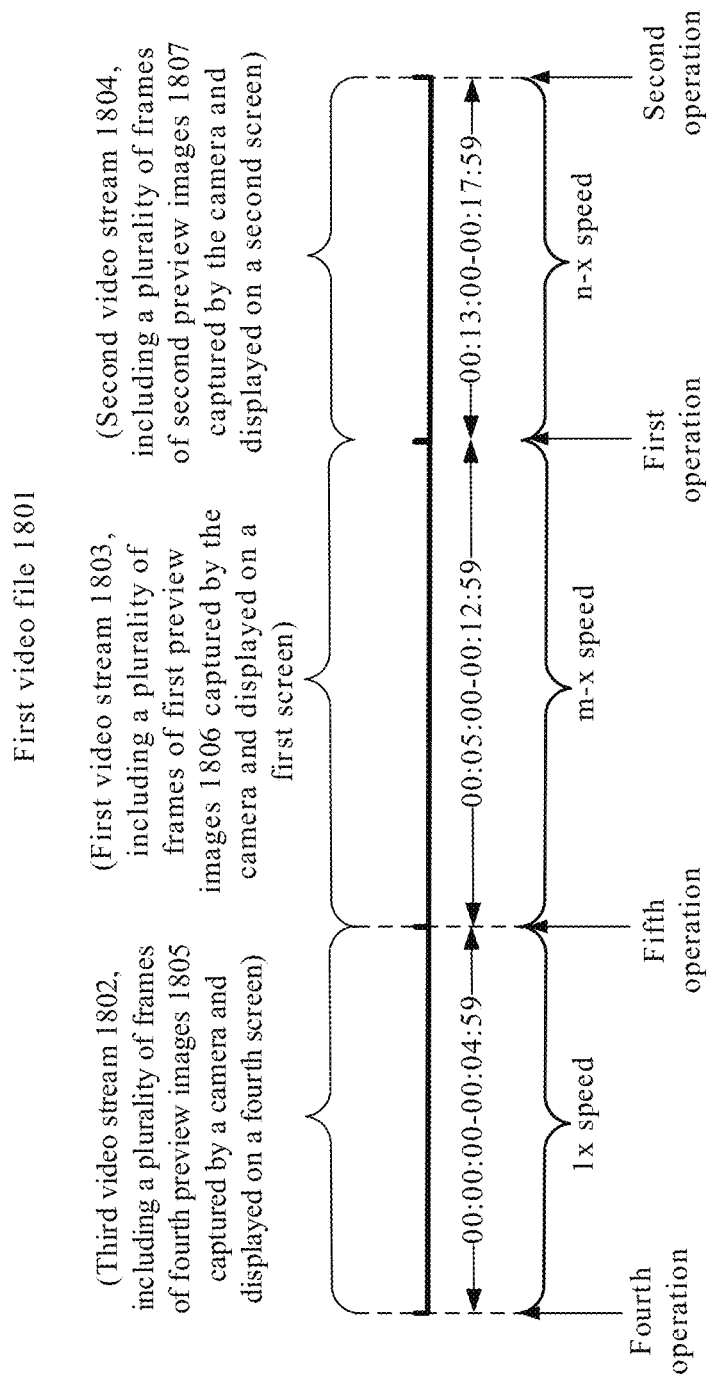
FIG. 18 is a schematic diagram of composition of another video file according to an embodiment of this application

For example, as shown in FIG. 18, the mobile phone starts video recording in response to the fourth operation by the user. Within the first 5 seconds from 00:00:00 (from the 0th second) to 00:04:59 (until the 4th second), the playback speed is 1× speed. At 00:04:59 (or 00:05:00), the mobile phone adjusts the playback speed to the first speed in response to the fifth operation by the user. Then, within 8 seconds from 00:05:00 (from the 5th second) to 00:12:59 (until the 12th second), the playback speed is the first speed. At 00:12:59 (or 00:13:00), the mobile phone adjusts the playback speed to the second speed in response to the first operation by the user. Then, within 5 seconds from 00:13:00 (from the 13th second) to 00:17:59 (until the 17th second), the playback speed is the second speed. At 00:17:59, in response to the second operation by the user, the mobile phone generates a first video file 1801, where the first video file 1801 includes a third video stream 1802, a first video stream 1803, and a second video stream 1803. The third video stream 1802 includes a plurality of frames of fourth preview images 1805 captured by the camera between 00:00:00 and 00:04:59 and displayed on the fourth screen. The first video stream 1803 includes a plurality of frames of first preview images 1806 captured by the camera between 00:05:00 and 00:12:59 and displayed on the first screen. The second video stream 1804 includes a plurality of frames of second preview images 1807 captured by the camera between 00:13:00 and 00:17:59 and displayed on the second screen.

For a process of generating the first video file in S1506, reference may be made to the description of the foregoing S305, and details are not repeated herein. It should be noted that the third video stream includes a plurality of frames of third preview images, the third preview images are captured during a process with a playback speed being 1× speed, and then all the third preview images captured by the camera are directly constructed to obtain the third video stream.

S306: The mobile phone receives a third operation by the user, where the third operation is used to trigger the mobile phone to play the first video file.

S1507: In response to the third operation, the mobile phone plays the third video stream at 1× speed, plays the first video stream at the first speed, and plays the second video stream at the second speed.

For specific implementation of variable-speed-based playback in S1507, reference may be made to the description of S307 in the foregoing description, and details are not repeated herein.

To sum up, according to the video processing method provided by this embodiment of this application, the playback speed can be adjusted twice in one complete recording process from start of recording to end of recording. Specifically, the playback speed is adjusted from initial 1× speed to the first speed, and then is adjusted from the first speed to the second speed. Then, during playback, a video recorded before the first adjustment of the playback speed is played at 1× speed, a video recorded after the first adjustment and before the second adjustment is played at the first speed, and a video recorded after the second adjustment is played at the second speed. In this way, after recording is completed, video streams obtained before and after each adjustment can be played at different speeds, not requiring the user to perform any operation, so that a time point for changing the playback speed is consistent with time points at which the user performs the fifth operation and the first operation during recording.

In addition, it should be noted that the embodiment in FIG. 15A and FIG. 15B is mainly described using an example in which the playback speed is adjusted twice during one recording process. In some other embodiments, between the 1× speed and the first speed, the playback speed may be adjusted one or more times. That is, in one complete recording process, the playback speed may be sequentially the 1× speed, . . . , the first speed, and the second speed. One or more playback speeds may be included in the ellipsis. Adjacent playback speeds before and after adjustment are different. For each adjustment, reference may be made to adjustment from the first speed to the second speed in the foregoing description, and specific implementation of adjusting the playback speed three times or more in one complete recording process is not described herein.

Scenario 2: Multi-Cam Recording Scenario

Figure 19:
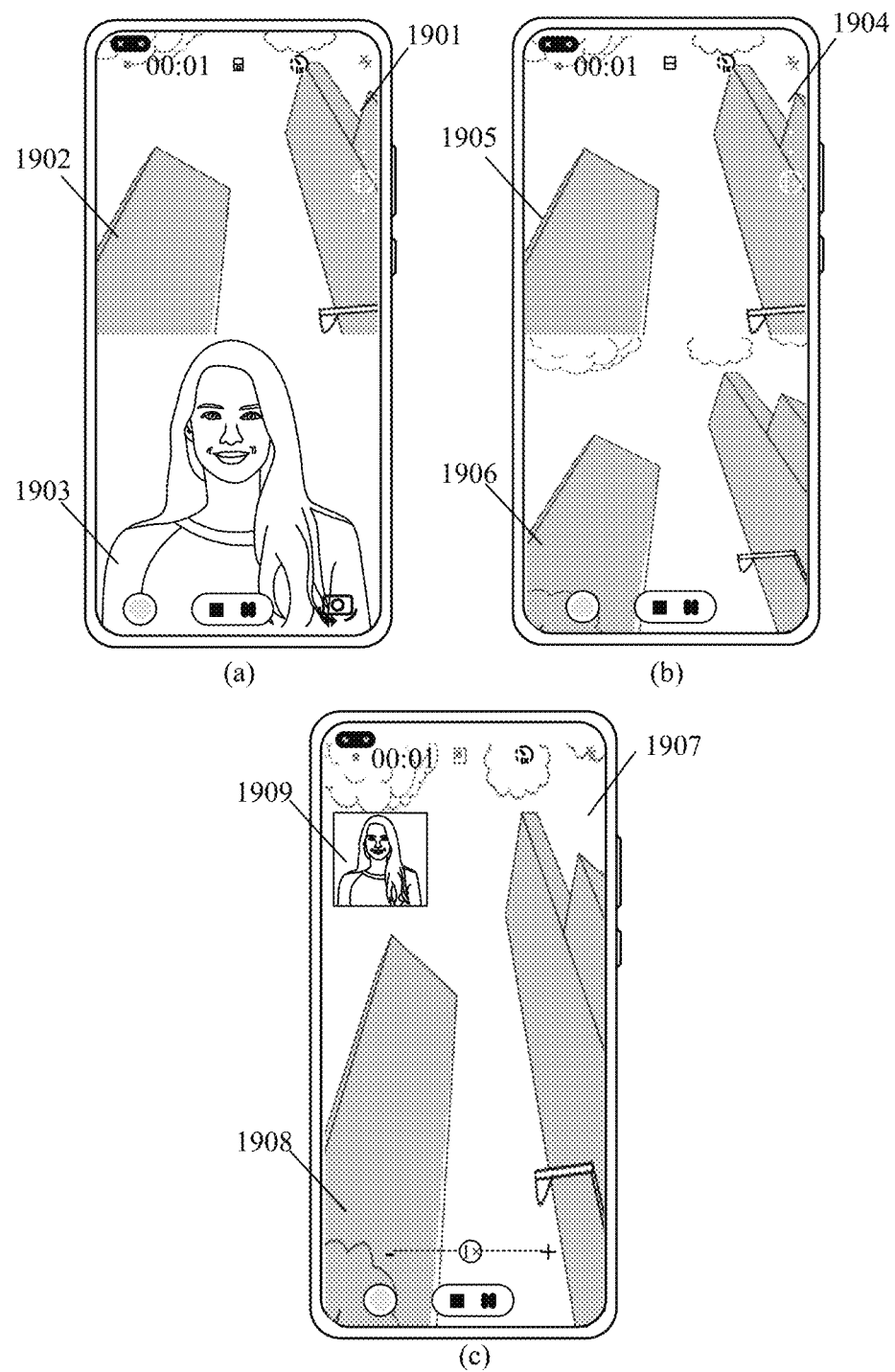
FIG. 19 is a schematic diagram of a recording screen on a mobile phone in a dual-cam scenario according to an embodiment of this application.

For example, in portrait mode, when the multi-cam is dual-cam, the mobile phone may display a viewfinder screen 1901 shown in (a) of FIG. 19, and the viewfinder screen 1901 includes a preview image 1902 captured by a first camera (for example, a rear-facing main camera) and a preview image 1903 captured by a second camera (for example, a front-facing camera); or, the mobile phone may display a viewfinder screen 1904 shown in (b) of FIG. 19, and the viewfinder screen 1904 includes a preview image 1905 captured by the first camera (for example, the rear-facing telephoto camera) and a preview image 1906 captured by the second camera (for example, the rear-facing wide-angle camera); or, the mobile phone may display a viewfinder screen 1907 shown in (c) of FIG. 19, and the viewfinder screen 1907 includes a preview image 1908 captured by the first camera (for example, the rear-facing main camera) and a preview image 1909 captured by the second camera (for example, the front-facing camera). It should be understood that this is not limited to FIG. 19 during actual implementation.

For example, multi-cam video recording may be alternatively implemented in landscape mode, and the multi-cam may also be a larger quantity of cameras, for example, three cameras or four cameras, which is not specifically limited in this embodiment of this application. In the following embodiments, the solution in this embodiment of this application is described mainly by using the multi-cam being dual-cam in the portrait mode as an example.

Figure 20:
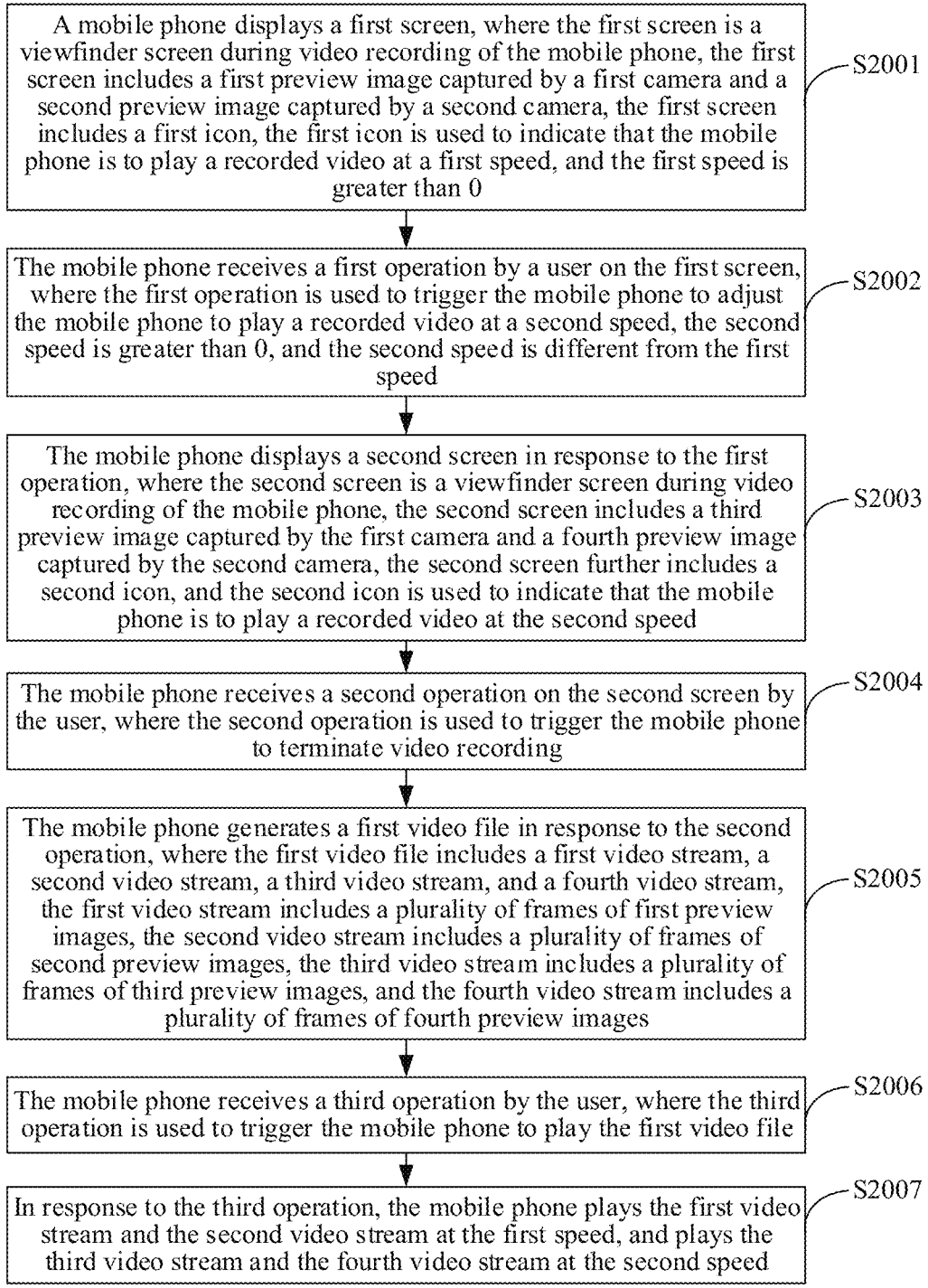
FIG. 20 is a flowchart of a video processing method in a dual-cam scenario according to an embodiment of this application.

Corresponding to scenario 2, an embodiment of this application provides a video processing method, and the method may be applied to a mobile phone, where the mobile phone includes a camera and can provide a video recording function. In this embodiment, the mobile phone includes at least the first camera and the second camera. The first camera may be one of a front-facing camera, a rear-facing main camera, a rear-facing telephoto camera, a rear-facing wide-angle camera, and a rear-facing ultra-wide-angle camera; and the second camera may be one of a front-facing camera, a rear-facing main camera, a rear-facing telephoto camera, a rear-facing wide-angle camera, and a rear-facing ultra-wide-angle camera. The first camera and the second camera are different. As shown in FIG. 20, the method includes S2001 to S2007.

S2001: The mobile phone displays a first screen, where the first screen is a viewfinder screen during video recording of the mobile phone, the first screen includes a first preview image captured by the first camera and a second preview image captured by the second camera, the first screen includes a first icon, the first icon is used to indicate that the mobile phone is to play a recorded video at a first speed, and the first speed is greater than 0.

S2002: The mobile phone receives a first operation by the user on the first screen, where the first operation is used to trigger the mobile phone to adjust the mobile phone to play a recorded video at a second speed, the second speed is greater than 0, and the second speed is different from the first speed.

In some embodiments of scenario 2, the first screen includes a first preset control, the first preset control is used to trigger the mobile phone to display a plurality of speed options, and each speed option corresponds to one video playback speed. The mobile phone displays the plurality of speed options on the first screen in response to a tap operation on the first preset control by the user. The first operation is a select operation (for example, a tap operation or a touch-and-hold operation) by the user on the first speed option in the plurality of speed options, and the first speed option corresponds to the second speed.

Figure 21:
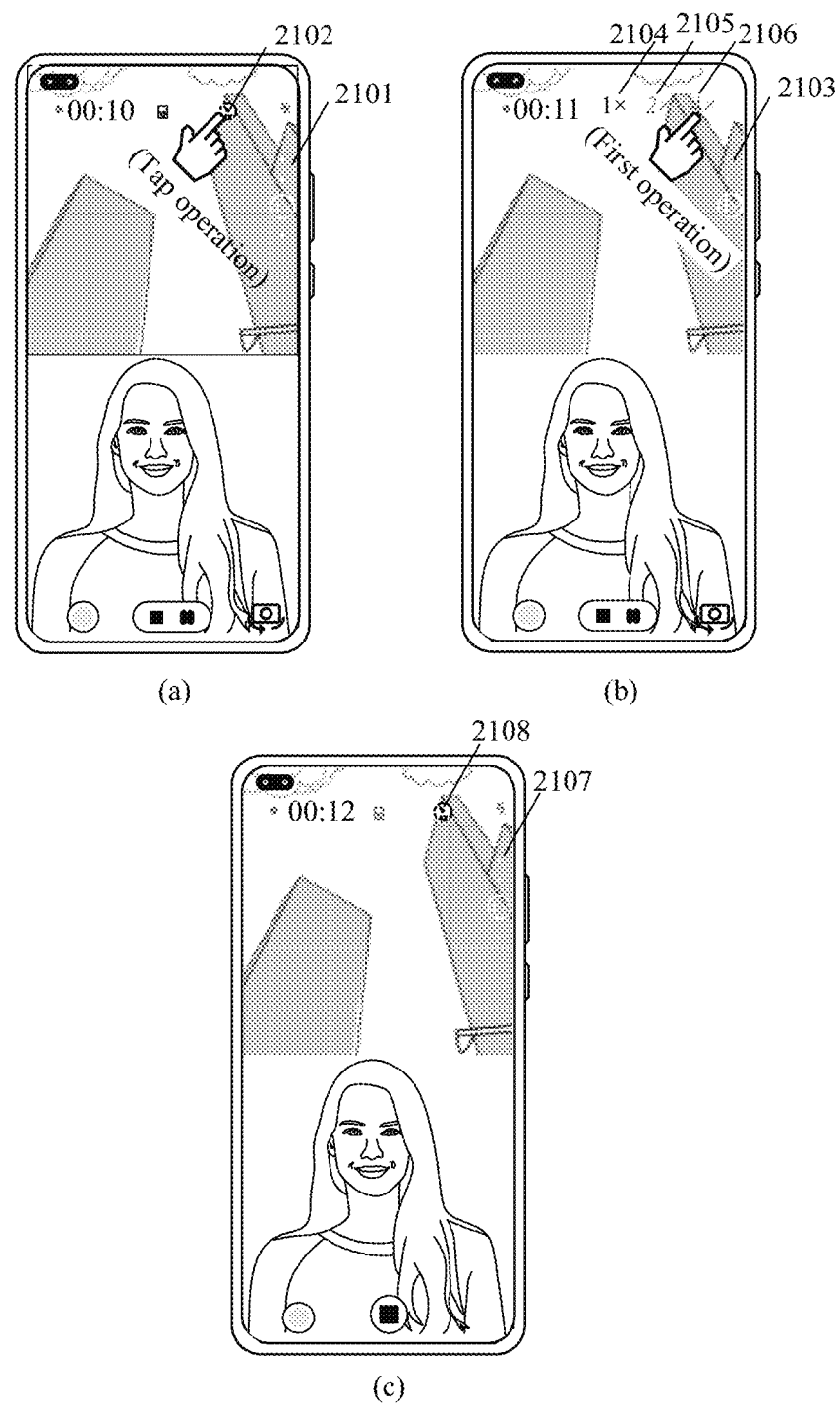
FIG. 21 is a schematic diagram of another recording screen on a mobile phone in a dual-cam scenario according to an embodiment of this application.

For example, a first screen 2101 shown in (a) of FIG. 21 includes a first preset control 2102, the first preset control 2102 is also a first icon, and the playback speed indicated by the first icon is 1× speed. The mobile phone may receive a tap operation on the first preset control 2102 by the user. In response to the tap operation, the mobile phone displays a first screen 2103 shown in (b) of FIG. 21. The first screen 2103 includes three speed options, namely a speed option 2104, a speed option 2105, and a speed option 2106. The speed option 2104 is highlighted, indicating that the current playback speed is 1× speed. The mobile phone may receive a tap operation by the user on the speed option 2106, that is, the first speed option is the speed option 2106. In response to the tap operation, the mobile phone displays a second screen 2107 shown in (c) of FIG. 21, and the second screen 2107 includes a first preset control 2108. In this case, the first preset control 2108 is also the second icon, and the playback speed indicated by the second icon is 4× speed.

S2003: The mobile phone displays a second screen in response to the first operation, where the second screen is a viewfinder screen during video recording of the mobile phone, the second screen includes a third preview image captured by the first camera and a fourth preview image captured by the second camera, the second screen further includes a second icon, and the second icon is used to indicate that the mobile phone is to play a recorded video at the second speed.

Different from the implementation process corresponding to scenario 1, two cameras capture preview images simultaneously in scenario 2. An image captured by the first camera before the mobile phone responds to the first operation is referred to as the first preview image, and an image captured by the second camera before the mobile phone responds to the first operation is referred to as the second preview image. An image captured by the first camera after the mobile phone responds to the first operation is referred to as the third preview image, and an image captured by the second camera after the mobile phone responds to the first operation is referred to as the fourth preview image.

Figure 22:
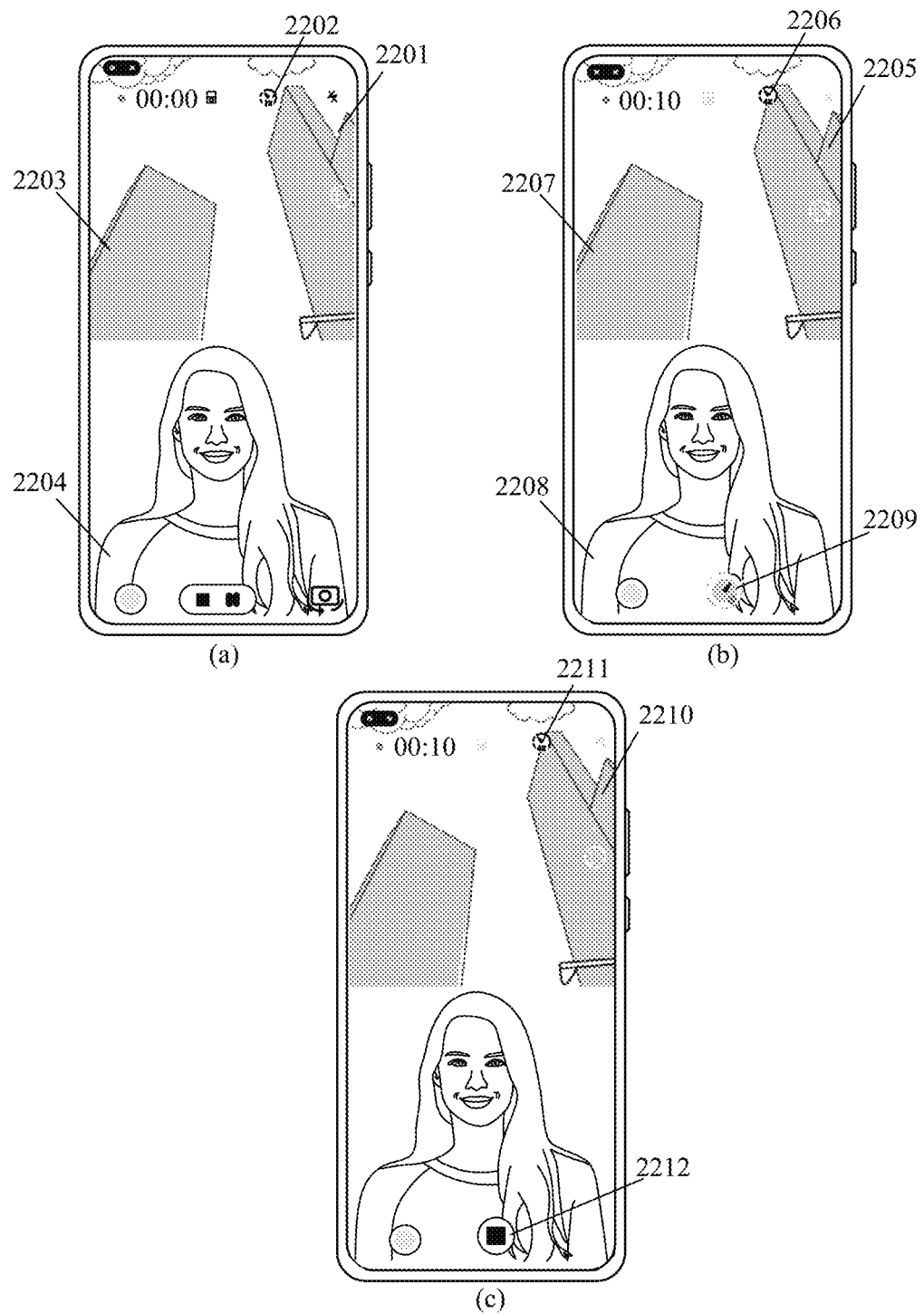
FIG. 22 is a schematic diagram of another recording screen on a mobile phone in a dual-cam scenario according to an embodiment of this application.

For example, a speed icon 2202 shown in (a) of FIG. 22 is the first icon, that is, the first speed is equal to 1; and a speed icon 2206 shown in (b) of FIG. 22 is the second icon, that is, the second icon is equal to 4. Correspondingly, a screen 2201 shown in (a) of FIG. 22 is the first screen displayed before the mobile phone responds to the first operation, and the screen 2201 includes a first preview image 2203 captured by the first camera and a second preview image 2204 captured by the second camera. A screen 2205 shown in (b) of FIG. 22 is the second screen displayed after the mobile phone responds to the first operation, and the screen 2205 includes a third preview image 2207 captured by the first camera and a fourth preview image 2208 captured by the second camera.

In some embodiments of scenario 2, in a case that the first speed is not equal to the second preset speed (for example, 1× speed), the first screen further includes a second preset control; and in a case that the second speed is not equal to the second preset speed (for example, 1× speed), the second screen further includes a second preset control. The second preset control is used to trigger the mobile phone to play the recorded video at the second preset speed (for example, 1× speed).

For example, a second screen 2207 shown in (b) of FIG. 22 includes a second icon 2206, and a playback speed indicated by the second icon 2208 is 4× speed (that is, the second speed is equal to 4); and the second speed is not equal to 1. In this case, the second screen 2207 includes a second preset control 2209. The second preset control 2209 is used to trigger the mobile phone to play the recorded video at a preset speed (for example, 1× speed).

S2004: The mobile phone receives a second operation on the second screen by the user, where the second operation is used to trigger the mobile phone to terminate video recording.

In some embodiments of scenario 2, in a case that the first speed is not equal to the second preset speed (for example, 1× speed), the first screen further includes a third preset control; and in a case that the second speed is not equal to the second preset speed (for example, 1× speed), the second screen further includes a third preset control. The third preset control is used to trigger the mobile phone to play the recorded video at the second preset speed (for example, 1× speed). For the second preset speed, reference may be made to the description of the second speed in the foregoing scenario 1, and details are not repeated herein.

For example, a second screen 2210 shown in (c) of FIG. 22 includes a second icon 2211, and a playback speed indicated by the second icon 2211 is 4× speed (that is, the second speed is equal to 4); and the second speed is not equal to 1. In this case, the second screen 2210 further includes a third preset control 2212.

S2005: The mobile phone generates a first video file in response to the second operation, where the first video file includes a first video stream, a second video stream, a third video stream, and a fourth video stream, the first video stream includes a plurality of frames of first preview images, the second video stream includes a plurality of frames of second preview images, the third video stream includes a plurality of frames of third preview images, and the fourth video stream includes a plurality of frames of fourth preview images.

Different from the implementation process corresponding to scenario 1, two cameras capture preview images simultaneously in scenario 2, and the generated first video file includes four video streams.

Figure 23:
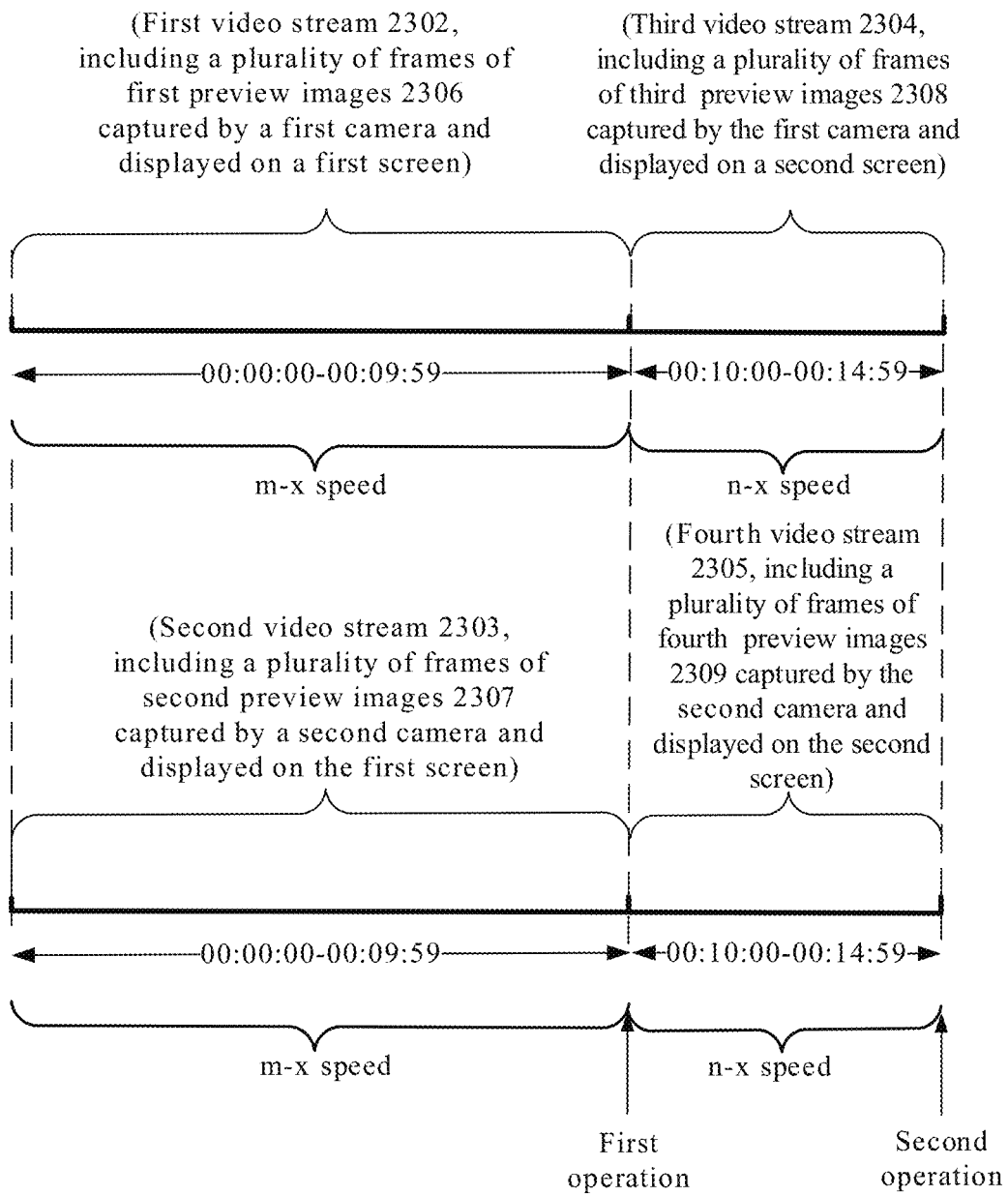
FIG. 23 is a schematic diagram of composition of a video file in a dual-cam scenario according to an embodiment of this application.

For example, as shown in FIG. 23, in the first 10 seconds from 00:00:00 (from the 0th second) to 00:09:59 (until the 9th second), the playback speed is the first speed. At 00:09:59 (or 00:10:00), the mobile phone adjusts the playback speed to the second speed in response to the first operation by the user. Then, within 5 seconds from 00:10:00 (from the 10th second) to 00:14:59 (until the 14th second), the playback speed is the second speed. At 00:14:59, in response to the second operation by the user, the mobile phone generates a first video file 2301, where the first video file 2301 includes a first video stream 2302, a second video stream 2303, a third video stream 2304, and a fourth video stream 2305. The first video stream 2302 includes a plurality of frames of first preview images 2306 captured by the first camera between 00:00:00 and 00:09:59 and displayed on the first screen. The second video stream 2303 includes a plurality of frames of second preview images 2307 captured by the second camera between 00:00:00 and 00:09:59 and displayed on the first screen. The third video stream 2304 includes a plurality of frames of third preview images 2308 captured by the first camera between 00:10:00 and 00:14:59 and displayed on the second screen. The fourth video stream 2305 includes a plurality of frames of fourth preview images 2309 captured by the second camera between 00:10:00 and 00:14:59 and displayed on the second screen.

For a manner of obtaining the first video stream by the mobile phone, reference may be made to related description of obtaining the first video stream in S305 of scenario 1. For a manner of obtaining the second video stream by the mobile phone, reference may be made to related description of obtaining the first video stream in S305 of scenario 1, with a difference in that the first video stream needs to be replaced with the second video stream and the first preview image needs to be replaced by the second preview image. For a process of obtaining the third video stream by the mobile phone, reference may be made to related description of obtaining the second video stream in S305 of scenario 1, with a difference in that the second video stream needs to be replaced with the third video stream and the second preview image needs to be replaced by the third preview image. For a process of obtaining the fourth video stream by the mobile phone, reference may be made to related description of obtaining the second video stream in S305 of scenario 1, with a difference in that the second video stream needs to be replaced with the fourth video stream and the second preview image needs to be replaced by the fourth preview image.

For example, in some embodiments of scenario 2, frame insertion processing or frame extraction processing may be performed on the captured preview images to obtain the first video stream, the second video stream, the third video stream, and the fourth video stream. It should be understood that the video stream obtained through speed processing can be played normally during playback, to implement variable-speed-based playback, thereby simplifying implementation of subsequent variable-speed-based playback.

Specifically, if the first speed is less than the first preset speed, the mobile phone performs frame insertion processing on all the first preview images captured by the first camera to obtain the first video stream including a plurality of frames of first preview images; and performs frame insertion processing on all the second preview images captured by the second camera to obtain the second video stream including a plurality of frames of second preview images. If the first speed is greater than the first preset speed, the mobile phone performs frame extraction processing on all the first preview images captured by the first camera to obtain the first video stream including a plurality of frames of first preview images; and performs frame extraction processing on all the second preview images captured by the second camera to obtain the second video stream including a plurality of frames of second preview images. For the first preset speed, reference may be made to the description of the first preset speed in the foregoing scenario 1, and details are not repeated herein.

If the second speed is less than the first preset speed, the mobile phone performs frame insertion processing on all the third preview images captured by the first camera to obtain the third video stream including a plurality of frames of third preview images; and performs frame insertion processing on all the fourth preview images captured by the second camera to obtain the fourth video stream including a plurality of frames of fourth preview images. If the second speed is greater than the first preset speed 1, the mobile phone performs frame extraction processing on all the third preview images captured by the first camera to obtain the third video stream including a plurality of frames of third preview images; and performs frame extraction processing on all the fourth preview images captured by the second camera to obtain the fourth video stream including a plurality of frames of fourth preview images.

Finally, the mobile phone generates a first video file including the first video stream, the second video stream, the third video stream, and the fourth video stream that are obtained through variable-speed-based processing.

In addition, after video recording is terminated, capturing of the first preview image, the second preview image, the third preview image, and the fourth preview image has been terminated. Therefore, in some embodiments, in response to the second operation, the mobile phone may perform frame insertion processing or frame extraction processing separately on all the first preview images, all the second preview images, all the third preview images, and all the fourth preview images. In this way, in response to the second operation, frame insertion processing or frame extraction processing can be completed at one time, which can avoid invoking the same processing program multiple times.

A difference from capturing of the third preview image and the fourth preview image lies in that after the playback speed is adjusted to the second speed, capturing of the first preview images and the second preview images has been terminated. Therefore, in some other embodiments, in response to the first operation, the mobile phone may complete frame insertion processing or frame extraction processing for all the first preview images and all the second preview images. Then, in response to the second operation, the mobile phone completes frame insertion processing or frame extraction processing on all the third preview images and the fourth preview images. In this way, frame insertion processing or frame extraction processing can be started in a timely manner after capturing of the first preview image and the second preview image is terminated. This avoids processing a large number of processing tasks in a concentrated period of time, and can reduce pressure of instantaneous data processing.

S2006: The mobile phone receives a third operation by the user, where the third operation is used to trigger the mobile phone to play the first video file.

S2007: In response to the third operation, the mobile phone plays the first video stream and the second video stream at the first speed, and plays the third video stream and the fourth video stream at the second speed.

In a case that the first speed is less than a first preset speed, playing duration for playing the first video stream is greater than capturing duration for capturing all the first preview images captured by the first camera, and playing duration for playing the second video stream is greater than capturing duration for capturing all the second preview images by the second camera. In a case that the first speed is equal to the first preset speed, the playing duration for playing the first video stream is equal to the capturing duration for capturing all the first preview images captured by the first camera, and the playing duration for playing the second video stream is equal to the capturing duration for capturing all the second preview images by the second camera. In a case that the first speed is greater than the first preset speed, the playing duration for playing the first video stream is less than the capturing duration for capturing all the first preview images captured by the first camera, and the playing duration for playing the second video stream is less than the capturing duration for capturing all the second preview images by the second camera.

In a case that the second speed is less than the first preset speed, playing duration for playing the third video stream is greater than capturing duration for capturing all the third preview images captured by the first camera, and playing duration for playing the fourth video stream is greater than capturing duration for capturing all the fourth preview images by the second camera. In a case that the second speed is equal to the first preset speed, the playing duration for playing the third video stream is equal to the capturing duration for capturing all the third preview images captured by the first camera, and the playing duration for playing the fourth video stream is equal to the capturing duration for capturing all the fourth preview images by the second camera. In a case that the second speed is greater than the first preset speed, the playing duration for playing the third video stream is less than the capturing duration for capturing all the third preview images captured by the first camera, and the playing duration for playing the fourth video stream is less than the capturing duration for capturing all the fourth preview images by the second camera.

It should be noted that a difference from the implementation process corresponding to scenario 1 lies in that in scenario 2, variable-speed-based playback means that the preview images captured by two cameras simultaneously are played at a same playback speed. Using FIG. 22 as an example, the plurality of frames of first preview images 2206 captured by the first camera between 00:00:00 and 00:09:59 are played at the first speed, and the plurality of frames of second preview images 2207 captured by the second camera between 00:00:00 and 00:09:59 are played at the first speed simultaneously.

For implementation of playing the first video stream by the mobile phone at the first speed, reference may be made to specific implementation of playing the first video stream at the first speed in S307 of scenario 1. For implementation of playing the second video stream by the mobile phone at the first speed, reference may be made to specific implementation of playing the first video stream at the first speed S307 in scenario 1, with a difference in that the first video stream needs to be replaced with the second video stream and the first preview image needs to be replaced with the second preview image. For implementation of playing the third video stream by the mobile phone at the second speed, reference may be made to specific implementation of playing the second video stream at the second speed S307 in scenario 1, with a difference in that the second video stream needs to be replaced with the third video stream and the second preview image needs to be replaced with the third preview image. For implementation of playing the fourth video stream by the mobile phone at the second speed, reference may be made to specific implementation of playing the second video stream at the second speed S307 in scenario 1, with a difference in that the second video stream needs to be replaced with the fourth video stream and the second preview image needs to be replaced with the fourth preview image.

It should be noted here that, in this embodiment, different implementation processes in scenario 2 and scenario 1 are mainly described. It should be understood that an implementation principle and process of the content not described in detail in this embodiment are the same as the implementation principles and processes of the corresponding steps in scenario 1. For details, refer to the related descriptions in scenario 1. For example, for the first screen, the second screen, the first operation and the mobile phone responding to the first operation, the second operation and the mobile phone responding to the second operation, the third operation and the mobile phone responding to the third operation, and specific implementation of the variable-speed-based playback, refer to the related descriptions in scenario 1. Details are not repeated in this embodiment.

To sum up, according to the video processing method provided by this embodiment of this application, the playback speed can be flexibly adjusted in response to the first operation by the users during dual-cam video recording. Then, during playback of the video file, the preview images captured by the two cameras simultaneously are played at a same speed. For example, the preview images captured by the two cameras before t adjustment are played at the first speed, and the preview images captured by the two cameras simultaneously after adjustment are played at the second speed. In this way, after recording is completed, different video streams can be played at different speeds, not requiring the user to perform any operation, so that a time point for changing the playback speed is consistent with a time point at which the user performs the first operation during recording, thereby improving intelligence of variable-speed-based playback.

In the foregoing embodiment of scenario 2, only a process of adjusting the playback speed once is described. In an actual implementation process, one case is that the playback speed is adjusted only once in one complete recording process from start of recording to end of recording. That is, from the start of recording, the playback speed is always the first speed, and then the playback speed is adjusted to the second speed. Another case is that the playback speed is adjusted multiple times in one complete recording process from start of recording to end of recording. For example, the playback speed is adjusted two or three times. That is, before the first screen is displayed, the playback speed is also adjusted.

Figure 24A:
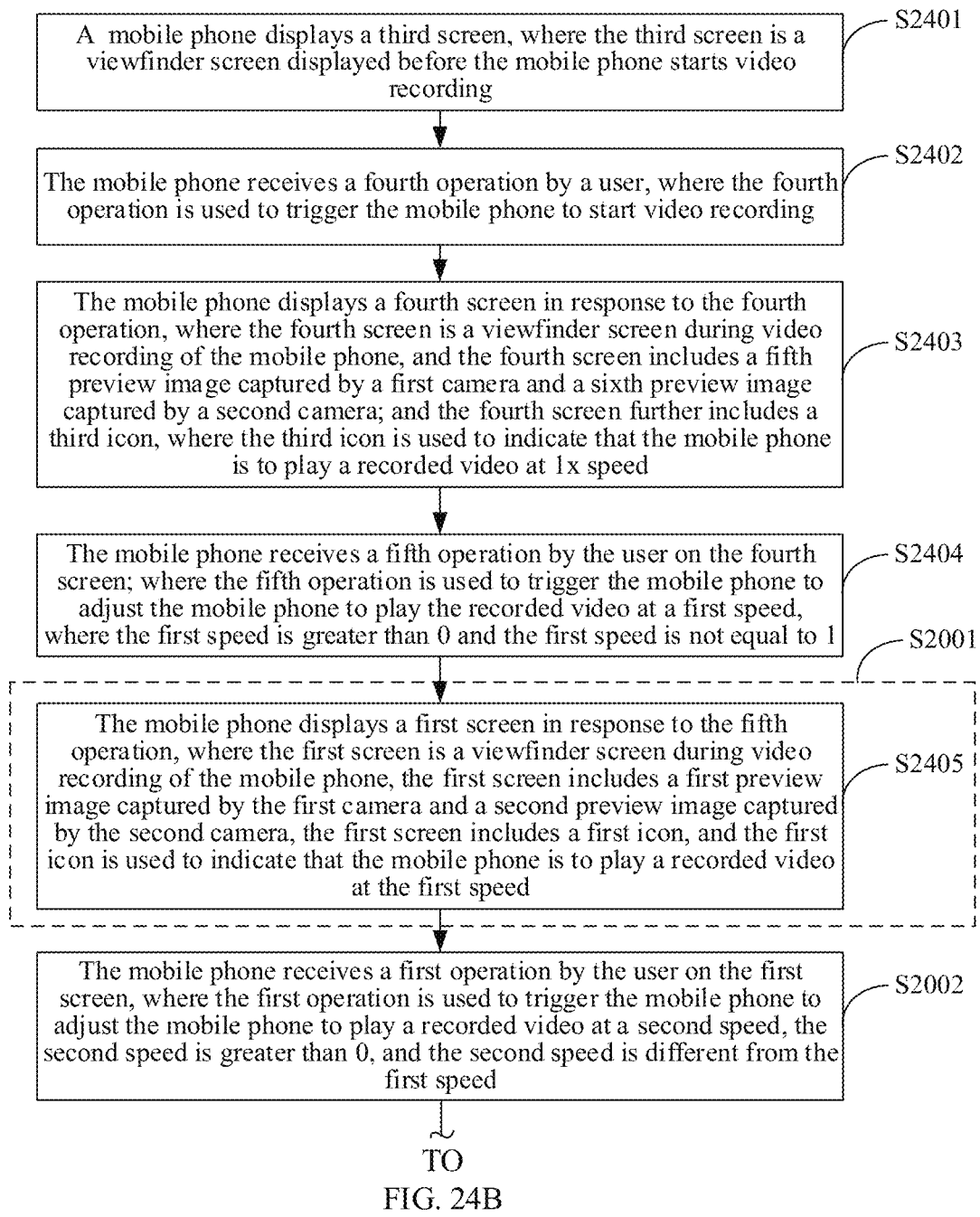
FIG. 24A and FIG. 24B are a flowchart of another video processing method in a dual-cam scenario according to an embodiment of this application.
Figure 24B:
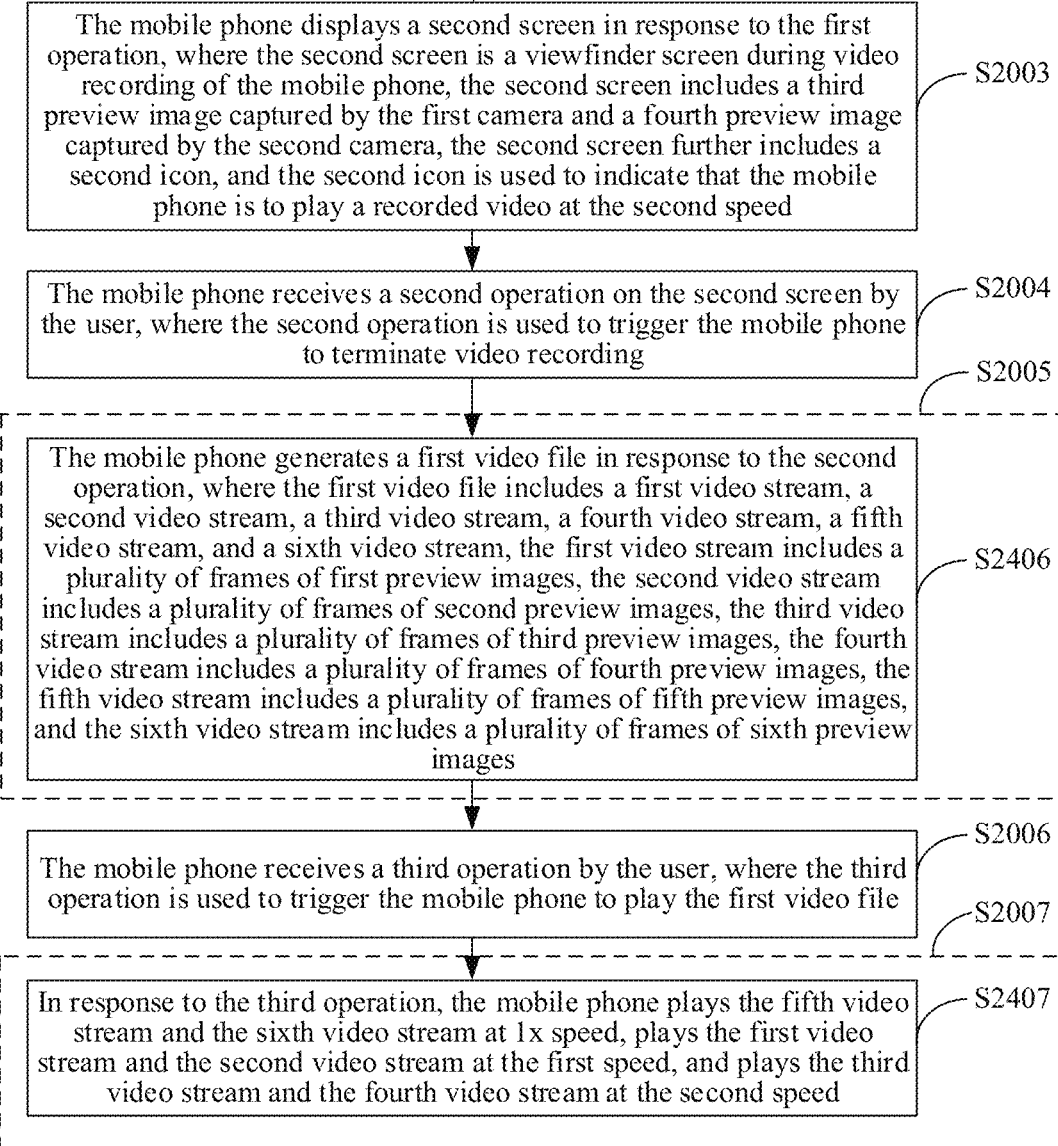

The following mainly uses adjusting the playback speed twice as an example for description. Specifically, as shown in FIG. 24A and FIG. 24B, before S2001, S2401 to S2404 are further included. S2001 includes S2405, S2005 includes S2406, and S2007 includes S2407.

S2401: The mobile phone displays a third screen, where the third screen is a viewfinder screen displayed before the mobile phone starts video recording.

S2402: The mobile phone receives a fourth operation by the user, where the fourth operation is used to trigger the mobile phone to start video recording.

For specific implementation of the foregoing S2402 and S2402, reference may be made to related descriptions of the foregoing S1301 and S1302:

S2403: The mobile phone displays a fourth screen in response to the fourth operation, where the fourth screen is a viewfinder screen during video recording of the mobile phone, and the fourth screen includes a fifth preview image captured by the first camera and a sixth preview image captured by the second camera; and the fourth screen further includes a third icon, where the third icon is used to indicate that the mobile phone is to play a recorded video at 1× speed.

The 1× speed means that the second preset speed is 1× speed.

The fourth screen is essentially the same as the first screen and the second screen, and each is a viewfinder screen during video recording of the mobile phone. The difference lies in that, in this embodiment, the fourth screen is a viewfinder screen for entering video recording at the beginning.

For specific implementation of S2403, refer to related description of the foregoing S1303. The only difference lies in that the first screen needs to be replaced with the fourth screen, the first icon needs to be replaced with the third icon, the camera needs to be replaced with the first camera and the second camera, and the first preview image needs to be replaced with the fifth preview image and the sixth preview image.

S2404: The mobile phone receives a fifth operation by the user on the fourth screen; where the fifth operation is used to trigger the mobile phone to adjust the mobile phone to play the recorded video at a first speed, where the first speed is greater than 0 and the first speed is not equal to 1.

The fifth operation is essentially the same as the first operation, and both are used to trigger the mobile phone to adjust the playback speed. For details about the fifth operation, reference may be made to the description about the first operation in the foregoing description, and details are not repeated herein. The difference lies in that the fifth operation is used to trigger the mobile phone to adjust the mobile phone to play the recorded video at the first speed, and the first operation is used to trigger the mobile phone to adjust the mobile phone to play the recorded video at the second speed.

S2405: The mobile phone displays a first screen in response to the fifth operation, where the first screen is a viewfinder screen during video recording of the mobile phone, the first screen includes a first preview image captured by the first camera and a second preview image captured by the second camera, the first screen includes a first icon, and the first icon is used to indicate that the mobile phone is to play a recorded video at the first speed.

For the first screen in S2405, reference may be made to related description of S301 in the foregoing description, and details are not repeated herein.

S2002: The mobile phone receives a first operation by the user on the first screen, where the first operation is used to trigger the mobile phone to adjust the mobile phone to play a recorded video at a second speed, the second speed is greater than 0, and the second speed is different from the first speed.

S2003: The mobile phone displays a second screen in response to the first operation, where the second screen is a viewfinder screen during video recording of the mobile phone, the second screen includes a third preview image captured by the first camera and a fourth preview image captured by the second camera, the second screen further includes a second icon, and the second icon is used to indicate that the mobile phone is to play a recorded video at the second speed.

Non-adjacent playback speeds may be the same or different. For example, non-adjacent playback speeds, the 1× speed and the second speed, may be different. For another example, non-adjacent playback speeds, the 1× speed and the second speed, may be the same.

S2004: The mobile phone receives a second operation on the second screen by the user, where the second operation is used to trigger the mobile phone to terminate video recording.

S2406: The mobile phone generates a first video file in response to the second operation, where the first video file includes a first video stream, a second video stream, a third video stream, a fourth video stream, a fifth video stream, and a sixth video stream, the first video stream includes a plurality of frames of first preview images, the second video stream includes a plurality of frames of second preview images, the third video stream includes a plurality of frames of third preview images, the fourth video stream includes a plurality of frames of fourth preview images, the fifth video stream includes a plurality of frames of fifth preview images, and the sixth video stream includes a plurality of frames of sixth preview images.

For a process of generating the first video file in S2406, reference may be made to the description of the foregoing S2005, and details are not repeated herein. It should be noted that the fifth video stream includes a plurality of frames of fifth preview images, and the sixth video stream includes a plurality of frames of sixth preview images. Because the fifth preview images and the sixth preview images are captured in a process with the playback speed being 1× speed, all the fifth preview images captured by the first camera can be directly constructed to obtain the fifth video stream, and all the sixth preview images captured by the second camera can be directly constructed to obtain the sixth video stream.

S2006: The mobile phone receives a third operation by the user, where the third operation is used to trigger the mobile phone to play the first video file.

S2407: In response to the third operation, the mobile phone plays the fifth video stream and the sixth video stream at 1× speed, plays the first video stream and the second video stream at the first speed, and plays the third video stream and the fourth video stream at the second speed.

For specific implementation of variable-speed-based playback in S2407, reference may be made to the description of S2007 in the foregoing description, and details are not repeated herein.

To sum up, according to the video processing method provided by this embodiment of this application, the playback speed can be adjusted twice in one complete recording process from start of recording to end of recording. Specifically, the playback speed is adjusted from initial 1× speed to the first speed, and then is adjusted from the first speed to the second speed. Then, during playback, a video recorded before the first adjustment of the playback speed is played at 1× speed, a video recorded after the first adjustment and before the second adjustment is played at the first speed, and a video recorded after the second adjustment is played at the second speed. In this way, after recording is completed, video streams obtained before and after each adjustment can be played at different speeds, not requiring the user to perform any operation, so that a time point for changing the playback speed is consistent with time points at which the user performs the fifth operation and the first operation during recording.

In addition, it should be noted that the embodiment in FIG. 24A and FIG. 24B is mainly described using an example in which the playback speed is adjusted twice during one recording process. In some other embodiments, between the 1× speed and the first speed, the playback speed may be adjusted one or more times. That is, in one complete recording process, the playback speed may be sequentially the 1× speed, . . . , the first speed, and the second speed. One or more playback speeds may be included in the ellipsis. Adjacent playback speeds before and after adjustment are different. For each adjustment, reference may be made to adjustment from the first speed to the second speed in the foregoing description, and specific implementation of adjusting the playback speed three times or more in one complete recording process is not described herein.

In the solutions of the foregoing scenario 1 and scenario 2, the purpose is to improve smoothness of switching playback speeds of video streams before and after. In some embodiments, transition animation may be added in the middle of the video streams formed before and after switching. For example, in scenario 1, transition animation is added between the first video stream and the second video stream, and transition animation is added between the second video stream and the third video stream. In scenario 2, transition animation is added between the first video stream and the third video stream, and transition animation is added between the second video stream and the fourth video stream.

Further, when switching from an accelerated playback speed to a slowed-down playback speed, or from a sloweddown playback speed to an accelerated playback speed, smoothness of the video streams before and after switching the playback speed is more likely to be affected. Based on this, transition animation may be added in both cases.

For example, in scenario 1, if the first speed is less than the first preset speed and the second speed is greater than the first preset speed, a plurality of preset video frames are added between the first video stream and the second video stream, that is, transition animation is added. If the first speed is greater than the first preset speed and the second speed is less than the first preset speed, a plurality of preset video frames are added between the first video stream and the second video stream, that is, transition animation is added.

For example, in scenario 2, if the first speed is less than the first preset speed and the second speed is greater than the first preset speed, a plurality of preset video frames are added between the first video stream and the third video stream, and a plurality of preset video frames are added between the second video stream and the fourth video stream. If the first speed is greater than the first preset speed and the second speed is less than the first preset speed, a plurality of preset video frames are added between the first video stream and the third video stream, and a plurality of preset video frames are added between the second video stream and the fourth video stream.

The preset video frames may be preset animation frames. For example, the animation frame may be an animation frame with blur animation, or may be an animation frame with fading animation.

Some other embodiments of this application provide an electronic device, and the electronic device may include: the camera, a display (for example, a touch screen), a memory, and one or more processors. The camera, the display, and the memory are coupled to the processor. The memory is used to store computer program code, and the computer program code includes a computer instruction. When the processor executes the computer instruction, the electronic device can execute various functions or steps that are executed by the mobile phone in the foregoing method embodiments. For a structure of the electronic device, reference may be made to a structure of the mobile phone 200 shown in FIG. 2.

Figure 25:
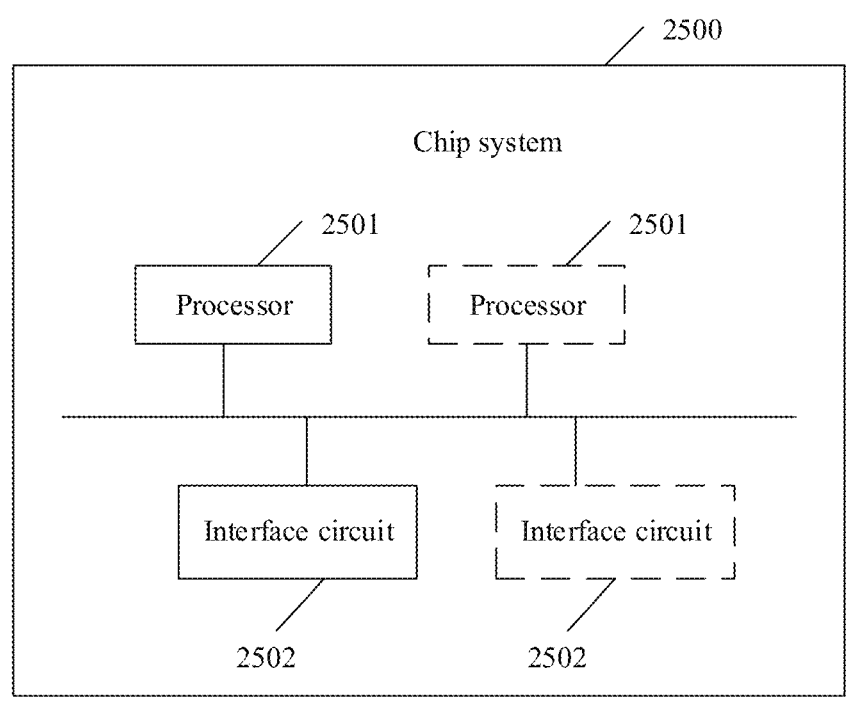
FIG. 25 is a schematic structural diagram of a chip system according to an embodiment of this application.

An embodiment of this application further provides a chip system. As shown in FIG. 25, the chip system 2500 includes at least one processor 2501 and at least one interface circuit 2502. The processor 2501 and the interface circuit 2502 may be interconnected by lines. For example, the interface circuit 2502 may be configured to receive signals from other apparatuses (for example, the memory of the electronic device). For another example, the interface circuit 2502 may be configured to send signals to other apparatuses (for example, the processor 2501). For example, the interface circuit 2502 can read an instruction stored in the memory and send the instruction to the processor 2501. When the instructions are executed by the processor 2501, the electronic device can be enabled to perform the steps in the foregoing embodiments. Certainly, the chip system may further include other discrete devices, and this is not specifically limited in this embodiment of this application.

An embodiment of this application further provides a computer storage medium, where the computer storage medium includes computer instructions. When the computer instructions are run on the foregoing electronic device, the electronic device is enabled to execute the functions or steps that are executed by the mobile phone in the foregoing method embodiments.

An embodiment of this application further provides a computer program product, where when the computer program product runs on a computer, the computer is enabled to execute the functions or steps that are executed by the mobile phone in the foregoing method embodiments.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A video processing method, applied to an electronic device comprising a first camera and a second camera, wherein the method comprises:
    displaying, by the electronic device, a first screen, wherein the first screen is a viewfinder screen of the electronic device recording video from a first moment to a second moment, the first screen comprises a first preview image captured by the first camera and a second preview image captured by the second camera, the first screen further comprises a first icon, and the first icon is used to indicate that the electronic device is to play a recorded video from the first moment to the second moment at a first speed;
    receiving, by the electronic device, a first operation by a user on the first screen at the second moment;
    displaying, by the electronic device, a second screen in response to the first operation, wherein the second screen is a viewfinder screen of the electronic device recording video from the second moment to a third moment, the second screen comprises a third preview image captured by the first camera and a fourth preview image captured by the second camera, the second screen further comprises a second preset control and a second icon, and the second icon is used to indicate that the electronic device is to play a recorded video from the second moment to the third moment at a second speed, the second speed is different from the first speed;
    receiving, by the electronic device, a second operation of the second preset control by the user at the third moment;
    displaying, by the electronic device, a third screen in response to the second operation, wherein the third screen is a viewfinder screen of the electronic device recording video from the third moment to a fourth moment, the third screen comprises the first icon, a fifth preview image captured by the first camera and a sixth preview image captured by the second camera;
    receiving, by the electronic device, a third operation by the user, wherein the third operation is used to trigger the electronic device to terminate video recording;
    generating, by the electronic device, a first video file in response to the third operation, wherein the first video file comprises: a first video stream and a second video stream corresponding to the first moment to the second moment, a third video stream and a fourth video stream corresponding to the second moment to the third moment, a fifth video stream and a sixth video stream corresponding to a third time to a fourth time, the first video stream comprises a plurality of frames of the first preview images, the second video stream comprises a plurality of frames of the second preview images, the third video stream comprises a plurality of frames of the third preview images, the fourth video stream comprises a plurality of frames of the fourth preview images, the fifth video stream comprises a plurality of frames of the fifth preview images, the sixth video stream comprises a plurality of frames of the sixth preview images;
    receiving, by the electronic device, a fourth operation by the user, wherein the fourth operation is used to trigger the electronic device to play the first video file; and
    playing, by the electronic device in response to the fourth operation, the first video stream and the second video stream at the first speed, playing the third video stream and the fourth video stream at the second speed, and playing the fifth video stream and the sixth video stream at the first speed.

2. The method according to claim 1, wherein in a case that the first speed is less than a first preset speed, playing duration for playing the first video stream is greater than capturing duration for capturing all the first preview images captured by the first camera, and playing duration for playing the second video stream is greater than capturing duration for capturing all the second preview images by the second camera; in a case that the first speed is equal to the first preset speed, the playing duration for playing the first video stream is equal to the capturing duration for capturing all the first preview images captured by the first camera, and the playing duration for playing the second video stream is equal to the capturing duration for capturing all the second preview images by the second camera; and in a case that the first speed is greater than the first preset speed, the playing duration for playing the first video stream is less than the capturing duration for capturing all the first preview images captured by the first camera, and the playing duration for playing the second video stream is less than the capturing duration for capturing all the second preview images by the second camera; and in a case that the second speed is less than the first preset speed, playing duration for playing the third video stream is greater than capturing duration for capturing all the third preview images captured by the first camera, and playing duration for playing the fourth video stream is greater than capturing duration for capturing all the fourth preview images by the second camera; in a case that the second speed is equal to the first preset speed, the playing duration for playing the third video stream is equal to the capturing duration for capturing all the third preview images captured by the first camera, and the playing duration for playing the fourth video stream is equal to the capturing duration for capturing all the fourth preview images by the second camera; and in a case that the second speed is greater than the first preset speed, the playing duration for playing the third video stream is less than the capturing duration for capturing all the third preview images captured by the first camera, and the playing duration for playing the fourth video stream is less than the capturing duration for capturing all the fourth preview images by the second camera.

3. The method according to claim 1, wherein the first screen comprises a first preset control, the first preset control is used to trigger the electronic device to display a plurality of speed options, and each speed option corresponds to one video playback speed; and before the receiving, by the electronic device, a first operation by a user on the first screen, the method further comprises:

displaying, by the electronic device, the plurality of speed options on the first screen in response to a tap operation on the first preset control by the user; wherein the first operation is a select operation by the user on a first speed option in the plurality of speed options, and the first speed option corresponds to the second speed.

4. The method according to claim 1, wherein in a case that the first speed is not equal to a second preset speed, the first screen further comprises a third preset control; and in a case that the second speed is not equal to the second preset speed, the second screen further comprises the third preset control; wherein the third preset control is used to trigger the electronic device to terminate video recording.

5. The method according to claim 1, wherein before the displaying, by the electronic device, a first screen, the method further comprises:

displaying, by the electronic device, a fourth screen, wherein the fourth screen is a viewfinder screen recorded before the first moment, the fourth screen comprises a seventh preview image captured by the first camera and a eighth preview image captured by the second camera, the fourth screen further comprises a third icon, and the third icon is used to indicate that the electronic device is to play a recorded video at the second preset speed; and receiving, by the electronic device, a fifth operation by the user on the fourth screen, wherein the fifth operation is used to trigger the electronic device to adjust the electronic device to play the recorded video at the first speed; wherein the displaying, by the electronic device, a first screen comprises:

displaying, by the electronic device, the first screen in response to the fifth operation.

6. The method according to claim 1, wherein the generating a first video file comprises:

if the first speed is less than the first preset speed, performing, by the electronic device, frame insertion processing on all the first preview images captured by the first camera, to obtain the first video stream comprising the plurality of frames of the first preview images, and performing, by the electronic device, frame insertion processing on all the second preview images captured by the second camera, to obtain the second video stream comprising the plurality of frames of the second preview images; and if the first speed is greater than the first preset speed, performing, by the electronic device, frame extraction processing on all the first preview images captured by the first camera, to obtain the first video stream comprising the plurality of frames of the first preview images, and performing, by the electronic device, frame extraction processing on all the second preview images captured by the second camera, to obtain the second video stream comprising the plurality of frames of the second preview images;

if the second speed is less than the first preset speed, performing, by the electronic device, frame insertion processing on all the third preview images captured by the first camera, to obtain the third video stream comprising the plurality of frames of the third preview images, and performing, by the electronic device, frame insertion processing on all the fourth preview images captured by the second camera, to obtain the fourth video stream comprising the plurality of frames of the fourth preview images; and if the second speed is greater than the first preset speed, performing, by the electronic device, frame extraction processing on all the third preview images captured by the first camera, to obtain the third video stream comprising the plurality of frames of the third preview images, and performing, by the electronic device, frame extraction processing on all the fourth preview images captured by the second camera, to obtain the fourth video stream comprising the plurality of frames of the fourth preview images; and generating, by the electronic device, the first video file comprising the first video stream, the second video stream, the third video stream, and the fourth video stream.

7. The method according to claim 1, wherein the method further comprises:

if the first speed is less than the first preset speed, performing, by the electronic device in response to the first operation, frame insertion processing on all the first preview images captured by the first camera, to obtain the first video stream comprising the plurality of frames of the first preview images, and performing, by the electronic device in response to the first operation, frame insertion processing on all the second preview images captured by the second camera, to obtain the second video stream comprising the plurality of frames of the second preview images; and if the first speed is greater than the first preset speed, performing, by the electronic device in response to the first operation, frame extraction processing on all the first preview images captured by the first camera, to obtain the first video stream comprising the plurality of frames of the first preview images, and performing, by the electronic device in response to the first operation, frame extraction processing on all the second preview images captured by the second camera, to obtain the second video stream comprising the plurality of frames of the second preview images; wherein the generating, by the electronic device, a first video file in response to the third operation comprises:

if the second speed is less than the first preset speed, performing, by the electronic device in response to the third operation, frame insertion processing on all the third preview images captured by the first camera, to obtain the third video stream comprising the plurality of frames of the third preview images, and performing, by the electronic device in response to the second operation, frame insertion processing on all the fourth preview images captured by the second camera, to obtain the fourth video stream comprising the plurality of frames of the fourth preview images; and if the second speed is greater than the first preset speed, performing, by the electronic device in response to the second operation, frame extraction processing on all the third preview images captured by the first camera, to obtain the third video stream comprising the plurality of frames of the third preview images, and performing, by the electronic device in response to the second operation, frame extraction processing on all the fourth preview images captured by the second camera, to obtain the fourth video stream comprising the plurality of frames of the fourth preview images; and generating, by the electronic device, the first video file comprising the first video stream, the second video stream, the third video stream, and the fourth video stream.

8. The method according to claim 1, wherein the generating a first video file comprises:

if the first speed is less than the first preset speed and the second speed is greater than the first preset speed, adding a plurality of preset video frames between the first video stream and the third video stream, and adding a plurality of preset video frames between the second video stream and the fourth video stream; and if the first speed is greater than the first preset speed and the second speed is less than the first preset speed, adding a plurality of preset video frames between the first video stream and the third video stream, and adding a plurality of preset video frames between the second video stream and the fourth video stream.

9. A computer-readable storage medium, wherein an instruction is stored in the computer-readable storage medium, and when the instruction is executed on an electronic device, the electronic device is enabled to perform the method according to claim 1.

10. The method according to claim 1, wherein the first screen and the third screen do not comprise the second preset control.

11. An electronic device, wherein the electronic device comprises:
a display;
a first camera and a second camera;
a memory, and a processor;
the display and the memory are coupled to the processor; the memory is configured to store computer program code, and the computer program code comprises a computer instruction; and when the computer instruction is executed by the processor, the electronic device is configured to:

display a first screen, wherein the first screen is a viewfinder screen of the electronic device recording video from a first moment to a second moment, the first screen comprises a first preview image captured by the first camera and a second preview image captured by the second camera, the first screen further comprises a first icon, and the first icon is used to indicate that the electronic device is to play a recorded video from the first moment to the second moment at a first speed;

receive a first operation by a user on the first screen at the second moment;

display a second screen in response to the first operation, wherein the second screen is a viewfinder screen of the electronic device recording video from the second moment to a third moment, the second screen comprises a third preview image captured by the first camera and a fourth preview image captured by the second camera, the second screen further comprises a second preset control and a second icon, and the second icon is used to indicate that the electronic device is to play a recorded video from the second moment to the third moment at a second speed, the second speed is different from the first speed;

receive a second operation of the second preset control by the user at the third moment;

display a third screen in response to the second operation, wherein the third screen is a viewfinder screen of the electronic device recording video from the third moment to a fourth moment, the third screen comprises the first icon, a fifth preview image captured by the first camera and a sixth preview image captured by the second camera;

receive a third operation by the user, wherein the third operation is used to trigger the electronic device to terminate video recording;

generate a first video file in response to the third operation, wherein the first video file comprises: a first video stream and a second video stream corresponding to the first moment to the second moment, a third video stream and a fourth video stream corresponding to the second moment to the third moment, a fifth video stream and a sixth video stream corresponding to a third time to a fourth time, the first video stream comprises a plurality of frames of the first preview images, the second video stream comprises a plurality of frames of the second preview images, the third video stream comprises a plurality of frames of the third preview images, the fourth video stream comprises a plurality of frames of the fourth preview images, the fifth video stream comprises a plurality of frames of the fifth preview images, the sixth video stream comprises a plurality of frames of the sixth preview images;

receive a fourth operation by the user, wherein the fourth operation is used to trigger the electronic device to play the first video file; and play the first video stream and the second video stream at the first speed, playing the third video stream and the fourth video stream at the second speed, and playing the fifth video stream and the sixth video stream at the first speed.

12. The electronic device according to claim 11, wherein in a case that the first speed is less than a first preset speed, playing duration for playing the first video stream is greater than capturing duration for capturing all the first preview images captured by the first camera, and playing duration for playing the second video stream is greater than capturing duration for capturing all the second preview images by the second camera; in a case that the first speed is equal to the first preset speed, the playing duration for playing the first video stream is equal to the capturing duration for capturing all the first preview images captured by the first camera, and the playing duration for playing the second video stream is equal to the capturing duration for capturing all the second preview images by the second camera; and in a case that the first speed is greater than the first preset speed, the playing duration for playing the first video stream is less than the capturing duration for capturing all the first preview images captured by the first camera, and the playing duration for playing the second video stream is less than the capturing duration for capturing all the second preview images by the second camera; and in a case that the second speed is less than the first preset speed, playing duration for playing the third video stream is greater than capturing duration for capturing all the third preview images captured by the first camera, and playing duration for playing the fourth video stream is greater than capturing duration for capturing all the fourth preview images by the second camera; in a case that the second speed is equal to the first preset speed, the playing duration for playing the third video stream is equal to the capturing duration for capturing all the third preview images captured by the first camera, and the playing duration for playing the fourth video stream is equal to the capturing duration for capturing all the fourth preview images by the second camera; and in a case that the second speed is greater than the first preset speed, the playing duration for playing the third video stream is less than the capturing duration for capturing all the third preview images captured by the first camera, and the playing duration for playing the fourth video stream is less than the capturing duration for capturing all the fourth preview images by the second camera.

13. The electronic device according to claim 11, wherein the first screen comprises a first preset control, the first preset control is used to trigger the electronic device to display a plurality of speed options, and each speed option corresponds to one video playback speed; and before the receiving, by the electronic device, a first operation by a user on the first screen, the method further comprises:

displaying, by the electronic device, the plurality of speed options on the first screen in response to a tap operation on the first preset control by the user; wherein the first operation is a select operation by the user on a first speed option in the plurality of speed options, and the first speed option corresponds to the second speed.

14. The electronic device according to claim 11, wherein in a case that the first speed is not equal to a second preset speed, the first screen further comprises a third preset control; and in a case that the second speed is not equal to the second preset speed, the second screen further comprises the third preset control; wherein the third preset control is used to trigger the electronic device to terminate video recording.

15. The electronic device according to claim 11, wherein the electronic device is further configured to:

display a fourth screen, wherein the fourth screen is a viewfinder screen recorded before the first moment, the fourth screen comprises a seventh preview image captured by the first camera and a eighth preview image captured by the second camera, the fourth screen further comprises a third icon, and the third icon is used to indicate that the electronic device is to play a recorded video at the second preset speed; and receive a fifth operation by the user on the fourth screen, wherein the fifth operation is used to trigger the electronic device to adjust the electronic device to play the recorded video at the first speed; wherein the electronic device is configured to display a first screen comprises:

the electronic device is configured to display the first screen in response to the fifth operation.

16. The electronic device according to claim 11, wherein the electronic device is further configured to:

if the first speed is less than the first preset speed, perform frame insertion processing on all the first preview images captured by the first camera, to obtain the first video stream comprising the plurality of frames of the first preview images, and perform frame insertion processing on all the second preview images captured by the second camera, to obtain the second video stream comprising the plurality of frames of the second preview images; and if the first speed is greater than the first preset speed, perform frame extraction processing on all the first preview images captured by the first camera, to obtain the first video stream comprising the plurality of frames of the first preview images, and perform frame extraction processing on all the second preview images captured by the second camera, to obtain the second video stream comprising the plurality of frames of the second preview images;

if the second speed is less than the first preset speed, perform frame insertion processing on all the third preview images captured by the first camera, to obtain the third video stream comprising the plurality of frames of the third preview images, and perform frame insertion processing on all the fourth preview images captured by the second camera, to obtain the fourth video stream comprising the plurality of frames of the fourth preview images; and if the second speed is greater than the first preset speed, perform frame extraction processing on all the third preview images captured by the first camera, to obtain the third video stream comprising the plurality of frames of the third preview images, and perform frame extraction processing on all the fourth preview images captured by the second camera, to obtain the fourth video stream comprising the plurality of frames of the fourth preview images; and generate the first video file comprising the first video stream, the second video stream, the third video stream, and the fourth video stream.

17. The electronic device according to claim 11, wherein the electronic device is further configured to:

if the first speed is less than the first preset speed, perform frame insertion processing on all the first preview images captured by the first camera, to obtain the first video stream comprising the plurality of frames of the first preview images, and perform frame insertion processing on all the second preview images captured by the second camera, to obtain the second video stream comprising the plurality of frames of the second preview images; and if the first speed is greater than the first preset speed, perform frame extraction processing on all the first preview images captured by the first camera, to obtain the first video stream comprising the plurality of frames of the first preview images, and perform frame extraction processing on all the second preview images captured by the second camera, to obtain the second video stream comprising the plurality of frames of the second preview images; wherein the electronic device is configured to generate a first video file in response to the third operation comprises:

if the second speed is less than the first preset speed, the electronic device is configured to perform frame insertion processing on all the third preview images captured by the first camera, to obtain the third video stream comprising the plurality of frames of the third preview images, and perform frame insertion processing on all the fourth preview images captured by the second camera, to obtain the fourth video stream comprising the plurality of frames of the fourth preview images; and if the second speed is greater than the first preset speed, perform frame extraction processing on all the third preview images captured by the first camera, to obtain the third video stream comprising the plurality of frames of the third preview images, and perform frame extraction processing on all the fourth preview images captured by the second camera, to obtain the fourth video stream comprising the plurality of frames of the fourth preview images; and generate the first video file comprising the first video stream, the second video stream, the third video stream, and the fourth video stream.

18. The electronic device according to claim 11, wherein the electronic device is configured to generate a first video file comprises:

if the first speed is less than the first preset speed and the second speed is greater than the first preset speed, the electronic device is configured to add a plurality of preset video frames between the first video stream and the third video stream, and add a plurality of preset video frames between the second video stream and the fourth video stream; and if the first speed is greater than the first preset speed and the second speed is less than the first preset speed, the electronic device is configured to add a plurality of preset video frames between the first video stream and the third video stream, and add a plurality of preset video frames between the second video stream and the fourth video stream.

19. The electronic device according to claim 11, wherein the first screen and the third screen do not comprise the second preset control.

* * * * *